US005339681A

United States Patent [19]

[11] Patent Number: 5,339,681

[45] Date of Patent: Aug. 23, 1994

Sekozawa et al.

[54] METHOD FOR CALCULATING AIR FLOW RATE AT CYLINDER PORT AND THROTTLE VALVE OPENING ANGLE

[75] Inventors: Teruji Sekozawa, Kawasaki; Shinsuke Takahashi, Yokohama; Makoto Shioya, Tokyo, all of Japan

[73] Assignee: Hitachi, Ltd., Tokyo, Japan

[21] Appl. No.: 98,235

[22] Filed: Jul. 29, 1993

Related U.S. Application Data

[63] Continuation of Ser. No. 640,598, Jan. 10, 1991, abandoned.

[30] Foreign Application Priority Data

Jan. 11, 1990 [JP] Japan ........................................ 2-3918

[51] Int. Cl.$^5$ ........................................ G01M 15/00

[52] U.S. Cl. ........................................ 73/118.2

[58] Field of Search ........................................ 73/118.2

[56] References Cited

U.S. PATENT DOCUMENTS

| | | | |
|---|---|---|---|
| 4,649,745 | 5/1987 | Kondo et al. | 73/118.2 |
| 4,761,994 | 8/1988 | Sogawa | 73/118.2 |
| 4,790,178 | 12/1988 | Usui et al. | 73/118.2 |
| 4,951,209 | 8/1990 | Nagaishi et al. | 73/118.2 |
| 5,012,422 | 4/1991 | Takahashi et al. | |

*Primary Examiner*—Robert Raevis

*Attorney, Agent, or Firm*—Antonelli, Terry, Stout & Kraus

[57] ABSTRACT

To improve a control characteristic of an air/fuel ratio during not only a normal driving operation, but also a transition driving operation, (1) based upon an air-flow rate measured by an air-flow rate meter, a calculation is made of pressure at an air intake manifold, and also another calculation is made of an air-flow rate at a cylinder port with employment of the calculation result and an engine revolution number.

(2) A throttle valve angle is calculated only from the calculated air flow rate and the engine revolution number without utilizing a throttle valve angle sensor.

5 Claims, 61 Drawing Sheets

FIG. 16(a)

$$A=\begin{bmatrix} -\overline{Q}(0) & -\overline{Q}(-1) & \cdots & -\overline{Q}(1-n) & Q_{MAT}(1) & Q_{MAT}(0) & Q_{MAT}(-1) & Q_{MAT}(1-m) \\ -\overline{Q}(1) & -\overline{Q}(0) & \cdots & -\overline{Q}(2-n) & Q_{MAT}(2) & Q_{MAT}(1) & Q_{MAT}(0) & Q_{MAT}(2-m) \\ \cdots & \cdots & & \cdots & \cdots & \cdots & \cdots & \cdots \\ -\overline{Q}(k-1) & -\overline{Q}(k-2) & \cdots & -\overline{Q}(k-n) & Q_{MAT}(k) & Q_{MAT}(k-1) & Q_{MAT}(k-2) & Q_{MAT}(k-m) \end{bmatrix}$$

FIG. 16(b)

$$\overline{Q}(k)=\begin{bmatrix} -\overline{Q}(1) \\ -\overline{Q}(2) \\ \\ -\overline{Q}(k) \end{bmatrix}$$

METHOD FOR CALCULATING AIR FLOW RATE AT CYLINDER PORT AND THROTTLE VALVE OPENING ANGLE

This application is a continuation of U.S. patent application Ser. No. 640,598, filed on Jan. 10, 1991, now abandoned.

BACKGROUND OF THE INVENTION

The present invention generally relates to a method for controlling an engine of a vehicle. More specifically, the present invention is directed to a method for calculating an air flow rate at a cylinder port, which is useful for an A/F ratio control during acceleration/deceleration driving operations of a vehicle, and furthermore to a method for calculating a throttle valve opening angle employed in a transmission control, a suspension control and the like.

In principle, according to a basic idea for a fuel supply to an engine, the fuel is injected in such a manner that a target A(air)/F(fuel) ratio is achieved with respect to an air flow rate at a cylinder port. However, it is very difficult for the present engine control technique to correctly detect such an air flow rate at the port of the cylinder, especially, during a transition driving condition.

There are the below-mentioned reasons why the correct air-flow rate calculation cannot be achieved:

(a). An air-flow rate sensor for measuring an air flow rate, in principle, does not measure the air flow rate at the cylinder port, but measure the air flow rate which passes through a portion adjacent to a throttle valve. As a result, there is a difference between these air-flow rates during the transition driving operation of the vehicle.

(b). There are a flap type sensor and a hot wire (H/W) sensor as the air-flow sensor, which own a measurement lag. Although the response characteristic of the H/W sensor is superior to that of the flap type sensor, there exists a slight delay due to a heat capacity.

(c). Since the air flow rate measured by the H/W sensor contains pulsations produced by driving cylinders of an engine and also measuring noises, a lag filter is employed so as to eliminate these noises and pulsations. As a result of such a smoothing process, this smoothing process may cause a delay.

(d). With respect to timings for performing a fuel injection, for instance, if the fuel injection would be performed based upon the air-flow rate when the measurement is made during the deceleration operation, the fuel injection by the injector would be completed, and therefore the air-flow rate at a time instance when air was mixed with the fuel and taken into the cylinder port would become greater than the air-flow rate at the measurement time instant. In other words, there is a difference between the air-flow rate at the measurement time instant and the air-flow rate at a time instant when an actual control is performed.

As previously described, since there are problems in the control mechanism and measuring process at the engine control apparatus, the air-flow rate at the cylinder port could not be precisely detected during such a transition driving operation as the acceleration/deceleration.

To solve the above-described conventional problem (a), an air-flow rate Qe(n) at a cylinder port is calculated by the following equation (al):

$$Qe(n)=(1-K_F)Qe(n-1)+K_FQa(n) \quad (a1)$$

It has been proposed to calculate a fuel injection amount based upon the calculated air-flow rate so as to control the air/fuel ratio. It should be noted that symbol Qa(n) indicates an air-flow rate measured by an air-flow rate sensor and symbol "n" denotes a time instant in the above-described equation (al).

The above equation (al) has an aim to correct by way of a first order lag filter, a difference between an air-flow rate at a cylinder port and a measured air-flow rate when an air intake manifold is filled with air during, for instance, an acceleration operation. It should be noted that the coefficient "$K_F$" of the equation (al) is determined by the engine revolution number and volume efficiency. Since several uncertified elements are involved when this coefficient $K_F$ is actually determined and furthermore the conventional problems (b) to (d) are still present, it is rather difficult to obtain such a coefficient $K_F$ for precisely and continuously controlling the air/fuel ratio even during the above-explained transition operation period. Also, there are similarly problems in the following equation (a2) where a fuel injection amount $T_p$ is subjected to the smoothing process:

$$T_{pe}(n)=(1-K_F)T_{pe}(n-1)+K_FT_p(n) \quad (a2)$$

where symbol "$T_{pe}$ indicates a fuel injection amount at a cylinder port.

On the other hand, with respect to the above-described problems (b) to (d), for instance, there has been proposed that the measured air-flow rate is subjection to a first order lead filter process so as to compensate these lags:

$$Qae(n)=Qa(n)+d\{Qa(n)-Qa(n-1)\} \quad (a3)$$

In case that the measured lag in the air-flow rate as described in the above-described conventional problems (b) to (d) is compensated by performing the lead filtering process as defined in the equation (a3), the pulsations and measuring noises are contained in the measured air-flow rate. As a consequence, the noise application caused by the lead filtering process will be produced. When such a signal containing the noise is used as a fundamental signal for determining the fuel injection amount, there is another problem to cause fluctuation in the fuel injection. It should be noted that coefficient "d" expressed in the above equation (a3) may be determined by the sampling period and the like.

Furthermore, either the asynchronous injection amount, or the asynchronous injection pulse width is obtained, as described in the publication "Electronic Controlled Gasoline Injection" by Fujisawa et al., issued in July 1987 by Sankaido publisher, pages 116 to 117, by utilizing the throttle-valve-angle data and by retrieving the values of the memory map based upon the variation in the throttle valve opening angle data. According to this conventional technique, the variations in the throttle valve opening angles are subdivided into several levels, and thus the asynchronous injection amount is determined by recognizing to which acceleration level, the variations in the measured throttle value opening angle belong. However, this conventional technique does not correspond to a basic method for grasping a phenomenon, but rather to a so-called "symtomatic treatment", and has such a difficulty that a huge number of matching steps are necessarily required for the memory map.

Also, another conventional method for aiming prevention to these conventional problems (a) to (c) and of the air-flow rate sensor due to a cost reduction, has been described in, for example, JP-A-63-32144. In this conventional method, for normal or steady air-flow rate is obtained from the throttle valve angle and engine revolution number, and the lag processing operation is performed so as to detect the air-flow rate at the cylinder port. However, there are other problems with this conventional method in order to obtain the air-flow rate at the cylinder port in higher precision. That is to say, no only variations in pressure at the upper stream of the throttle valve must be considered, but also the temperature at the suction pressure, the air flow rate passing through the bypass tube, and EGR (Exhaust Gas Recirculation), namely air-flow rate while recirculating the exhaust gas must be taken into account. In addition thereto, the mounting precision of the throttle-valve-opening-angle sensor may give a great influence to the air/fuel ratio controlling characteristic, for instant, if the mounting positional error of the throttle valve angle sensor becomes 0.1°, then there are produced 4% errors in the air/fuel ratio.

As previously described, although many attempts have been made to correctly detect the air flow rate at the cylinder port, the conventional problems could not yet completely solved. It should also be noted that there is a change in a relationship between the air-flow rate passing through the throttle valve and the air-flow rate at the cylinder port in connection with variations in the ambient conditions.

Next, other conventional technical methods for solving the above-described problems (a)-(d), and their problems will now be described, in which the fuel injection amount has been corrected based upon the variations in the throttle valve opening angles, instead of correctly detecting the air flow rate at the cylinder port.

In prior art, since there are complex problems in the above described conventional problems (a) to (d) and the fuel supply delays caused when the injected fuel is attached to the air-intake wall surface, the corrections based upon the throttle valve angle capable of detecting the transition driving operation such as the acceleration/deceleration operations at first in order to correct the deterioration of the control characteristic for the air/fuel ratio. For instance, in the conventional fuel injection controlling method, when the engine is brought into the acceleration state, the fuel injection amount is corrected based upon the increase in the throttle valve opening angle. This correction is performed by increasing the fuel injection amount in response to the increase in the air-intake flow rate, depending upon the variations in the throttle valve opening angle, and by making the necessary adjustment on the basic fuel injection pulse width which is obtained by the air-intake flow rate or the pressure at the air intake manifold, and also the engine revolution number. Thus, the fuel is supplied in response to the fuel injection pulse to which other corrections have been added, based on other measurement data, e.g., water temperatures.

Then, the fuel supply is carried out in synchronism with the crank angle. As another method for correcting the acceleration operation, the asynchronous fuel injection in which the fuel is injected under the asynchronous condition with the crank angle has been performed. This asynchronous fuel injection can prevent the air/fuel ratio from becoming lean (e.g., condition that the fuel supply is not satisfied in order to allow the air-flow rate) in such a rapid acceleration mode that the sufficient fuel cannot be supplied in case of the synchronous fuel injection.

Another method for reducting a fuel injection amount based upon a variation in a throttle valve opening angle has been proposed during not only an acceleration state but also a deceleration state. This conventional correcting method is to prevent that the air/fuel ratio is enriched (i.e., condition that too much fuel is supplied for the air-flow rate) during the deceleration operation.

As previously described, the conventional techniques for correcting the fuel injection amount based upon the throttle valve opening angle, and also for matching various sorts of correction coefficients so as to improve the control characteristic of the air/fuel ratio, could be established under the recent exhaust gas controlling regulations.

It should be understood that in order to obtain the above-described throttle valve angle, there are many possibilities. That is to say, the throttle valve angle sensor is not employed, but either an acceleration pedal angle, or an acceleration pedal position may be detected to used as the throttle valve angle if the throttle is mechanically coupled to the acceleration pedal.

Furthermore, in accordance with the throttle controlling method in which the throttle is electronically coupled to the acceleration pedal, namely the acceleration pedal angles are employed as a major input, and then the throttle is controlled by the motor or the like, since the acceleration pedal angles have been measured, and the throttle valve angles may be easily calculated, this electronic throttle-valve-angle detecting method may be utilized.

Also, since the throttle-valve-angle signal has been utilized for various control apparatuses involving the engine control, as described below, this angle signal functions as an important control signal.

First, in the conventional engine control, the fuel injection control and injection timing control have been performed based upon the throttle-valve-angle signal. As a consequence, various correction methods have been established under such an initial condition that the throttle valve-opening-angle signal has been acquired.

Furthermore, in the automobile controls other than the engine control, there are transmission controls, traction controls and suspension controls as such controls for requiring the throttle valve opening angle. For instance, in the transmission control and the like a control is made in such a manner that a gear position is selected based upon the throttle valve angle and vehicle velocity, or the engine revolution number, and then the throttle-valve-angle signal per se functions as important information.

Originally, in order to improve the air/fuel ratio controlling characteristic, it has been understood that an air flow rate at a cylinder port during a transition driving condition should be detected or inferred. However, the following problems remain.

(i). No method for precisely inferring or determining an air flow rate at a cylinder port has been established, and also been practically utilized.

(ii). Even when such an air-flow rate at the cylinder port could be correctly grasped, the control characteristic of the air/fuel ratio is still deteriorated, because there are such problems that as described in the above-described problem (d), the air-flow rate is increased depending on the fuel injection timings, and also the fuel attached to the wall surface of the air intake manifold causes a delay in the fuel injected into the cylinder.

As previously described above, in accordance with the conventional fuel injection controlling methods, various corrections for the fuel injection amounts have been performed based on the throttle valve opening angle which corresponds to the most rapid information used when the transition driving operations, e.g., the acceleration/deceleration operations are carried out. There is another problem that the throttle valve angle sensor must be necessarily required in order to improve the air/fuel ratio controlling characteristic by way of the above explained conventional methods.

On the other hand, if such a throttle valve angle sensor is employed, the above-described other problems (i) and (ii) still remain.

SUMMARY OF THE INVENTION

A primary object of the present invention is to provide a novel method for calculating an air flow rate at a cylinder port, while solving the above-described problems involved in prior art.

The primary object of the present invention may be achieved by employing the below-mentioned process (1) or (2).

(1). In an electronic engine controlling apparatus comprising means for detecting an engine revolution number, and means (air-flow rate meter) for detecting an air flow rate taken into the engine, there are provided means for calculating pressure at an air intake manifold and means for calculating an air-flow rate at a cylinder port; the pressure at the air intake manifold is calculated based upon the detected air-flow rate and the air-flow rate at the cylinder port which has been calculated by the means for calculating the air-flow rate at the cylinder port at one preceding measurement time instant; and an air-flow rate at the cylinder port at a present measurement time instant based on the engine revolution number and the calculated pressure at the air intake manifold.

(2). In an electronic engine controlling apparatus comprising means for measuring a throttle valve opening angle, means for detecting an engine revolution number, and means for detecting an air-flow rate, there is provided means for predicting a value at a predetermined preceding time instant from a measured throttle valve angle; based upon the throttle valve angle predicted by the predicting means and also the engine revolution number detected by the engine revolution number detecting means, a shift between-the air-flow rate detected by the air-flow rate detecting means and the air-flow rate at the cylinder at said predetermined preceding time instant is inferred by way of a predetermined calculation; the detected air-flow rate is corrected by the shift; and the air-flow rate at the cylinder port at said predetermined preceding time instant is calculated.

In accordance with the above-described process (1), based on both the measured air-flow rate and the engine revolution number, the pressure at the air intake manifold is calculated, the air-flow rate at the cylinder port is calculated based upon the calculated pressure at the air intake manifold, and also thus the fuel injection amount is determined based upon this calculated air-flow rate at the cylinder port. As a consequence, the air/fuel ratio may be properly controlled.

Also, in accordance the above-described process (2), an air-flow rate with a measurement lag corresponding to a variation in a throttle valve angle is obtained; so that an air-flow rate measured by a air-flow rate meter is adjusted, a pressure value at an air intake manifold is calculated based upon thus adjusted air-flow rate and the engine revolution number, and then, a correct air-flow rate at an air intake manifold is calculated based upon the pressure at this air intake manifold. Furthermore, since a fuel injection amount is determined based upon this air-flow rate at the cylinder port, an air/fuel ratio may be suitably controlled.

In addition, if the more accurate air-flow rate at the cylinder port obtained by the above-described process (1) or (2), is employed as the measured air-flow rate which has been utilized so as to calculate the ignition timings in the conventional ignition control, the overshoot phenomenon occurring at the acceleration operation may be avoided. Also, this accurate air-flow rate may be employed for a decision on a proper ignition timing.

A secondary object of the present invention is to solve the above-described problems (i) and (ii), and therefor to provide a method for calculating a throttle-valve-angle signal required for various types of control apparatuses, in which a total cost of the control apparatus may be lowered without requiring a throttle-valve-angle sensor, and also an optimum air/fuel ratio control may be achieved even under not only the normal driving state, but also the transition driving state such as acceleration/deceleration operations.

The secondary object may be achieved by the following process. That is to say, in an electronic engine controlling apparatus comprising means for measuring an air-flow rate taken into an engine and means for detecting an engine revolution number, and for properly controlling a mixture ratio of the air-flow rate to a fuel amount to the engine, and simultaneously performing a transmission control, a suspension control, and a traction control, a throttle valve opening angle required for various controls is calculated based on the measured air-flow rate and engine revolution number.

In accordance with the present invention, optimum air/fuel ratio may be calculated by utilizing a software based upon the taken air-flow rate and engine revolution number with respect to the L-jetronic (trade name) system engine, and also based upon the pressure at the air intake manifold and engine revolution number with respect to the D-jetronic (trade name) system engine. In particular, the transition driving conditions such as the acceleration/deceleration operations are judged in order to accept various driving conditions, whereby the air/fuel ratio suitable for the desirable precision may be calculated.

Furthermore, when this calculated value is employed as the throttle-valve-angle value which has been acquired by the conventional throttle valve sensor, this value may be used, for instance, as a control signal for a transmission signal other than the engine control.

BRIEF DESCRIPTION OF THE DRAWINGS

FIGS. 16(*a*) and 16(*b*) explain a vector;

DESCRIPTION OF THE PREFERRED EMBODIMENTS

Figure 1:
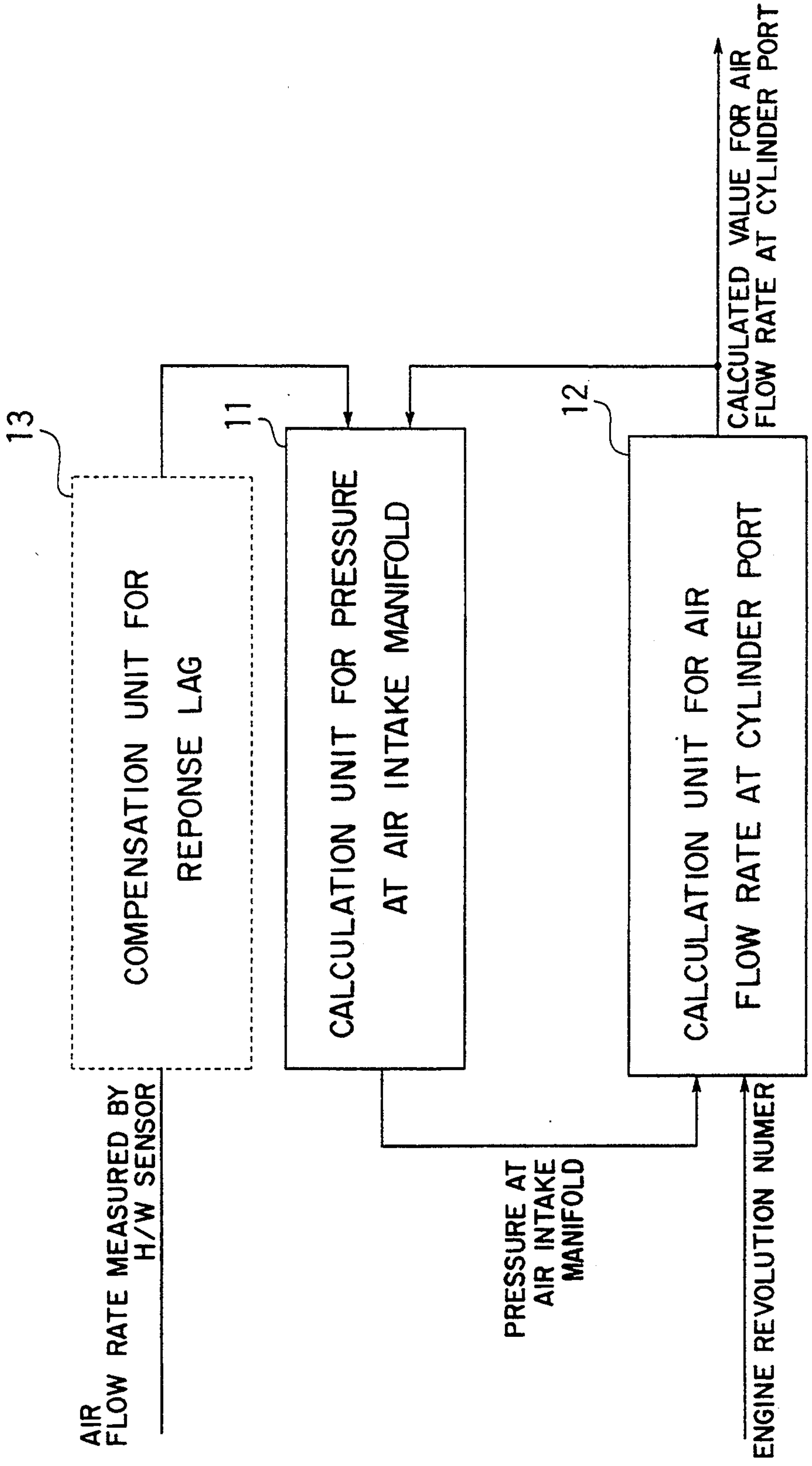
FIG. 1 is a schematic block diagram for representing an arrangement of a first preferred embodiment according to the present invention.

FIG. 1 is a schematic block diagram for representing both an arrangement and an operation of a process for calculating an air flow rate at a port of a cylinder according to a first preferred embodiment of the present invention. As an entire arrangement of this preferred embodiment, both an air flow rate measured by an H/W (hot wire) sensor and a number of engine revolutions obtained by an engine revolution number detecting unit are used as an input in order to calculate an air flow rate at a port of a cylinder. It should be noted that the H/W sensor measure an air flow rate adjacent a throttle valve.

Based upon both the air flow rate at the cylinder port which has been previously obtained at a previous time instant, and the air flow rate measured by the H/W sensor, pressure in an air intake manifold is calculated by a calculation unit 11 for pressure at the air intake manifold. Subsequently, based on both the resultant pressure at the air intake manifold and the engine revolution number measured by the engine revolution number calculation unit, an air flow rate at the part of the cylinder is newly calculated at a present time instant by a calculation unit 12 for air flow rate at the cylinder port.

Figure 2:
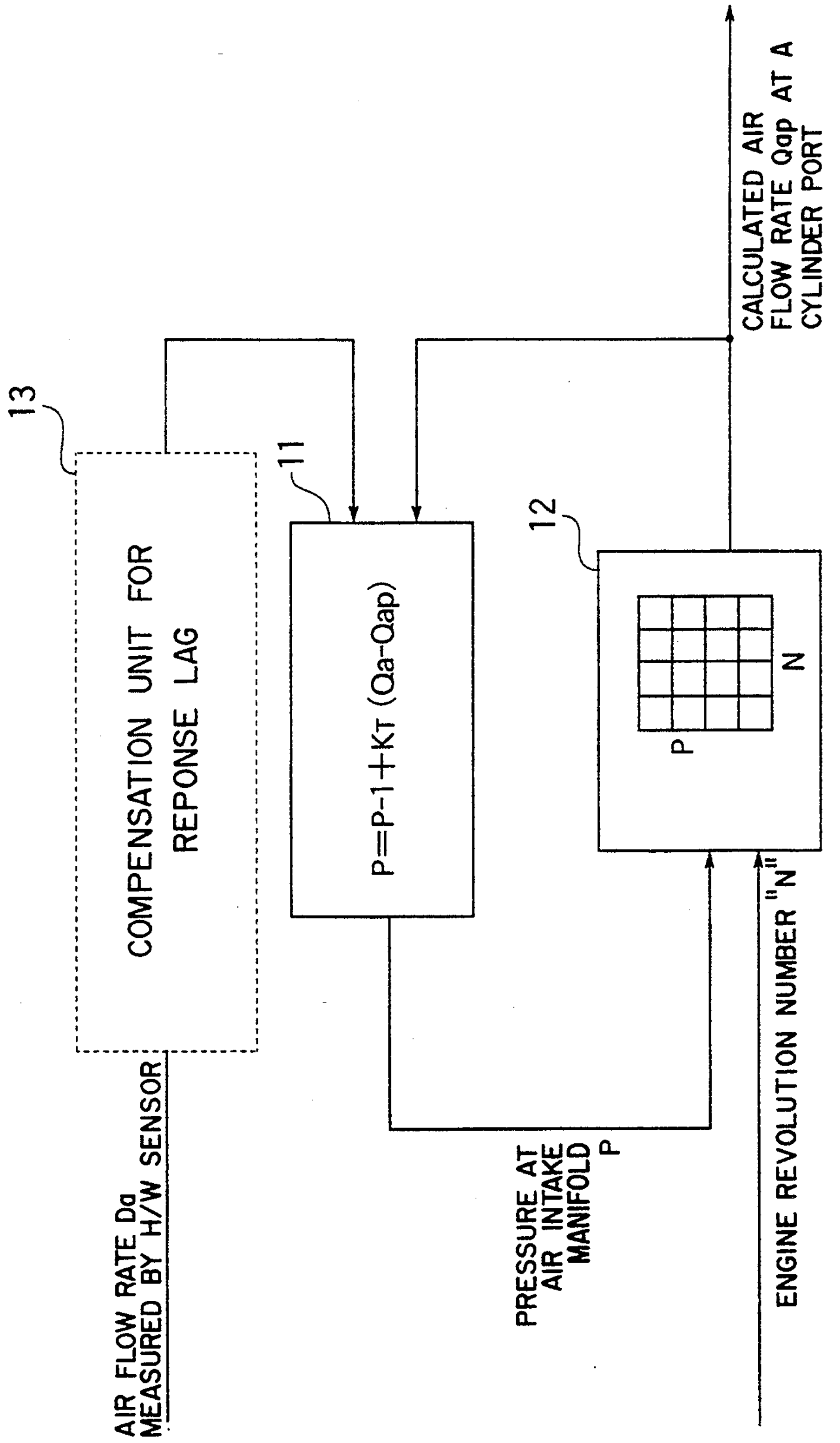
FIG. 2 is a schematic block diagram for showing a detailed arrangement of the first preferred embodiment.

FIG. 2 is a schematic block diagram of a detailed arrangement according to the first preferred embodiment. That is to say, this system is constructed of the calculation unit 12 for air flow rate at the cylinder port which has previously stored therein as map data the air flow rate at the cylinder port corresponding to the pressure at the air intake manifold and the engine revolution number "N"; and the calculation unit N for pressure at the air intake manifold which calculates the pressure at the air intake manifold by sequentially updating the pressure "P" at the air intake manifold based upon a difference between an air flow rate "$Q_a$" measured by the H/W sensor and another air flow rate "$Q_{ap}$" at the cylinder port.

The map data of the above-described calculation unit 12 for air flow rate at the cylinder port has been acquired in such a manner that both the pressure "P" at the air intake manifold and the engine revolution number "N" are statically changed by a unitary test for an engine. It should be noted that assuming now that an air flow rate near a throttle valve is equal to an air flow rate under a static condition, there is no need to directly measure an air flow rate at a cylinder port and therefore this flow rate may be substituted by a measurement value obtained from an H/W sensor which measures an air flow rate near the throttle valve. It should also be noted that the resultant air flow rate at the cylinder port obtained under the static condition has been stored into a ROM (read-only memory) employed in an engine control unit (not shown) as such a two dimensional map data that the pressure "P" at the air intake manifold and the number of engine revolutions are indicated an axis. Since the air flow rate at the cylinder port is read out based upon the corresponding values on the axis of the two-dimensional map by way of either a four-point interpolation calculation, or a two-point interpolation calculation, and an interpolation on the two-dimensional map, and these calculation methods correspond to the conventional calculation methods, no further explanation thereof is made in the specification.

Figure 3:
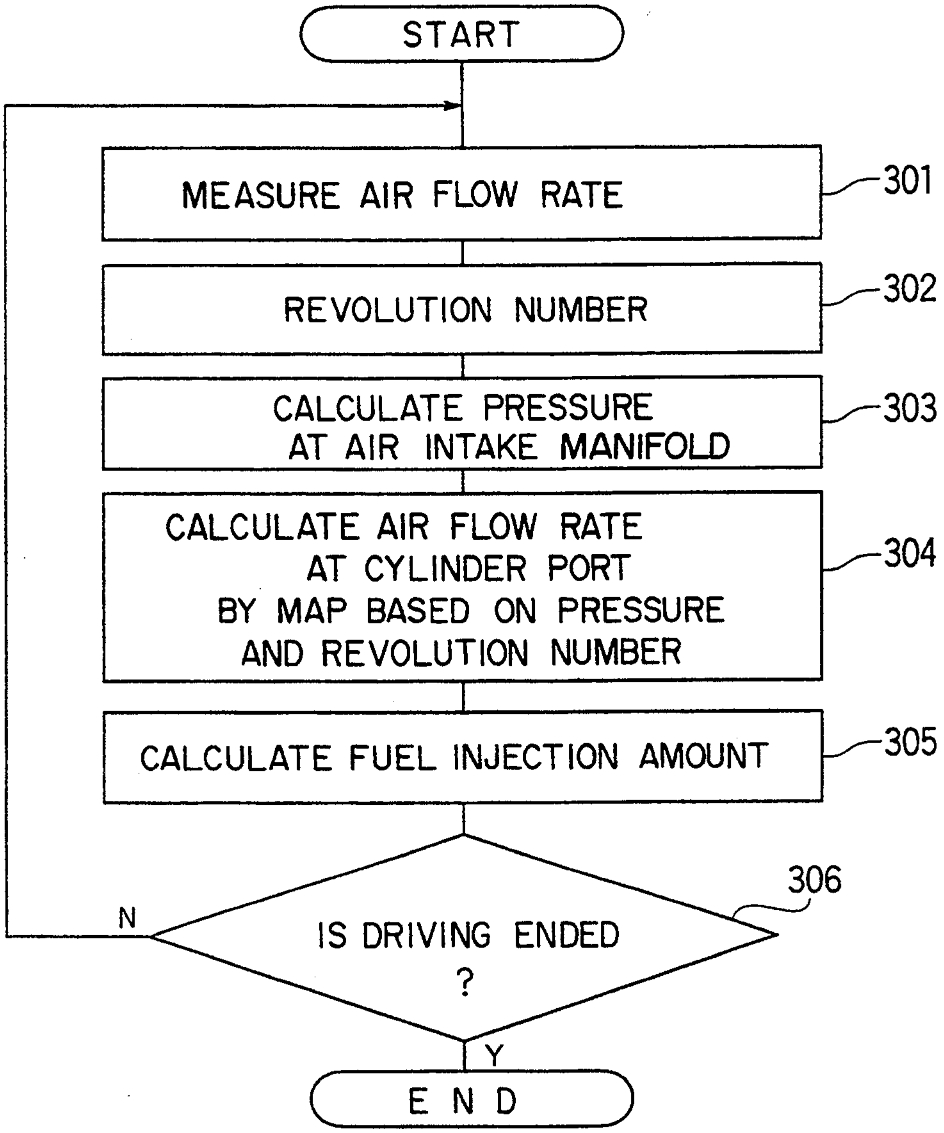
FIG. 3 is a flowchart for explaining an operation of the detailed arrangement shown in FIG. 2.

In FIG. 3, there is shown a flowchart for indicating an operation of the arrangement shown in FIG. 2. A detailed operation will now be explained based upon this flowchart.

While an engine is started, an air flow rate is measured from time to time by the above-described H/W sensor at a step 301. Also the number of engine revolutions is measured by the engine revolution number detecting unit at a step 302. Then, the pressure "P" at the air intake manifold is calculated at a step 303 based upon both the air flow rate "$Q_{ap}$" at the cylinder port which has been previously obtained at the preceding time instant and the air flow rate "$Q_a$" measured at a present time instant, in accordance with the following equation (1):

$$P=P_{-1}+K_T(Q_a-Q_{ap-1}) \quad (1)$$

where symbol "$P_{-1}$" indicates the pressure at the air intake manifold obtained at the previous time instant. This pressure "$P_{-1}$" has been temporarily stored in a RAM (random access memory) of the control unit. Also, the air flow rate "$Q_{ap-1}$" at the cylinder port obtained at the preceding time instant is stored within this RAM, and is utilized as shown in the equation (1) at the present time instant. Based upon the pressure "P" at the air intake manifold at the present time instant, calculated at the step 303, and the engine revolution number "N" measured at the step 302, the corresponding air flow rate "$Q_{ap}$ at the cylinder port is obtained by utilizing the above-described two-dimensional map at a step 304. With employment of the new air flow rate at the cylinder port acquired at a present, a fuel injection amount (i.e., a pulse width "$T_p$" of fuel injection) may be obtained in the manner similar to the conventional method at a step 305 as follows:

$$T_p = K_i\frac{Q_{ap}}{N} + T_d \quad (2)$$

where symbol "$K_i$" is a coefficient, and symbol "$T_d$" is a pulse width of invalid injection. At a next calculation period, the process is returned to a step 301. When a key is turned off, driving operation is completed and the above-described process sequence is ended.

Although the air flow rate at the cylinder port was employed so as to calculate the amount of the fuel injection as shown in FIG. 3, the above-described measured air flow rates are employed and $Q_{ap}/N$ may be utilized instead of $Q_a/N$ as the value for calculating a basic ignition timing for controlling other engine controls, for instance, an ignition timing control. As a result, since a stable signal $Q_{ap}/N$ having no overshoot may be produced during acceleration of an engine, the ignition timings are not excessively fluctuated during a transition time period and therefore a stable torque output may be obtained. Thus, there is a merit that vibrations and the like are suppressed.

According to the above-described first preferred embodiment, even during the transition operation period, the stable signal may be obtained in such a manner that no overshoot occurs in the air flow rate at the cylinder portion, and also an air/fuel ratio may be easily and precisely controlled to a desirable value. It should be noted that with employment of a response lag compensating unit (lead filter) 13 for the H/W sensor as indicated by a dot line of FIG. 1, precision of air flow rate measurement may be improved whereby the more stable signal may be obtained.

Figure 4:
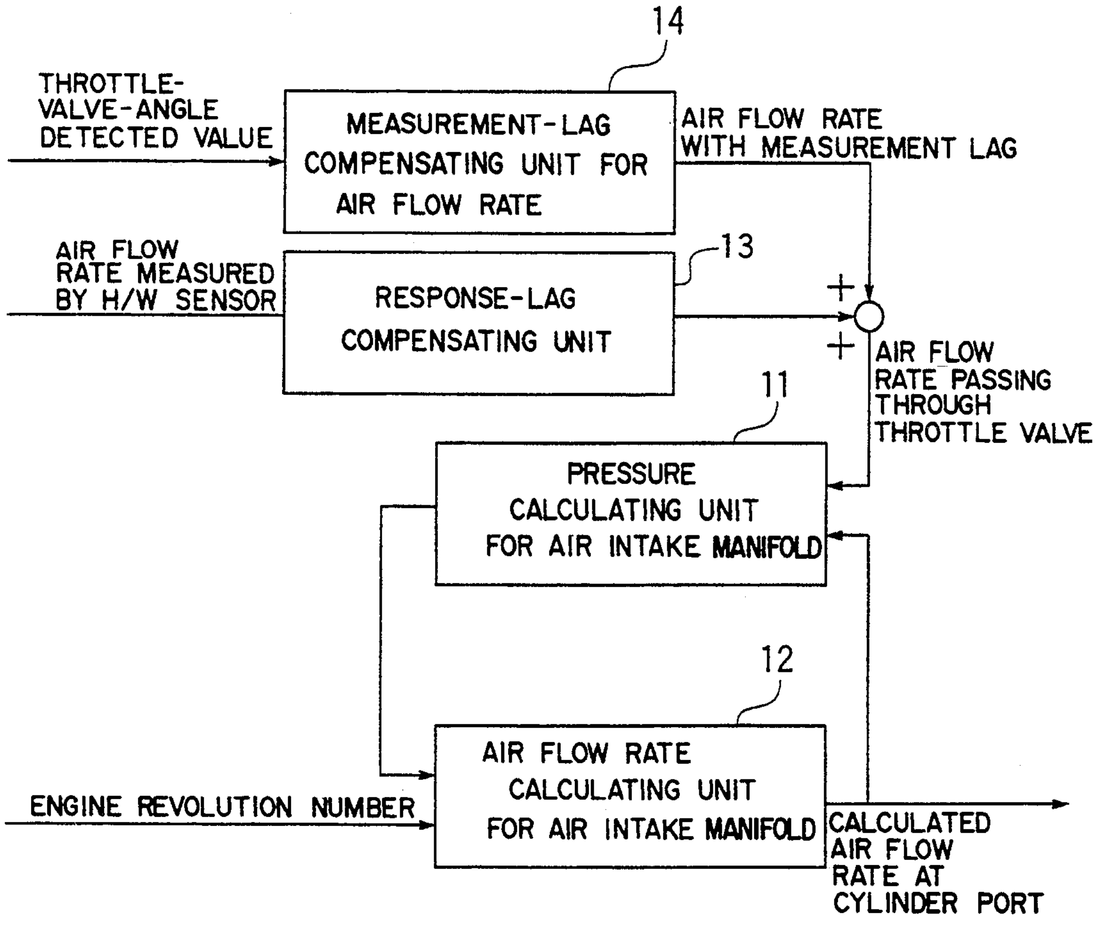
FIG. 4 is a schematic block diagram for representing an arrangement of a second preferred embodiment according to the present invention.

FIG. 4 is a schematic block diagram for representing an arrangement and an operation of an engine control unit for calculating an air flow rate at a cylinder port according to a second preferred embodiment of the present invention. The overall arrangement of this preferred embodiment is featured in that the air flow rate at the cylinder port is calculated by employing as an input, an air flow rate measured by an H/W sensor, an engine revolution number obtained by an engine revolution number detecting unit, and a throttle valve angle detected by a throttle valve angle detecting unit.

At a measurement-lag compensating unit 14 for air flow rate, a calculation is made of an air flow rate corresponding to a measuring lag in the air flow rate measured by the H/W sensor based upon the detected value of the throttle valve angle. Next, an air flow rate passing through the throttle valve is obtained by adding the air flow rate corresponding to the measurement lag calculated in the measurement-lag compensating unit 14 for air flow rate, to the air flow rate measured by the H/W sensor, which has been processed in the response lag compensating unit (lead filter) 13. Subsequently, based upon the air flow rate at the cylinder port obtained at the previous time instant and the above-described air flow rate passing through the throttle valve, pressure at the air intake manifold is calculated by the pressure calculating unit 11 for the air intake manifold, and based on the calculated pressure and the above-described engine revolution number, an air flow rate at the cylinder port is newly calculated in the air-flow calculating unit 12 for the cylinder port, which is similar to the first preferred embodiment.

Figure 5:
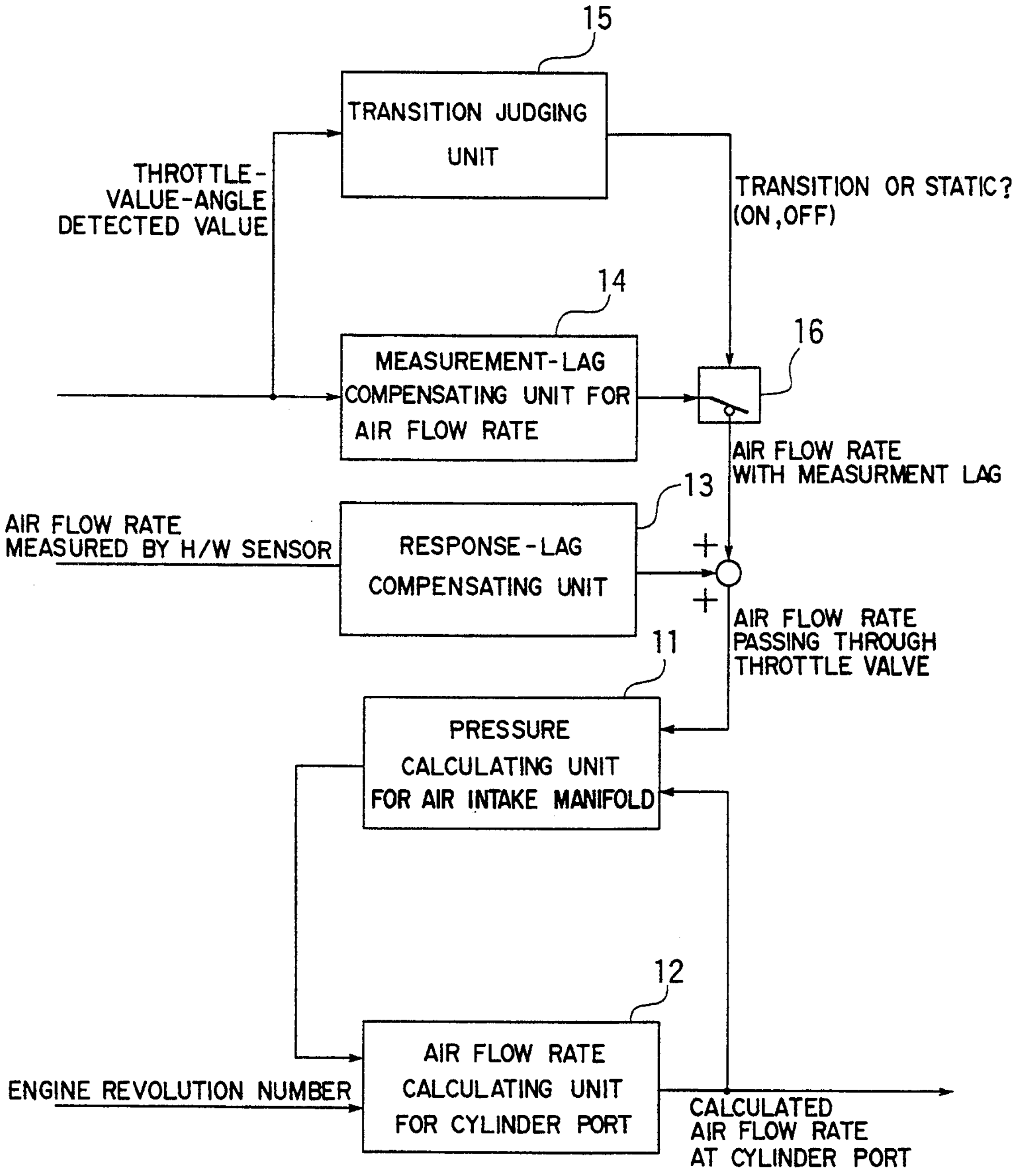
FIG. 5 is a schematic block diagram for showing a condition to obtain an air flow for a measuring lag in the embodiment shown in FIG. 4.

In FIG. 5, there is shown such a condition that an air flow rate is used which corresponds to the measurement lag calculated in the measurement lag compensating unit 14. A transition judging unit 15 judges whether an acceleration operation or a deceleration operation is carried out based upon the throttle valve angle. In case of a transition driving condition, a switch 16 is changed over so that an air flow rate corresponding to the measurement lag calculated in the measurement-lag compensating unit 14 for the air flow rate is added to an air flow rate measured by the H/W sensor. In the arrangement shown in FIG. 5, the air flow rate corresponding to the measurement lag is continuously calculated, only when the transition driving state is realized, the switch 16 is changed over whereby this air flow rate is summed with that measured by the H/W sensor. However, the present invention is not limited thereto. That is to say, only when a judgement is made of the transition driving state, the air flow rate corresponding to the measurement lag is calculated and may be added to the air flow rate measured by the H/W sensor.

Figure 6:
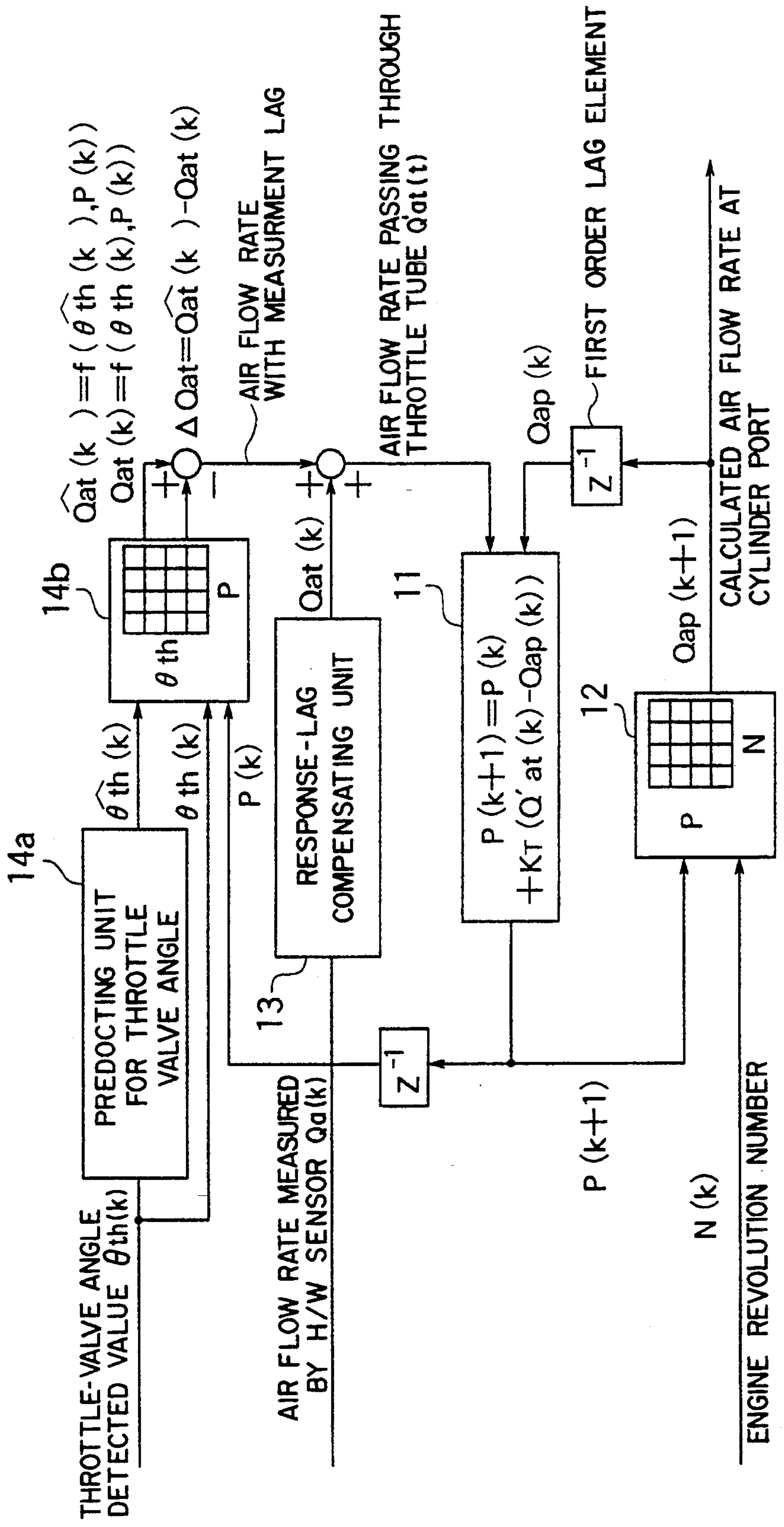
FIG. 6 is a schematic block diagram for showing a detailed arrangement of the embodiment indicated in FIG. 4.

FIG. 6 is a schematic block diagram for representing the arrangement of the second preferred embodiment shown in FIG. 4 more in detail. The measurement-lag compensating unit 14 for the air flow rate shown in FIG. 4 is constructed of a throttle-valve-angle predicting unit 14a, and a measurement-lag air flow rate calculating unit 14b. In the throttle-valve-angle predicting unit 14a, based upon the detected value of the throttle valve angle, the throttle valve angle is predicted as follows..

$$\hat{\theta}_{th}(k) = \theta_{th}(k) + \frac{T_{th1}}{\Delta t}\{\theta_{th}(k) - \theta_{th}(k-1)\} \quad (3)$$

where symbol "k" denotes a present time instant; symbol "k−1" indicates one preceding time instant; symbol $\theta_{th}$(k) is a throttle valve angle at the present time instant; symbol "Δt" denotes either a calculating period or a sampling period (msec); symbol "$T_{thl}$" is a prediction width constant representing how to predict a future; and symbol $\hat{\theta}_{th}$(k) represents a predicted value of a throttle value angle at a further time instant $T_{thl}/\Delta t$ predicted at the present time.

The above-described prediction width constant "$T_{thl}$" will be discussed later in more detail. Assuming now that it is selected to be:

$$T_{thl}=\Delta t \quad (4),$$

the following description will be made. As apparent from the above-described equation (3), if it satisfies the equation (4), symbol $\hat{\theta}_{th}(k)$ represents the predicted value of the throttle valve angle acquired at one preceding time instant. That is to say, it obtains:

$$\hat{\theta}_{th}(k)=\theta_{th}(k)+\{\theta_{th}(k)-\theta_{th}(k-1)\} \quad (5)$$

Next, a map of air flow rate passing through the throttle valve employed in the measurement-lag air flow rate calculating unit 14*b* will be represented. This map data is obtained by statically changing both the throttle valve angle and the pressure at the air intake manifold by way of the unitary lest of the engine. This map data has been stored in a ROM of an engine control unit (not shown) as two dimensional map data in which the throttle valve angle and pressure at the air intake manifold constitute an axis.

An operation of an arrangement shown in FIG. 6 will now be described. After the engine is started, the throttle valve angle are measured from time to time, an air flow rate is measured by the H/W sensor, and the number of engine revolutions is measured by the engine revolution number detecting unit. As represented in the equation (5), the predicted value of the throttle valve angle $\hat{\theta}_{th}$(k) at one preceding time instant is obtained. Subsequently, based upon the throttle-valve angle predicted value $\hat{\theta}_{th}$(k) obtained at one preceding time instant and also the pressure P(k) at the air intake manifold, a predicted air flow rate $\hat{\theta}_{th}$(k) passing through the throttle valve corresponding to these valve is calculated with employment of the above-described map data. Assuming now that retrieving the values from the map data is expressed as a function "f" for the sake of convenience, it may be understood that $\hat{\theta}_{at}$(k) has been obtained as follows:

$$\hat{Q}_{at}(k)=f(\hat{\theta}_{th}(k), P(k)) \quad (6)$$

Also, if the calculation on the air flow rate $Q_{at}$(k) passing through the throttle valve with employment of the throttle-valve-angle detected value $\hat{\theta}_{th}$(k) and the pressure P(k) at the air intake manifold, is expressed by utilizing the function "f", it becomes:

$$Q_{at}(k)=f(\theta_{th}(k), P(k)) \quad (7)$$

As a result, a air flow rate $\Delta Q_{at}$(k) with measurement lag will be calculated based upon the predicted air flow rate $\hat{Q}_{at}$(k) passing through the throttle valve and the air flow rate $Q_{at}$(k) passing through the throttle valve:

$$\Delta Q_{at}(k)=\hat{Q}_{at}(k)-Q_{at}(k) \quad (8)$$

Finally, the thus obtained air flow rate $\Delta Q_{at}$(k) is added to the measured air flow rate $Q_a$(k) so as to newly calculate a corrected air flow rate $Q_{at'}$(k) passing through the throttle valve.

Thereafter, with employment of the corrected air flow rate $Q_{at'}$(k) passing through the throttle valve and also the air flow rate $Q_{ap}$(k) at the cylinder port obtained at the preceding time instant, the pressure at the air intake manifold is calculated as follows, in accordance with a similar sequence to those of FIGS. 2 and 3:

$$P(k+1)=P(k)+K_T\{Q_{at'}(k)-Q_{ap}(k)\} \quad (9)$$

Although the pressure at the air intake manifold to be obtained was "P" and the pressure at the air intake manifold obtained at the preceding time instant was "$P_{-1}$" in the arrangement shown in FIG. 2, these pressures are expressed by P(k+1) and P(k) respectively. Subsequently, based upon the calculated pressure P(k+1) at the air intake manifold and the engine revolution number N(k), an air flow rate $Q_{ap}$(k+1) at the air intake manifold corresponding to these values is calculated by utilizing the two-dimensional map data in which both the pressure at the air intake manifold and engine revolution number constitute an axis.

In accordance with the above-described preferred embodiment, the response lag by the H/W sensor is compensated or the throttle valve angle is predicted, so that the precision in measuring the air flow rate may be improved and thus the more stable signal may be obtained.

Figure 7:
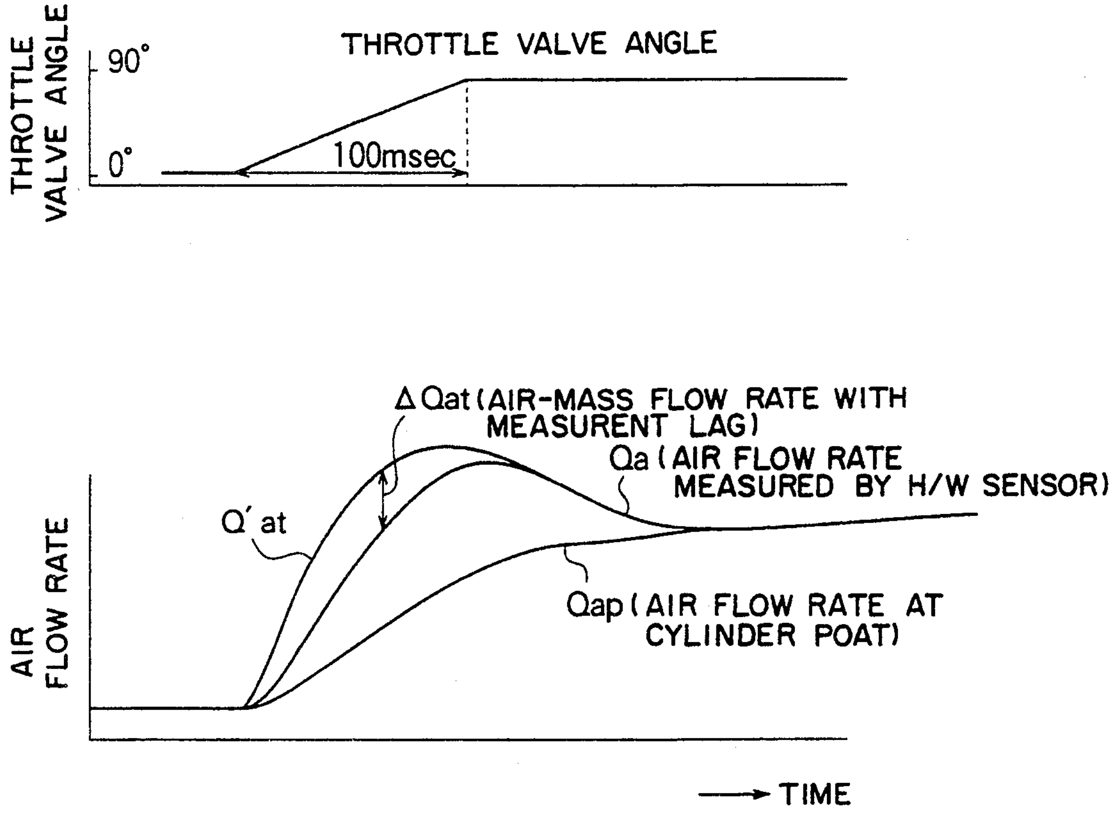
FIG. 7 graphically represents a characteristic of calculated values for an air flow of a measuring lag.

FIG. 7 represents how the calculated air flow rate with the measurement lag indicates physical characteristics. FIG. *7a* indicates the physical characteristics during rapid acceleration operation (the throttle valve is fully opened and closed within 100 msec.) FIG. *7b* represents movements of the air flow rate during the rapid acceleration operation. In other words, the air flow rate $Q_a$ measured by the H/W sensor becomes a major signal in the calculation, and is corrected by the air flow rate $\Delta Q_{at}$ with the measurement lag obtained by the throttle valve angle, whereby the air flow rate $Q_{at'}$ passing through the throttle valve. Then, this flow rate $Q_{at'}$ becomes an input for calculating the pressure at the air intake manifold, and therefore the air flow rate $Q_{ap}$ at the cylinder port is calculated based upon the equation (9) and the (P, N) map utilized in the air flow rate calculating unit 12 at the cylinder port.

In accordance with this preferred embodiment, since the pressure at the air intake manifold is obtained as defined in the equation (9), from a difference between the air flow rate $Q_{at}$ passing through the throttle valve at the air flow rate $Q_{ap}$ at the cylinder port, the calculated pressure value does not represent the overshoot phenomenon during the acceleration/deceleration operations. Also, based on the pressure value at the air intake manifold calculated in the above manner, the air flow rate $Q_{ap}$ at the cylinder port which has been calculated from the (P, N) map in the air flow rate calculating unit 12 at the cylinder port does not represents the overshoot phenomenon, and therefore clearly represents that the air intake manifold is actually filled with air. As a consequence, there is a feature that the precision in the predicted air flow rate $Q_{ap}$ at the cylinder port may be improved. It should be noted that this feature is similarly realized in the above-described first preferred embodiment.

Figure 8:
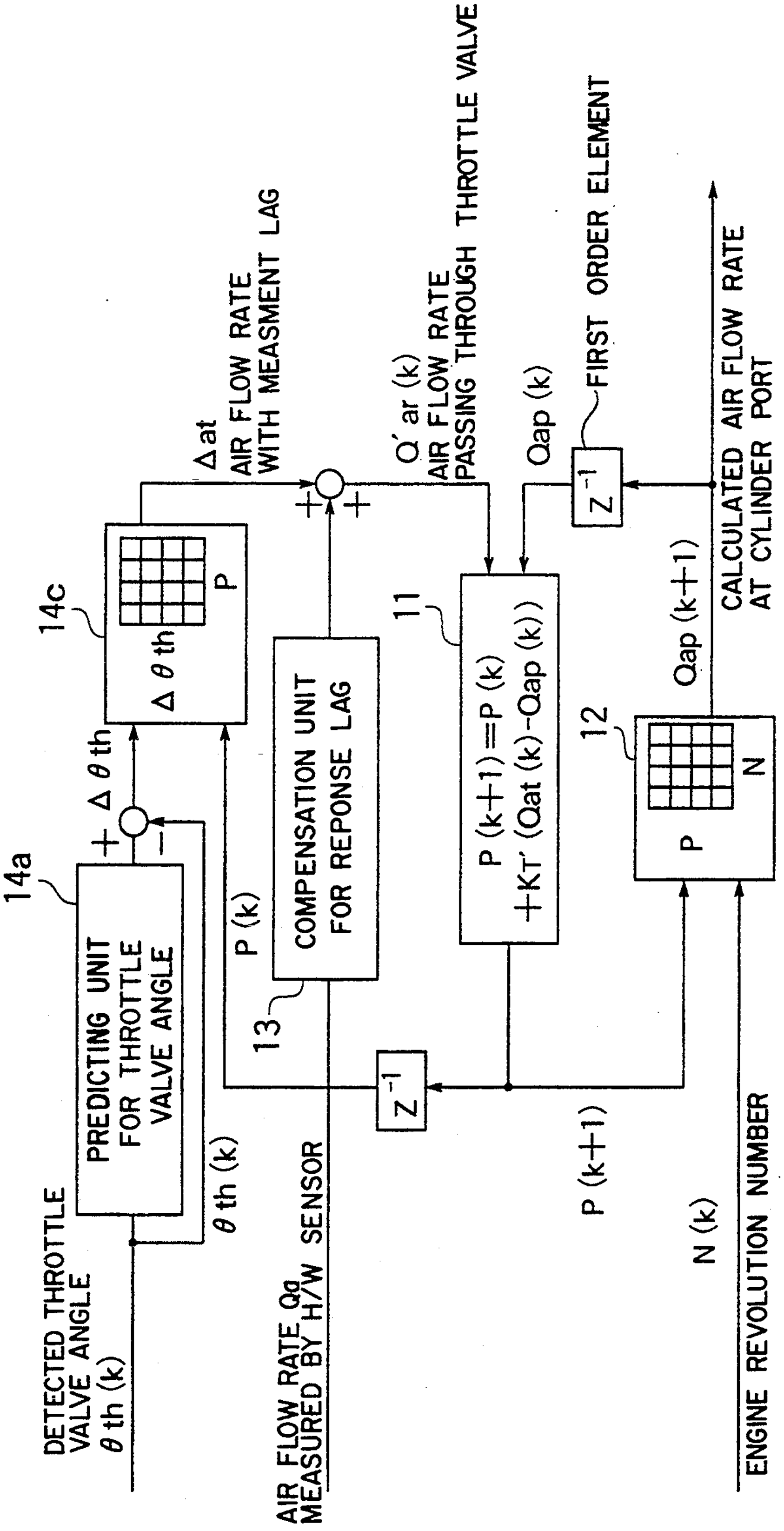
FIG. 8 is a schematic block diagram for showing a construction according to a third preferred embodiment of the present invention.

FIG. 8 is a schematic block diagram for showing an arrangement and an operation of an engine control unit for calculating an air flow rate at a cylinder portion according to a third preferred embodiment of the present invention. This engine control unit is realized by modifying the above-described method for calculating an air flow rate $\Delta Q_{at}$ with the measurement lag effected in the embodiment shown in FIG. 6. Although the throttle valve angle predicting unit 14*a* represented in this preferred embodiment is substantially same as that shown in FIG. 6, other circuit arrangements thereof are different from those of FIG. 6. That is to say, calculation is made of a difference between the predicted value $\hat{\theta}_{th}$(k) for the throttle valve angle obtained by the throttle-valve-angle predicting unit 14*a*, and the detected value $\theta_{th}(k)$ for the throttle valve angle (referred to as "a predicted value for changes in the throttle valve angle" and indicated as "$\Delta\theta_{th}$"), and the air flow rate $\Delta Q_{at}$ in measurement lag corresponding to this predicted value $\Delta\theta_{th}$ and the pressure at the air intake manifold has been stored as a memory map. Then, based upon the above-described predicted value for changes in the throttle valve angle and the pressure value at the air intake manifold obtained in the calculating unit 11 for the pressure at the air intake manifold, the air flow rate $\Delta Q_{at}$ in the measurement lag is retrieved from the above memory map, and thus, the air flow rate measured by the H/W sensor is adjusted based upon the air flow rate in this measurement lag.

The above-explained map data on the air flow rate in the measurement lag may be obtained in such a manner that the pressure in the air intake manifold is stationary changed by way of the unitary test for the engine so as to step wisely subdivide variation amounts of the throttle valve angles, and differences between these air flow rates, namely difference between the air flow rates when the throttle valve is closed and opened are obtained.

In the preferred embodiments as shown in FIGS. 6 and 8, it is a matter how to predict a future while the throttle valve angle is predicted in the throttle-valve angle predicting unit. The prediction width while predicting the throttle valve angle may be determined by compensating for these conventional problems (b) to (d). In the description with respect to FIG. 6, the predicted value of the throttle valve angle was set at one preceding time instant. This is because the compensation was carried out, assuming now that the measurement was done for the air flow rate which actually passes through the throttle valve at one succeeding time instant.

As another idea for determining this prediction width, there exists compensation for the problem (d). This problem (d) relates to such a case that after the fuel is started to be injected, until the fuel is entered into the cylinder during the air intake stroke, the air flow rate is changed, i.e., stroke delay. It may be conceived that this stroke delay corresponds to approximately 180° at the crank angle, i.e., on stroke. Accordingly, there exists a method for determining the prediction width in such a manner that the above-described throttle valve angle corresponds to time required for 180° of the crank angle. A prediction width constant "$T_{thl}$" in the equation (3) may be expressed by way of the engine revolution number "N":

$$T_{thl} = \frac{3000}{N} \text{ (msec)} \quad (10)$$

Furthermore, as another method for determining the prediction width, there is a method for compensating the above-described problem (b) or (c) such that if either the delay characteristic of the H/W sensor per se mentioned in the problem (b), or the time constant of the lag filter mentioned in the problem (c) is known, this time lag may be set as the prediction width.

Assuming now that the delay characteristic of the H/W sensor may be estimated by the first order lag and the time constant thereof is $T_{HW}$, the prediction width $T_{thl}$ may be set as follows:

$$T_{thl} = T_{HW} \quad (11)$$

Also, assuming that the time constant of the lag filter after the H/W sensor measurement is $T_{FL}$, the prediction width may be set:

$$T_{thl} = T_{FL} \quad (12)$$

$$T_{thl} = TH_W + T_{FL} \quad (13)$$

It should be noted that the equation (12) compensates only the lag filter, whereas the equation (13) compensates a combination of the lag caused by the H/W sensor and the lag caused by the lag filter.

Figure 9:
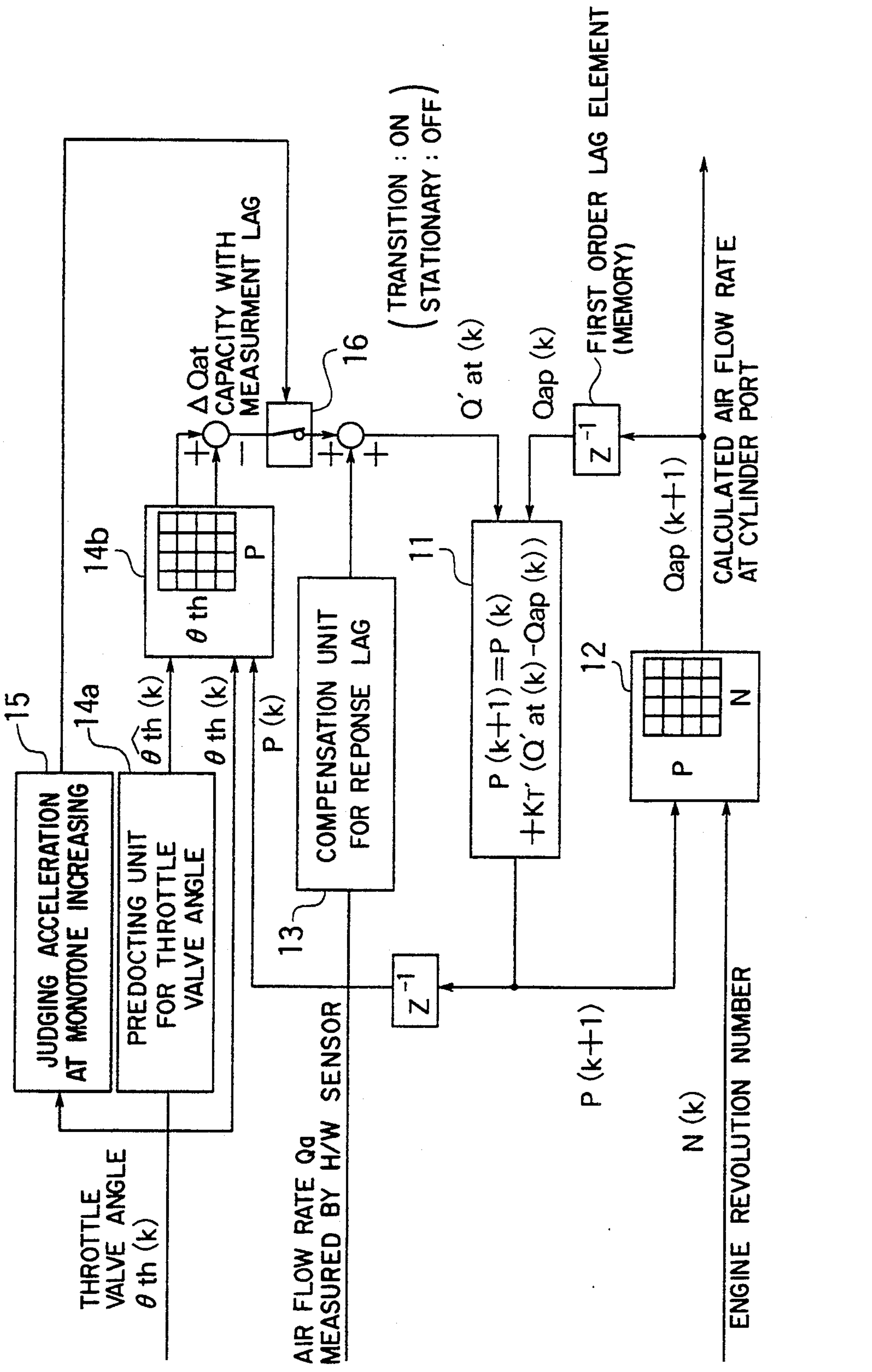
FIG. 9 is a schematic block diagram for representing another arrangement according to a modified embodiment of that shown in FIG. 6.

FIG. 9 represents such a preferred embodiment that the transition judging unit 15 shown in FIG. 5 is added to the entire construction shown in FIG. 6. The function of the transition judging unit 15 is to judge whether the engine condition corresponds to a stationary condition or a transition condition by time sequentially detecting the throttle valve angle. When a judgement is made of the transition condition, a predicted value of the throttle valve angle is obtained and the air flow rate with measurement lag is calculated based upon this predicted value. This is similar to the arrangement shown in FIG. 2 during the stationary condition, assuming now that the air flow rate in measurement lag is calculated during the transition condition. As apparent from FIGS. 5 and 9, since the program and calculation test and the like may be separately developed, assuming that the compensating unit 14 for air flow rate with measurement lag is separated from the calculating unit 11 for pressure in air intake manifold and the calculating unit 12 for air flow rate at cylinder port, both the higher development efficiency and also transplantation may be expected.

In the preferred embodiments shown in FIGS. 5 and 9, the transition judging unit 15 for judging whether the engine condition is the stationary condition or transition condition, will judge and acceleration if the throttle valve angle measured by the following formula is monotonously increased:

$$\theta_{th}(k) > \theta_{th}(k-1) < \theta_{th}(k-2) \quad (14)$$

To the contrary, the transition judging unit 15 will judge a deceleration if the throttle valve angle measured by the following equation is monotonously decreased:

$$\theta_{th}(k) > \theta_{th}(k-1) > \theta_{th}(k-2) \quad (15)$$

There are some possibilities that noise may be produced in the measurement of the throttle valve angle by merely judging variations in the throttle valve angles between two points, and therefore the acceleration/deceleration judgement may be mistakely performed. The above-described technique may judge the acceleration or deceleration by checking the monotonous increase or monotonous decrease in order to avoid such an error.

Thereafter, a method for setting the constant "$K_T$" in the above-described equation (1) and (9) will now be described. First, in case that the pressure at the air intake manifold at one preceding time instant is calculated, it will be set as follows:

$$K_T = \frac{RT_m}{V_m} \Delta t \quad (16)$$

where symbol "R" indicates an ambient constant; symbol "$V_m$" represents a volume of an air intake manifold; and symbol "$T_m$" denotes a temperature of taken air.

With respect to the above-described problems (b) to (d), when, for instance, the problem in the stroke lag as described in the problem (d) is compensated and thus the air flow rate at the cylinder port is calculated, the above-described throttle valve prediction is not carried out and a method for compensating the above-described problem based upon the pressure in the air intake manifold will now be described. In such a case, to compensate the above-described problem by obtaining the pressure at the air intake manifold for one preceding stroke, the constant "$K_T$" defined in the equations (1) and (9) is set as follows:

$$K_T = \frac{RT_m}{V_m} \cdot \frac{3000}{N} \quad (17)$$

That is to say, the calculation period At defined in the equation (16) is substituted by a time required for such a case that the crank angle becomes 180° (1 stroke rotation). When the above-described (P, N) map data is retrieved based upon the pressure value, it may be realized that the air flow rate at the air intake manifold for 180° crank angle (1 preceding stroke) is obtained.

Although the throttle valve angle or the pressure value at the air intake manifold has been predicted so as to compensate the above-described problems (b) to (d) in the above-described preferred embodiment, it is possible to obtain a prediction value of the air flow rate at the cylinder-port by not performing these prediction calculation, otherwise performing both of them to obtain an air flow rate at the cylinder port as the following calculation result. As one example, a predicted air flow rate at a cylinder port may be obtained by employing the following equation:

$$\hat{Q}_{ap}(k) = Q_{ap}(k) + \frac{T_Q}{\Delta t}\{Q_{ap}(k) - Q_{ap}(k-1)\} \quad (18)$$

where symbol "$T_Q$" is a prediction width constant, which may be set in accordance with the above-described problems (b) to (d). This is similar to the detailed description of "$T_{thl}$ defined in the equation (3). There is an advantage in calculating the predicted value of the air flow rate at the cylinder port based upon the air flow rate at the cylinder port in accordance with the equation (18) such that the better prediction may be achieved even when the throttle valve angle is rapidly changed during the driving operation, as compared with the prediction of the throttle valve angle.

While several methods for calculating the air flow rates have been described, the resultant air flow rates are employed to obtain a fuel injection amount, and may be used to calculate the ignition timings. If this is expressed by a symbol, although the conventional symbol ($Q_a$/N) has been used as one element for calculating the ignition timings, it may be employed as ($Q_{ap}$/N). As a consequence, it may obtain stable ignition timings suitable for the driving conditions.

Figure 10:
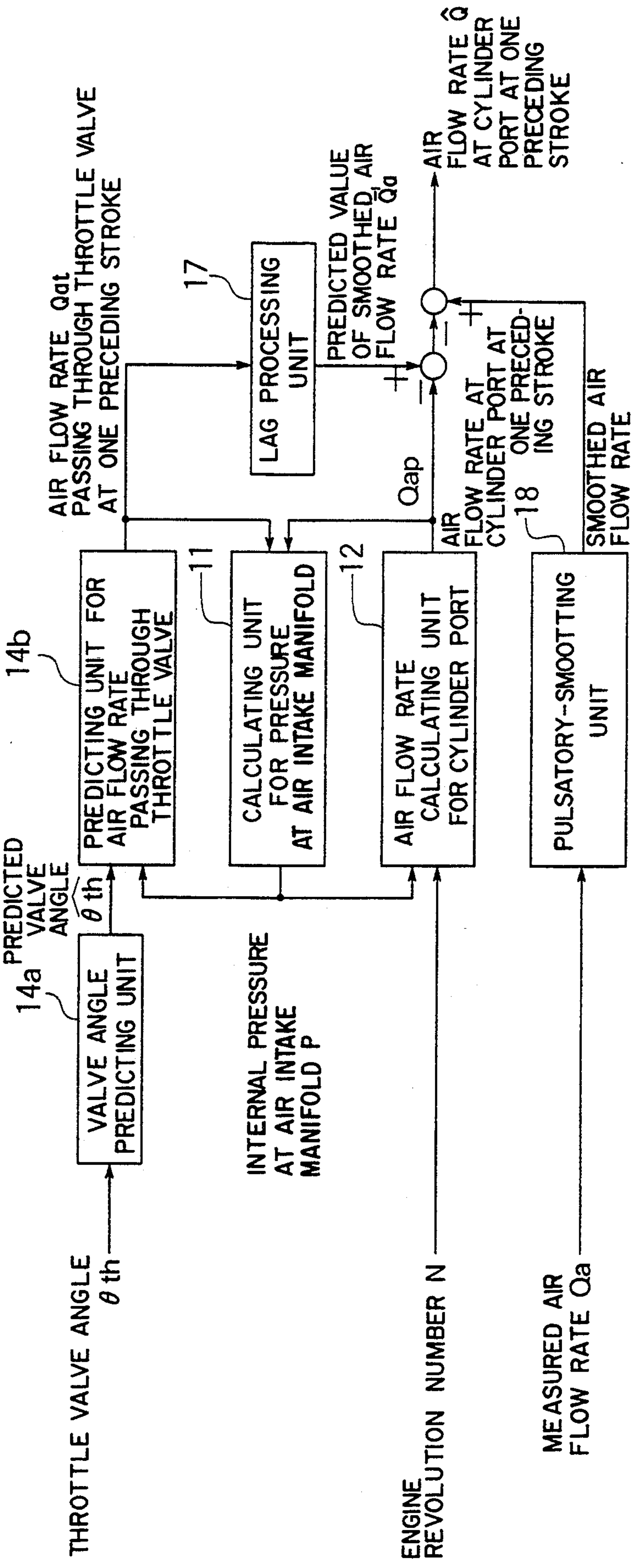
FIG. 10 is a schematic block diagram for showing a construction according to a fourth preferred embodiment of the present invention.

FIG. 10 is a schematic block diagram for representing an arrangement and an operation of an engine control unit for calculating an air flow rate at a cylinder port according to a fourth preferred embodiment of the present invention. The feature of this construction is such that an air flow rate measured by the H/W sensor is corrected based upon a throttle valve angle detected in a throttle-valve-angle detecting unit and an engine revolution number detected in an engine revolution number detecting unit, whereby an air flow rate at a cylinder port at one preceding stroke may be predicted. It should be noted that a measured air flow rate implies a value obtained by applying to the output voltage of the H/W sensor, an RC filter, A/D conversion and industrial value conversion in this order.

Figure 11:
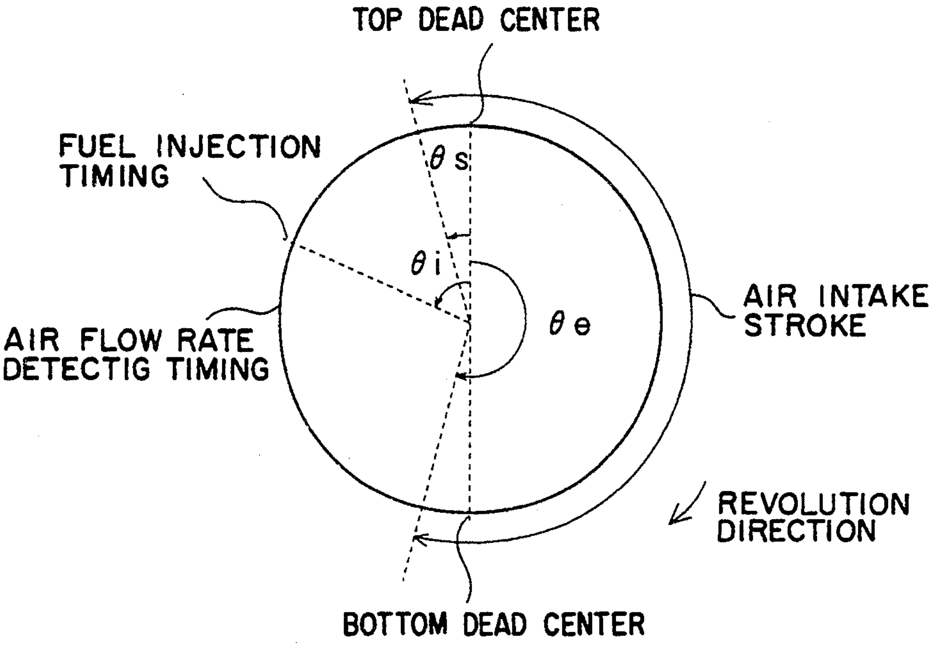
FIG. 11 represents a timing chart of an engine.

In a throttle-valve-angle predicting unit 14*a*, a predicted value $\hat{\theta}_{th}$(k) of a throttle valve angle at one preceding stroke is calculated based upon the previously-explained formula (3). Symbol $T_{thl}$ shown in this formula (3) may be formularized FIG. 11 represents timings for explaining a crank angle and a detection (calculation) of an air flow rate in case that an attention is paid to a certain cylinder; a fuel injection, and also air-intake stroke. Assuming now that a detecting period of an air flow rate is selected to be $\Delta t_1$, a time interval "$T_1$" between a timing for detecting an air flow rate and a timing for injecting a fuel is expressed as an average time by:

$$T_1 = \frac{1}{2}\Delta t_1 \quad (19)$$

Another time interval "$T_2$" between a fuel injection and an air-intake stroke is formularized as an averaged time thereof, namely a time period from the fuel injection and a center crank position in the air-intake stroke. That is to say, assuming now that a fuel injection timing is set before a $\theta_i$ crank angle at an upper dead point; an air-intake stroke is set from a $\theta_s$ crank angle at the upper dead point until a $\theta_e$ crank angle; and also an engine revolution number is selected to be N (r.p.m), the above-described time interval $T_2$ may be formularized by:

$$T_2 = \frac{\theta_e - \theta_s + 2\theta_i}{12N} \quad (20)$$

The time $T_{thl}$ from the air flow rate detection up to the air-intake stroke may be formularized based upon the equations (19) and (20);

$$\begin{aligned} T_{th1} &= T_1 + T_2 \\ &= \frac{1}{2}\Delta t_1 + \frac{\theta_e - \theta_s + 2\theta_i}{12N} \end{aligned} \quad (21)$$

Subsequently, a description will be made of a process for predicting an air flow rate pressing through a throttle valve; a process for predicting a pressure at an air intake manifold; and a process for predicting an air flow rate at a cylinder port as a process for predicting an air flow rate.

First, the air flow rate "$Q_{at}$" passing through the throttle valve is obtained by retrieving a two-dimensional table (corresponding to the table shown in 14*b* of FIG. 16) under condition that both a predicted throttle valve angle $\theta_{th}$ and a predicted pressure "P" at the air intake manifold are employed as a parameter. Also, the air flow rate "$Q_{ap}$" at the cylinder port is obtained by retrieving another two-dimensional table (corresponding to the table shown in 12 of FIG. 6) under state that both the engine revolution number "N" and the predicted pressure "P" at the air intake manifold are used as a parameter. Next, the pressure at the air intake manifold is predicted and updated by utilizing the previously-explained formula (9) from the respective predicted values of the air flow rates obtained by the above-described processes It should be noted that the coefficient "K" in the equation (9) should be referred to the descriptions of the equation (16). Since the calculations of the air flow rate "$Q_{at}$" passing through the throttle valve, and of the air flow rate "$Q_{ap}$" at the cylinder port are repeatedly performed based upon the table retrieval and updating the predicted pressure "P" at the air intake manifold is repeatedly carried out by utilizing the equation (9), response to the air flow rates may be obtained from time to time.

A lag process 17 as defined in FIG. 10 will now be describe. This lag process is to predict a smoothed air flow rate which is obtained by smoothing the pulsatory component contained in the measured air flow rate from the air flow rate "$Q_{at}$" passing through the throttle valve at one preceding stroke predicted by each of the above-described processes. Since the smoothed air flow rate corresponds to a value produced by smoothing the measured air flow rate (i.e., the measured air flow rate adjacent the throttle valve), this flow rate may be theoretically calculated by performing the lag process shown in FIG. 12 on the predicted value of the air flow rate passing through the throttle valve.

Figure 12:
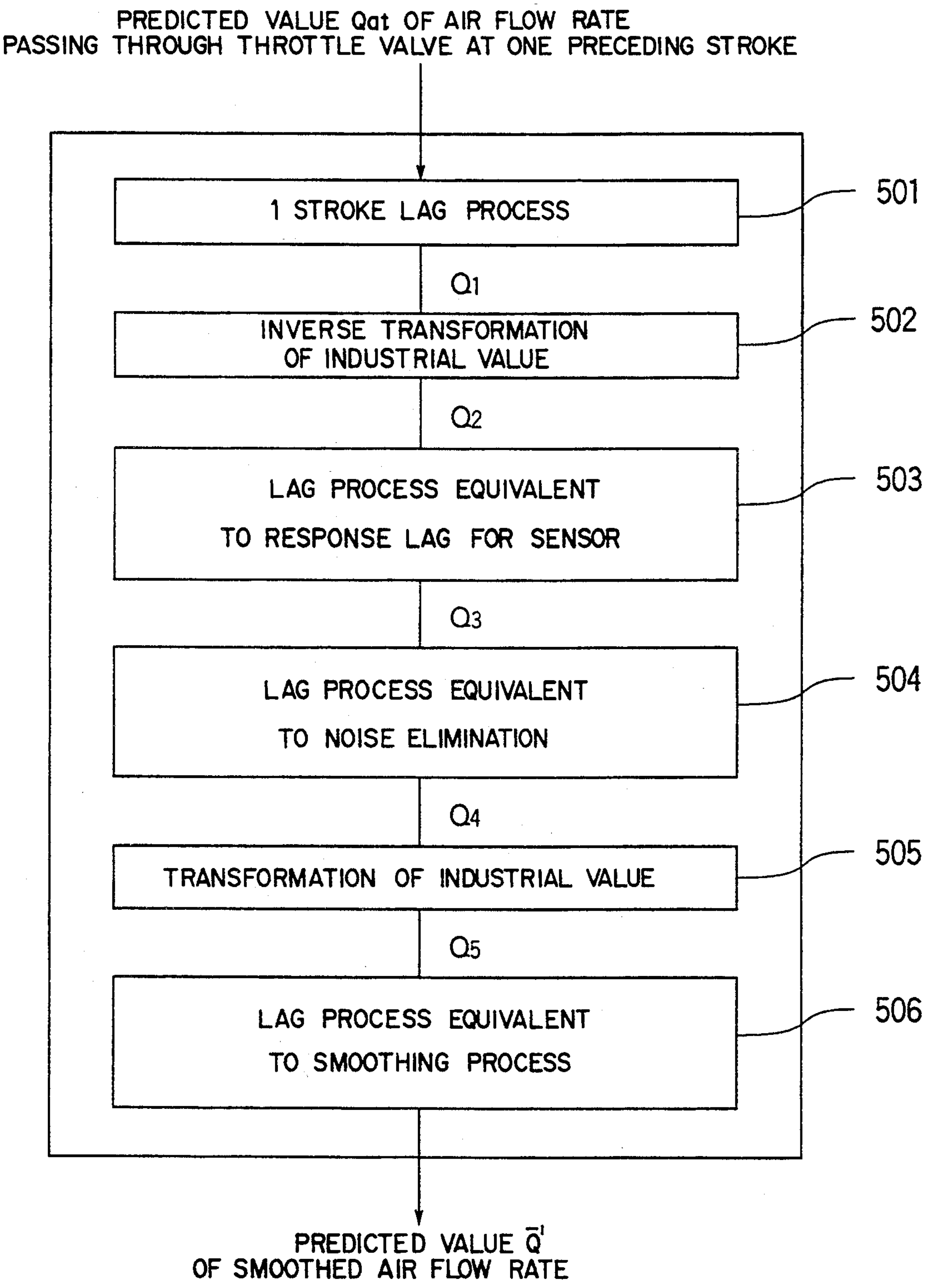
FIG. 12 represents an operation of a lag processing unit shown in FIG. 10.

In FIG. 12, at a step 501, since the predicted value "$Q_{at}$" of the air flow rate passing through the throttle valve corresponds to the flow rate at one preceding stroke, and should be equal to a flow rate $Q_1$ at a present time instant, a predicted air flow rate "$Q_1$" passing through the throttle valve at the present time instant is calculated by performing the lag process for one stroke.

The calculation of $Q_1$ is executed by utilizing the following discrete formula:

$$Q_1(k) = \frac{\frac{T_{th1}}{\Delta t}}{\frac{T_{th1}}{\Delta t} + 1} Q_1(k-1) + \frac{1}{\frac{T_{th1}}{\Delta t} + 1} Q_{at}(k)$$

where symbol "k" denotes a time instant, and 1 time instant corresponds to $\Delta t$.

At a next step 502, the predicted air flow rate $Q_1$ passing through the throttle valve at the present time instant is processed by an inverse-transferring method of an industrial value transformation for transforming the H/W output voltage normally used in the engine control system into the air flow rate, so that a value "$Q_2$" in a unit of voltage corresponding to the air flow rate passing through the throttle valve. At a subsequent step 503, the lag process equivalent to the response delay of the H/W sensor is performed to the value $Q_2$ in a unit of voltage corresponding to the air flow rate passing through the throttle valve, whereby a predicted value $Q_3$ of the H/W output voltage is calculated. This process is determined as follows.

Figure 13A:
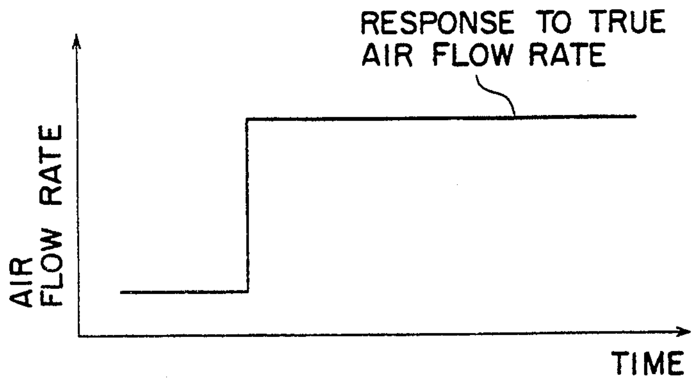
FIGS. 13(*a*and 13(*b*) graphically represent a response characteristic of an air flow sensor.
Figure 13B:
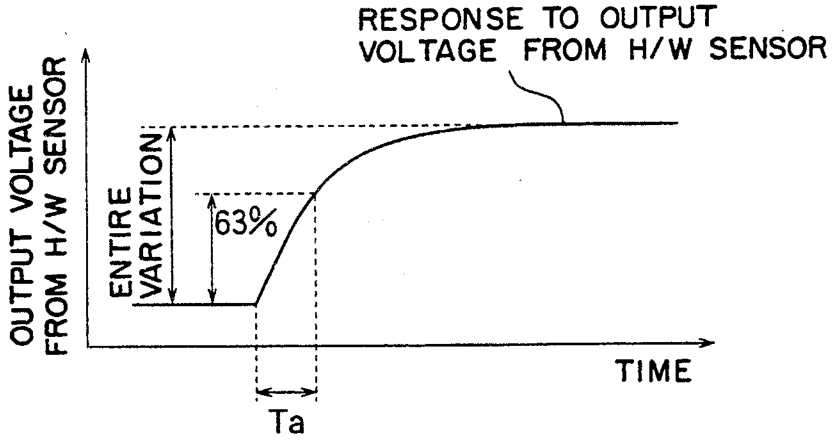

At a first stage, the H/W sensor is provided within a certain tube, responses to the output voltages from the H/W sensor when the air flow rate within the tube is stepwise varied from a constant state. Subsequently, as shown in FIG. 13(*b*), a time period from a commencement of this response until 63% of the overall changing amount is read out. Assuming that this time period is "$T_a$", a process equivalent to the response of the sensor is realized by the first order lag process for the following time constant "$T_a$" and a predicted value $\theta_3$ of the output voltage from the H/W sensor is calculated and updated.

$$Q_3(k) = \frac{\frac{T_a}{\Delta t}}{\frac{T_a}{\Delta t} + 1} Q_3(k-1) + \frac{1}{\frac{T_a}{\Delta t} + 1} Q_2(k) \quad (22)$$

Figure 14:
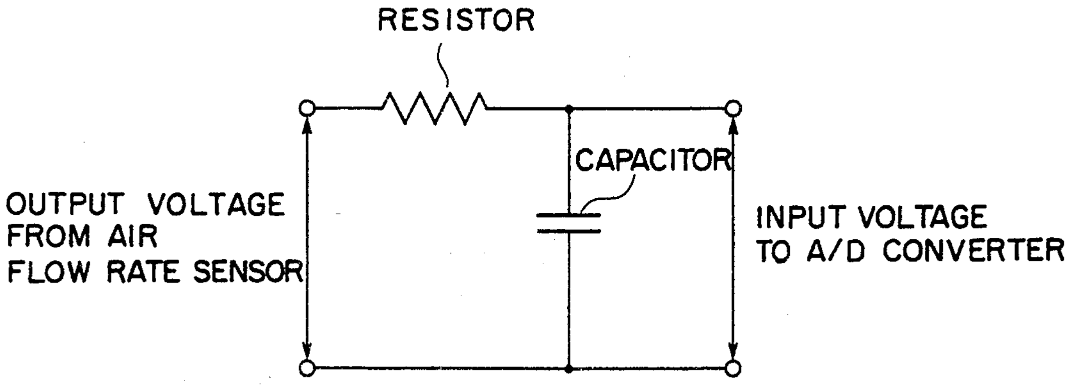
FIG. 14 is a circuit diagram of a hard filter for an output from the air flow sensor.

Next, at a step 504, a process equivalent to such a process for eliminating noise containing the output voltage from the air flow sensor normally used in the engine control system is carried out for the predicted output voltage $Q_3$ of the H/W sensor, and thus, a predicted value $Q_4$ of the output voltage from the H/W sensor which has been processed by the noise elimination. In the normal noise elimination effected in the engine control system, a hardware filter as shown in FIG. 14 is employed. Assuming now that a resistance value is "R" and a capacitance value is "c", the equivalent process may be realized by the following first order process. That is to say, a predicted value $Q_4$ of the output voltage derived from the H/W sensor which has been processed by the noise elimination process is calculated and updated.

$$Q_4(k) = \frac{\frac{RC}{\Delta t}}{\frac{RC}{\Delta t} + 1} Q_4(k-1) + \frac{1}{\frac{RC}{\Delta t} + 1} Q_3(k) \quad (22')$$

At a next step 505, the predicted value $Q_4$ of the output voltage of the H/W sensor which has been noise-eliminated is processed by employing an industrial value transformation for transforming a voltage unit into a unit of mass weight/flow rate, and then a value $Q_5$ corresponding to the measured air flow rate shown in FIG. 10 is calculated. At a step 506, a process equivalent to the smoothing process executed to the measured air flow rate $Q_a$ shown in FIG. 10 is performed for the value $Q_5$ corresponding to the measured air flow rate, whereby a predicted value $\overline{Q}_a$, of the smoothed air flow rate $\overline{Q}a$.

There are many possibilities to employ a first order lag filter when the above-described smoothing process is executed. It should be noted that a time constant thereof is varied, depending upon the engine revolution number. Assuming now that the time constant is "T", the predicted value $\overline{Q}_a$, of the smoothed air flow rate is calculated in accordance with the following process:

$$\overline{Q}_a'(k) = \frac{\frac{T}{\Delta t}}{\frac{T}{\Delta t} + 1} \overline{Q}_a'(k-1) + \frac{1}{\frac{T}{\Delta t} + 1} Q_5(k) \quad (22'')$$

As this smoothing process, there is such a process that 5 air-flow rates sampled very constant crank angle are averaged. Here, since the value $Q_5$ corresponding to the measured air flow rate is selected only to be a discrete value, it is not possible to calculate values thereof every constant crank angle. As a consequence, the predicted value of the smoothed air flow rate may not be calculated by such a process for averaging 5 values. It seems to be rather difficult to analogues this averaging process by way of the discrete formula such as the equation (22"). In this case, the averaging process is not employed for the pulsatory smoothing process, but a first order lag filter may be employed. That is to say, the averaged air flow rate is predicted by employing the equation (22″).

The above-described prediction on the smoothed air flow rate is theoretically performed. Alternatively, the lag processing method is determined by the below-mentioned experimental method so that the averaged air flow rate may be predicted.

First of all, it is assumed that the following formula is used as the discrete formula for predicting the averaged air flow rate $Q_a$ from the predicted air flow rate $Q_{at}$ passing through the throttle valve:

$$\overline{Q}_a'(k) + a_1\overline{Q}_a'(k-1) + \ldots + a_n\overline{Q}_a'(k-n) = b_0Q_{at}(k) + b_1Q_{at}(k-1) + \ldots + b_nQ_{at}(k-m) \quad (23)$$

where symbol $\overline{Q}_a'(k)$ is predicted value of a smoothed air flow rate; symbol ai(i−1), . . . , n), bj(j−1, . . . , m) denotes a function of an engine revolution number. It should be noted that values of "ai" and "bj" are determined as follows.

Figure 15A:
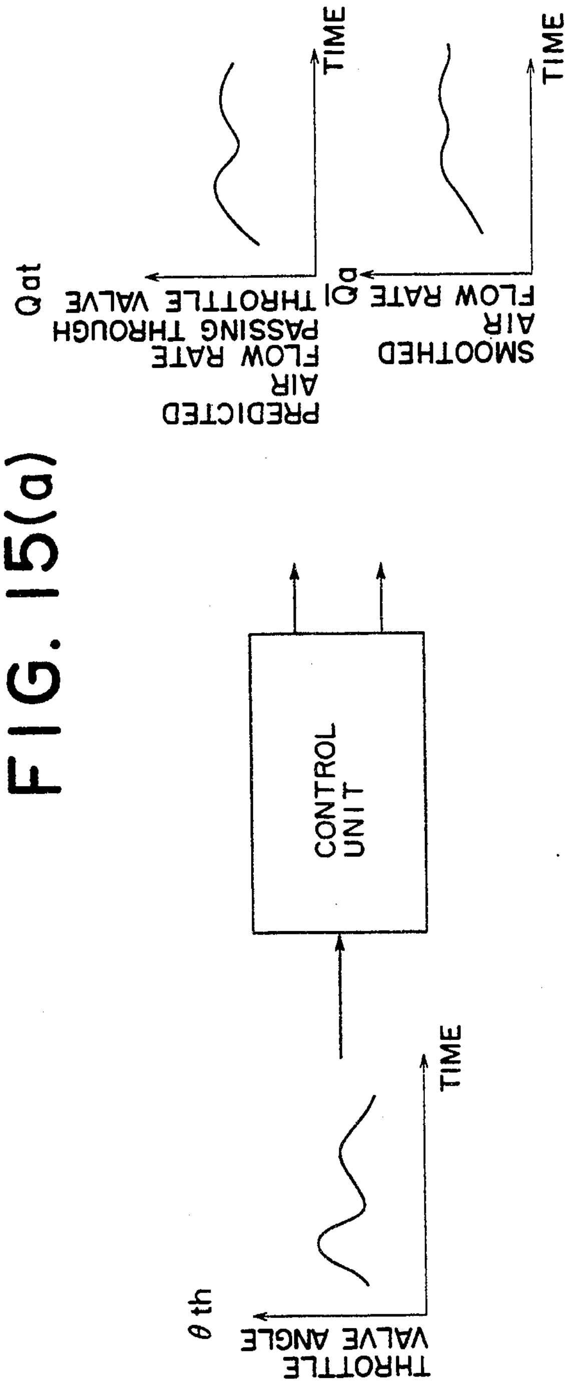
FIGS. 15(*a*) and 15(*b*) schematically show a recording method of time-sequential data required for determining the lag process and also a method for determining the lag process shown in FIG. 10.

The processes as defined in the blocks 11*a*, 11*b*, 11 and 12 shown in FIG. 10 are programmed in the control unit of the engine to which the present invention has been applied. Subsequently, the program for calculating the above "$Q_{at}$" is simultaneously operated with the control program for obtaining "$\overline{Q}_a$" which has been stored in ROM. Under such a driving condition to maintain the revolution number at a constant value, as shown in FIG. 15*a*, when the throttle valve is random actuated, the air flow rate $Q_{at}$ passing through the throttle valve at one preceding stroke which is calculated at a constant cycle within the ROM, and time-sequential data $Q_{at}(k)$, $\overline{Q}_a(k)$ of the smoothed air flow rate are stored.

Figure 15B:
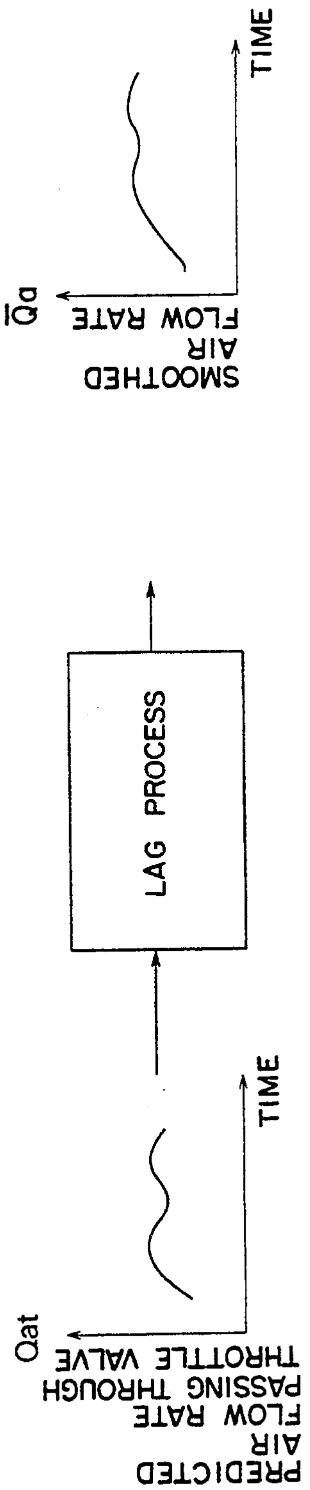

Then, as represented in FIG. 15*b*, parameters ai and bj are determined in such a manner that the predicted value of the smoothed air flow rate which is calculated by lag-processing the calculated value $Q_{at}(k)$ of the air flow rate passing through the throttle valve, as defined by the formula (23), is coincident with a true smoothed air flow rate $\overline{Q}_a(k)$. In other words, such a parameter for minimizing the subsequent evaluation index "J" is determined.

$$J = \sum_{i=1}^{k} \{\overline{Q}_a'(k) - \overline{Q}_a(k)\}^2 \quad (24)$$

Assuming now that with respect to ai(i−1, . . . , n), bj(j−1, . . . , m), a vector Φ is defined as follows:

$$\Phi = \begin{matrix} a_1 \\ a_2 \\ \cdot \\ \cdot \\ \cdot \\ a_n \\ b_0, \\ b_1 \\ b_2 \\ \cdot \\ \cdot \\ \cdot \\ b_n \end{matrix} \quad (25)$$

then the vector will be calculated via a predetermined conducting stage:

$$\Phi = [A'(k)\cdot A(k)]^{-1}\cdot A'(k)\cdot\overline{Q}(k) \quad (26)$$

It should be noted that both symbols "A" and Q(k) are represented as FIG. 16.

The parameters "ai" and "bj" with respect to various engine revolution numbers and obtained by repeating the above-described process and the resultant parameters are stored in the table for the revolution numbers.

In response to the engine revolution number (simply referred to a "revolution number"), the parameters acquired by retrieving the above-described table are used for the above-described formula (23) so as to predict a value $\overline{Q}_a'$ of the smoothed air flow rate.

The process for predicting the air flow rate effected in the arrangement shown in FIG. 10 is precisely performed under such a condition that engine driving environment (atmospheric pressure and atmospheric temperature) is constant. However, if this environment is drastically changed, precision on the predicted air flow rate is deteriorated, which may be compensated by the following method.

Figure 17A:
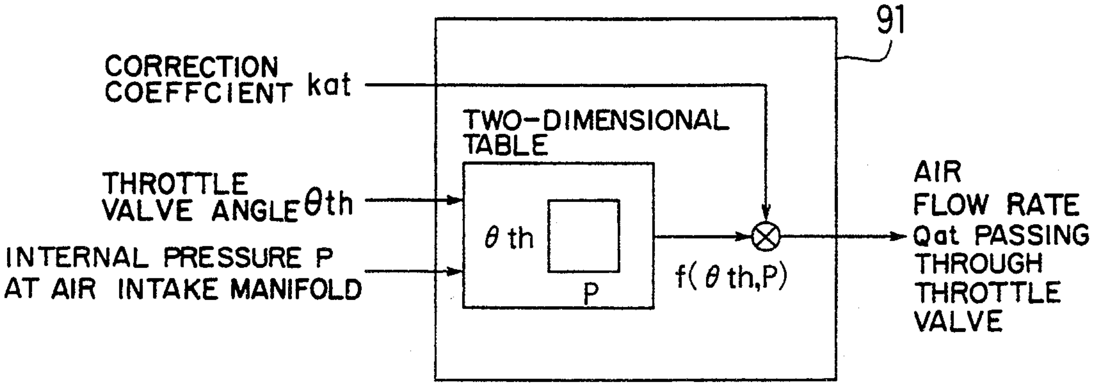
FIGS. 17(*a*) and 17(*b*) are schematic block diagrams for showing an arrangement of a prediction unit for predicting an air flow passing through a throttle.
Figure 17B:
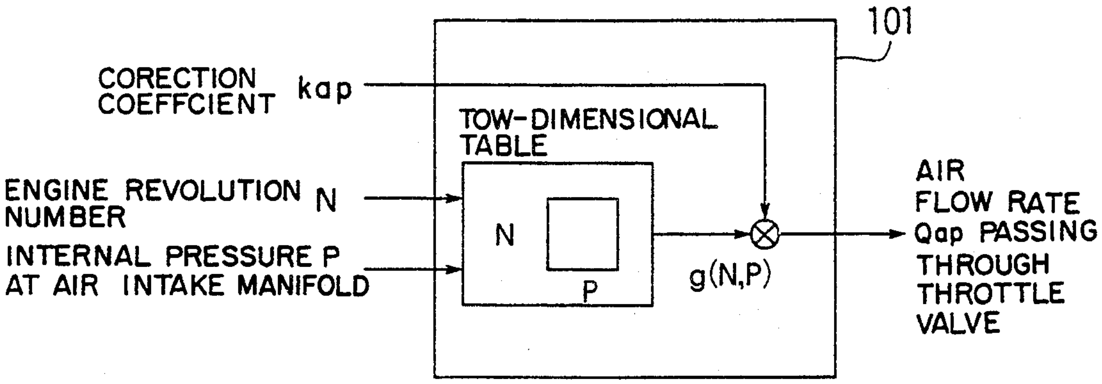

That is to say, in accordance with the above-described methods, i.e., the process for predicting the air flow rate passing through the throttle valve and also the process for predicting the air flow rate at the cylinder port, both the air flow rate at the cylinder port or the air flow rate passing through the throttle valve are directly obtained from the two-dimensional tables for the above-described predicted pressure at the air intake manifold and the engine revolution number or the predicted throttle valve angle. Alternatively, as shown in FIG. 17, correction coefficients $k_{at}$ and $k_{ap}$ are multiplied with the table retrieval value ($f(\theta_{th}, p)$ or $g(N, p)$) so as to predict each of the air flow rates.

These correction coefficients $K_{at}$ and $K_{ap}$ are determined in such a manner that each of the predicted air flow rates $Q_{at}$ and $Q_{ap}$ are coincident with the smoothed air flow rate $Q_a$ during the normal engine driving state. In other words, these coefficients may satisfy the following equations:

$$Q_{at} = k_{at} f(\overline{\theta}_{th}, P) = Q_a \quad (27)$$

$$Q_{ap} = k_{ap}\cdot g(\overline{N}, P) = Q_a \quad (28),$$

where:

$\overline{\theta}_{th}$: a detected throttle valve opening angle during a normal driving state, $\overline{N}$: a detected revolution number during a normal driving state, P: predicted pressure at an air intake manifold.

Figure 18:
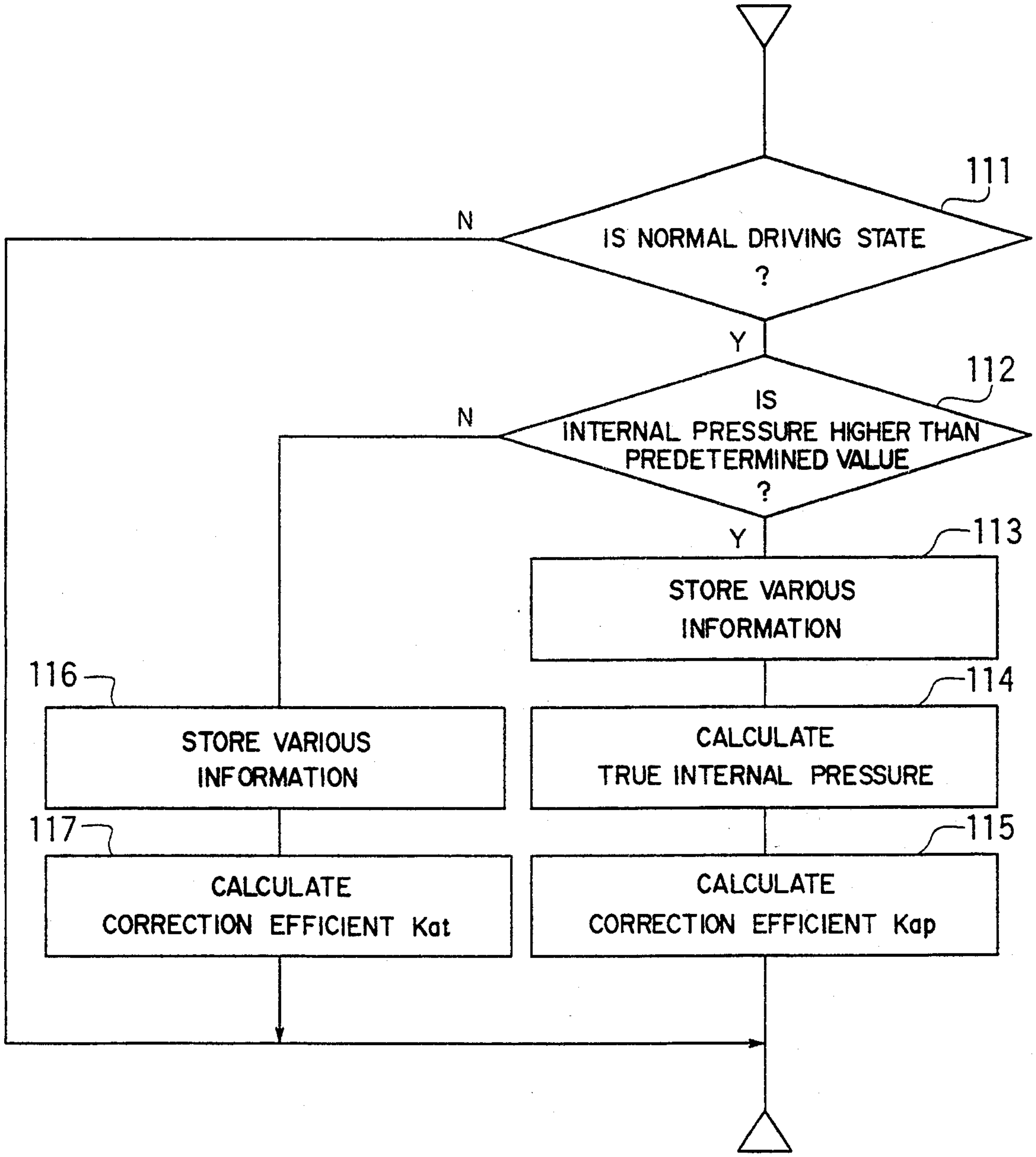
FIG. 18 is a flowchart for explaining an algorithm for calculating a correction coefficient.

The correction coefficients $K_{at}$ and $K_{ap}$ for satisfying the above-described equation (27 are given by an algorithm as represented in FIG. 18). In this algorithm, at a step 111, a judgment is made whether or not it is under a normal driving condition by checking whether or not both the throttle valve opening angles (simply referred to an "opening angle") sampled at a predetermined time period and a deviation in the time sequential data of the revolution number are present within a predetermined value. If a judgement is made of the normal driving state, the process operation is advanced to a step 112. Otherwise, no correction coefficient calculation is carried out and this process operation is completed.

At this step 112, another judgement is made whether or not the pressure at the air intake manifold is higher than a predetermined value. It should be noted that "a predetermined value" corresponds to an upper limit value of a pressure range where an air flow rate becomes constant under the constant atmospheric pressure and without the pressure in the air intake manifold. If the pressure in the air intake manifold is higher than a predetermined value, the process operation is advanced to a next step 113. Otherwise, the process operation is advanced to a further step 116.

After the step 113, the value of the correction coefficient $K_{ap}$ is calculated, assuming that the latest calculated correction coefficient "$K_{at}$" may satisfy the above-described equation (27).

At this step 113, the latest detected value $\bar{\theta}_{th}$ for the throttle valve angle, the detected value $\bar{N}$ for the revolution number, the calculated value $K_{at}$ for the correction coefficient, the predicted pressure "P" at the air intake manifold, and the smoothed air flow rate $\bar{Q}$ are stored.

At the next step 114, a true internal pressure "P(real)" in the air intake manifold is calculated by utilizing the above-described memory information. It should be understood that a true internal pressure "P(real)" in the air intake manifold corresponds to internal pressure for satisfying the above-described equations (27) and (28). That is to say, with respect to the real internal pressure P(real), the following equations will be satisfied:

$$k_{at}f(\bar{\theta}_{th}, P(real)) = \bar{Q}_a \quad (29)$$

$$k_{ap}g(\bar{n}, P(real)) = \bar{Q}_a \quad (30)$$

Based upon this condition, the true internal pressure P(real) is calculated by utilizing the latest calculated value $K_{at}$ of the correction coefficient into the equation (29).

When the environment condition is changed, there is deviation between the predicted air flow rate and the true value thereof (measured value). As a result, the predicted internal value is shifted from a true value thereof as defined above. Since the environment does not rapidly change, it may be understood that the true internal value pressure P(real) is about the predicted internal pressure "P". As a consequence, the following approximate expression will be satisfied:

$$f(\bar{\theta}_{th}, P(\text{real})) = f(\bar{\theta}_{th}, \hat{P}) + \left(\frac{\partial f}{\partial P}\right)_{P=\hat{P}} \cdot (P(\text{real}) - P) \quad (31)$$

Both the equations (29) and (31) are simultaneously calculated with respect to the true pressure P(real), whereby the following equation is given:

$$P(\text{real}) = P + \frac{\frac{\bar{Q}_a}{K_{at}} - f(\bar{\theta}_{th}, \hat{P})}{\left(\frac{\partial f}{\partial P}\right)_{\substack{\theta th=\bar{\theta}th \\ P=\hat{P}}}} \quad (32)$$

where value of $$\left(\frac{\partial f}{\partial P}\right)_{\substack{\theta th=\bar{\theta}th \\ P=\hat{P}}}$$

may be obtained by retrieving the two-dimensional table into which the value of $$\left(\frac{\partial f}{\partial p}\right)$$

has been previously calculated and then been stored.

Next, the equation (30) is modified at a step 115 to obtain the following equation (33), by which a new correction coefficient $K_{ap}$(new) is calculated and this value is updated.

$$k_{ap}(\text{new}) = \frac{\bar{Q}_a}{g(\bar{N}, P(\text{real}))} \quad (33)$$

With the above-described operations the process defined after the step 113 is completed.

Subsequently, a process defined after a step 116 will now be described. In the process defined after the step 116, the correction coefficient "$K_{ap}$" is calculated. At the step 116, both the latest detected value $\theta_{th}$ of the throttle valve angle and the latest smoothed air flow rate $\bar{Q}_a$ are stored. At a step 117, another correction coefficient $K_{at}$(new) is newly calculated from the equation modified from the equation (29) and its value is updated.

$$k_{at}(\text{new}) = \frac{\bar{Q}_a}{f(\theta_{th}, P(\text{real}))} \quad (34)$$

It should be noted that although the true internal pressure P(real) corresponds to an unknown parameter, as previously stated, this pressure P(real) is equal to approximately the predicted internal pressure "P", and also this true internal pressure is present within a region where f($\theta_{th}$, P) becomes constant irrelevant to the predicted internal pressure "P", so that f($\theta_{th}$, P(real)) may be exclusively defined by the throttle valve angle.

Figure 19:
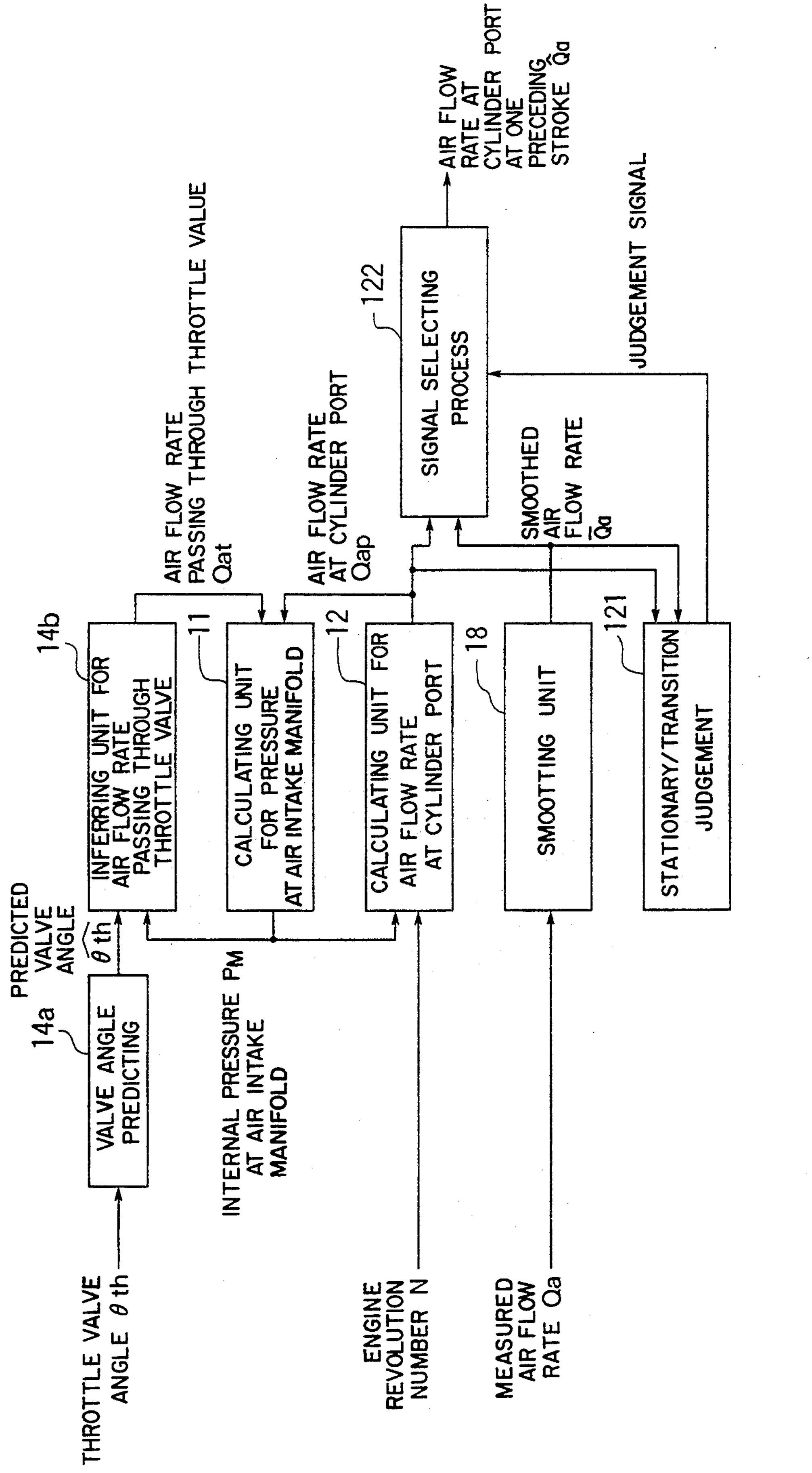
FIG. 19 is a schematic block diagram for explaining an arrangement according to a fifth preferred embodiment of the present invention.

Referring now to FIG. 19, an engine control unit, according to a fifth preferred embodiment of the present invention, for inferring an air flow rate at a cylinder port at one preceding stroke will be described.

In the preferred embodiment shown in FIG. 19, a measured air flow rate is corrected based upon a throttle valve opening angle and a revolution number, an air flow rate at a cylinder port at one preceding stroke is not calculated, a selection is made of a predicted air flow rate at a cylinder head and a smoothed air flow rate based upon the throttle valve angle and revolution number, so that an air flow rate at the cylinder port at one preceding stroke is calculated, as described in FIG. 10.

Each of the processing operations performed in the predicting unit 14*a* for throttle valve angle; the inferring unit 14*b* for air flow rate passing through throttle valve; the calculating unit 11 for internal pressure in air intake manifold; the calculating unit 12 for air flow rate at cylinder port; and the smoothing unit 18, is the same as that of the previous embodiment.

Based upon the judgement result obtained from the stationary/transition judging unit 121, a signal selecting process 122 selects one of signals indicative of the inferred value for the air flow rate at the cylinder port and of the smoothed air flow rate so as to be outputted as the air flow rate at the cylinder port at one preceding stroke. This signal selecting process 122 outputs the smoothed air flow rate in case of the stationary state, and the inferred value for the air flow rate at the cylinder port in case of the transition. The stationary/transition judging process 121 judges the stationary state when deviation between the smoothed air flow rate and the air flow rate at the cylinder port which are sampled, or calculated at a constant interval, is present within a predetermined value, otherwise judges the transition state.

Also, in accordance with the arrangement shown in FIG. 19, there exists a shift between the inferred value of the air flow at the cylinder port and the smoothed air flow rate during the normal engine driving state due to the environment changes, which is similar to that of FIG. 10. In this case, there is a problem that the air flow rate becomes discontinued when switching these signals, and therefore the inferring precision in the air flow rate is lowered. To prevent such a problem, the table shown in FIG. 17 is employed for inferring the respective air flow rates, which is similar to the previously explained preferred embodiment. Thus, the fifth preferred embodiment shown in FIG. 19 has been described.

In accordance with FIGS. 20 to 22, an operation of a control program will now be described which is used for a controlling system where the methods for inferring the air flow rate at the cylinder port as described in the fourth and fifth preferred embodiments is realized in a digital type control unit.

Figure 20:
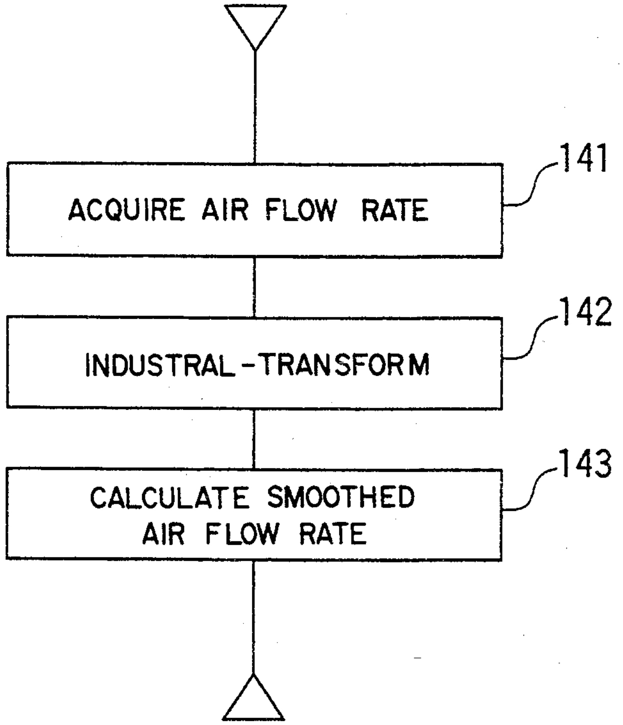
FIG. 20 is a flowchart for explaining a control program for taking in an air flow.

FIG. 20 is a flowchart for explaining a process to smooth the air flow rate acquired by the air flow sensor such as the H/W sensor, and also to calculate the air flow rate from which the pulsatory component has been removed. FIGS. 21 and 22 correspond to the arrangements shown in FIGS. 10 and 19, and are flowcharts of a control program for inferring the air flow rate at the cylinder port so as to control the fuel.

First, a description will now be made of the process shown in FIG. 21. This process is carried out every 2 mseconds. At first, the output signal from the air flow rate meter is A/D-converted and then the converted signal is fetched into a microcomputer at a step 141. Next, the A/D-converted value is transformed into an industrial value, and converted into a value "$Q_a$" in a unit of air flow rate (g/sec) at a step 142. Finally, the measured air flow rate $Q_a$ is processed by a first order lag filter as defined by the following equation (35), so that an averaged air flow rate $Q_a$ from which the pulsatory component has been removed is calculated and then stored into the RAM:

$$\overline{Q_a}(k)=(1-h(N))\overline{Q_a}(k-1)+h(N)\overline{Q_a}(k) \quad (35)$$

where $0<h(N)<1$, h(N) denote a function of a revolution and symbol "k" indicates a time instant (2 msec being one unit time).

The above-described process is ended and the program waits for a next interrupt demand.

Figure 21:
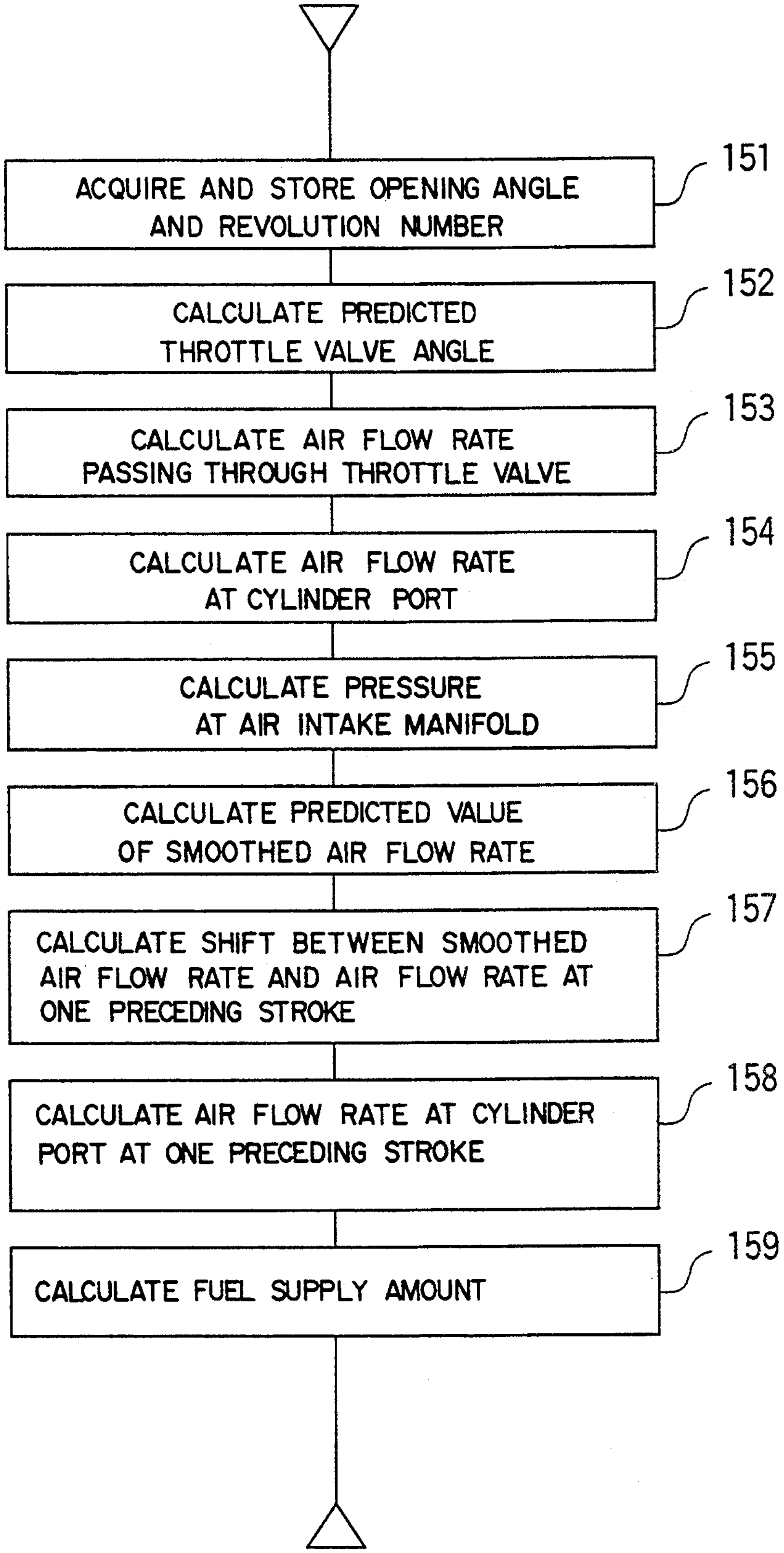
FIGS. 21 and 22 are flowcharts for explaining control programs of fuel supply amount calculation according to the fourth and fifth preferred embodiment.
Figure 22:
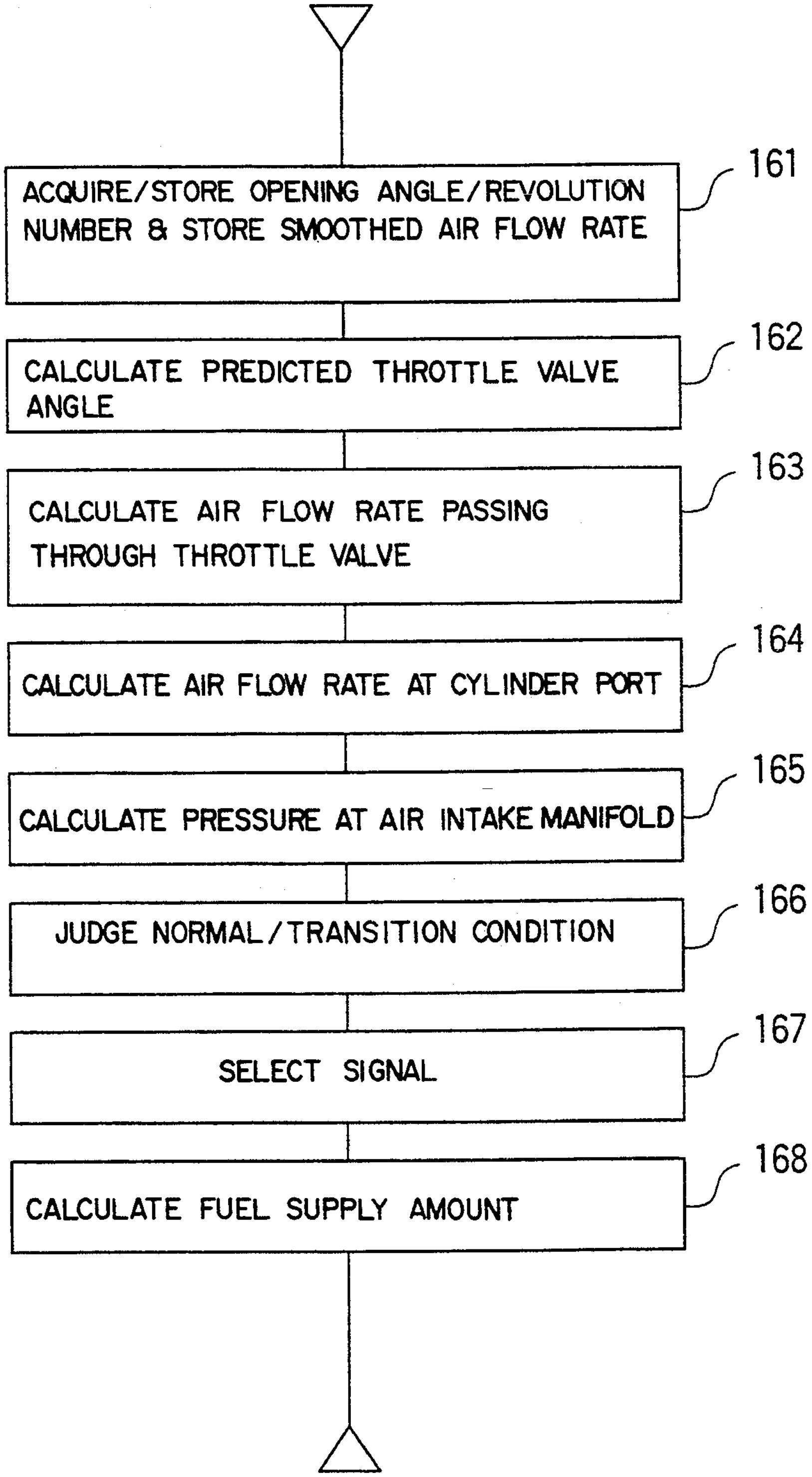

Referring now to FIG. 21, the operation of the fuel control program will be described.

Every time the interrupt demand is made at 10 msec, the signals derived from the throttle valve angle sensor and crank angle sensor are fetched at a step 151 so as to calculate both the throttle valve angle and revolution number, whereby these data are stored into RAM. It should be noted that with respect to the throttle valve angle, the value which was fetched before 10 msec is stored into another address of the RAM.

At a next step 152, based upon the above-described equation (3), a throttle valve opening angle $\hat{\theta}_{th}$ at approximately one preceding stroke is calculated. In the equation (3); symbol At indicates 10 msec, symbol $\overline{\theta}_{th}(k)$ is the opening angle fetched at the step 151; symbol $\overline{\theta}_{th}(k-1)$ denotes the opening angle fetched before 10 msec; and symbol "$T_{thl}$" represents a value calculated by the equation (21) based upon the revolution number fetched at the step 151.

Then, at a step 153, the above-described table (refer to FIG. 6) is retrieved under condition that both the predicted opening angle $\hat{\theta}_{th}$ and the pressure "P" at the air intake manifold which has been stored at the previous interrupt period (approximately 10 msec) are employed as a parameter, whereby the air flow rate $Q_{at}$ passing through the throttle valve is obtained. Similarly, at a step 154, the above-described table is retrieved under such a condition that both the revolution number N fetched at the step 151 and the pressure "P" at the air intake manifold which has been stored at the previous interrupt period are used as a parameter, so that the air flow rate $Q_{ap}$ at the cylinder port is obtained.

Subsequently, based upon the pressure P(k) at the air intake manifold at the present time at a step 155, the air flow rate $Q_{at}(k)$ passing through the throttle valve angle obtained at the step 153, and also the air flow rate $Q_{ap}(k)$ at the cylinder port obtained at the step 154, the pressure P(k+1) at the air intake manifold is calculated by employing the above equation (9). It should be noted that Δt is selected to be 10 msec in the equation (9).

At a step 156, the inferred value $\overline{Q}_a$, of the smoothed air flow rate is calculated from the air flow rate $Q_{at}(k)$ passing through the throttle valve which is calculated every 10 msec, by utilizing the equations (22), (22'), (22") or (23). It should be noted that if the data on the past air flow rate passing through the throttle valve and the predicted value of the smoothed air flow rate are required so as to calculate an inferred value of the smoothed air flow rate at a present time, the quantities of these data required for this calculation are stored.

At a step 157, the air flow rate $Q_{ap}$ at the cylinder port calculated at the step 154 is subtracted from the inferred value $\overline{Q}_a'$ of the smoothed air flow rate calculated at the step 156, so that deviation $\Delta Q_a$ between the smoothed air flow rate and the air flow rate at the cylinder port at the preceding one stroke is calculated. Next, the deviation $\Delta Q_a$ in the air flow rate calculated at the step 157 is subtracted from the smoothed air flow rates $\overline{Q}_a$ which have been sequentially calculated by the process defined in FIG. 20, so that the air flow rate $\hat{Q}$ at the cylinder port at one preceding stroke is calculated which is utilized for calculating the fuel supply amount.

Finally, a fuel injection pulse width "$T_i$" corresponding to the fuel injection amount is calculated from the air flow rate $\hat{Q}$ at the cylinder port obtained at the step 158 in accordance with the following equation at a step 159:

$$T_i = k \cdot \frac{\hat{Q}_a}{N} \gamma + T_s \quad (36)$$

where symbol "k" is a correction coefficient; symbol denotes a feedback correction coefficient; and symbol "$T_s$" indicates an invalid injection time.

Next, in accordance with a flowchart shown in FIG. 22, an operation of a program for controlling a fuel and inferring an air flow rate at a cylinder port will now be described with reference to the fifth preferred embodiment shown in FIG. 19.

Also, this program is executed every 10 msec every time the timer interrupt demand is made.

Since process operations defined from a step 161 to a step 165 are the same as those defined from the previously described steps 151 to 155 except that the latest smoothed air flow rate at the step 161 is stored, no further explanation is made.

At a step 166, based upon the smoothed air flow rate $\overline{Q}_a(k-1)$ stored at the step 161 and the air flow rate $Q_{ap}(k-1)$ calculated at the step 164 during the previous interrupt operation, and also the air flow rate $Q_{ap}(k)$ at the cylinder port calculated at the step 164 and the latest smoothed air flow rate $\overline{Q}_a(k)$ calculated in the program shown in FIG. 20, both deviation in the air flow rates at the cylinder port $|Q_{ap}(k)-Q_{ap}(k-1)|$ and also deviation the smoothed air flow rates $|\overline{Q}_a(k)-\overline{Q}_a(k-1)|$ are calculated. It may be judged that the engine is under the normal driving condition by checking whether or not the deviation is within a predetermined value.

Subsequently, in case that a judgement is made of the normal driving state at the previous step 166, a selection is made of the latest smoothed air flow rate which has been calculated by the program shown in FIG. 20 as the air flow rate "$Q_{ap}$" at the air intake manifold at one preceding stroke. Conversely, when it is judged that the normal driving state is not established, the air flow rate Q at the cylinder port calculated at the step 164 is selected. Finally, the pulse width "$T_i$" of the fuel injection corresponding to the fuel supply amount is calculated at a step 168 based on the air flow rate Q at the cylinder port selected at the step 167 in accordance with the previous formula (36).

The above-described process is completed and waits for the subsequent interrupt demand.

It should be noted that the above-described program does not certain such a program for maintaining the inferring precision of the air flow rate in response to the environment change. To realize such a function, the air flow rates are calculated at the step 153 shown in FIG. 21 and the step 163 shown in FIG. 22 with employment of the table shown in FIG. 17, and also the program of the flowchart shown in FIG. 18, for calculating the correction efficient is newly added.

As previously explained, although the air flow rate at the cylinder port is employed so as to obtain the fuel injection amount in the above-described fifth preferred embodiment, this flow rate may be employed to calculate the ignition timings. It is obvious that the present invention is not limited-to the above preferred embodiments.

A description will now be mode of a further preferred embodiment related to a method for calculating a throttle valve opening angle.

Figure 23:
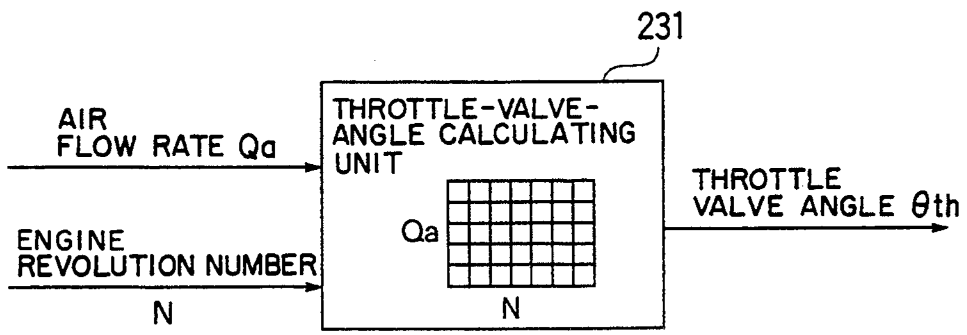
FIG. 23 is a schematic block diagram for representing an arrangement according to a sixth preferred embodiment of the present invention.

In FIG. 23, there is shown a sixth preferred embodiment according to the present invention, i.e., a block diagram for showing a first arrangement of a calculating apparatus for a throttle valve opening angle.

This calculating apparatus is constructed of a calculating unit 231 for a throttle valve opening angle, which has previously owned both the air flow rate ($Q_a$) and the throttle valve opening angle ($\theta_{th}$) corresponding to the engine revolution number (N) as map data.

The throttle valve opening angles under condition that both the air flow rate and engine revolution number become the normal state are obtained by the engine unitary test by statically changing both the air flow rate and engine revolution number. The air flow rate and engine revolution number are used as the axis of the two-dimensional map data and are stored within a ROM of the calculating unit 231 for the throttle valve angle within the engine control unit (not shown in detail).

While the engine is started and revoluted, both the air flow rate ($Q_a$) and engine revolution number (N) are measured from time to time in response to the driving conditions. The values on the axis of the two-dimensional map employed in the calculating unit 231 for the throttle valve opening angle, corresponding to the measured values are retrieved, and then the throttle valve opening angle ($\theta_{th}$) which has been previously stored in accordance with these values on the axis is read out.

Here, the interpolation calculations on the four points or two points with respect to the two-dimensional map are carried out in the similar method to the conventional method. However, the description thereof is omitted.

According to this preferred embodiment, the throttle valve opening angle ($\theta_{th}$) may be readily calculated from the air flow rate ($Q_a$) and the engine revolution number (N), and the throttle valve opening angle ($\theta_{th}$) calculated under the normal driving condition may be coincident with the throttle valve opening angle obtained from the throttle sensor at higher precision.

It should be noted that the present embodiment merely includes the throttle valve angle calculating unit for directly obtaining the throttle valve angle from the air flow rate and engine revolution number. The air flow rate described in this preferred embodiment implies such a stable value during the normal driving condition under which noise and pulsatory component have been eliminated. Then, if the above conditions are satisfied, any air flow rates obtained by smoothing the output from the H/W sensor in the conventional method (including any flow rates processed by the electronic circuit and digital filter) may be utilized. Even when the air flow rates contain the noise and pulsatory component, if these flow rates are not inconvenient to the calculation on the throttle valve opening angle produced from the arrangement shown in FIG. 23, then these flow rates may be utilized. It should be noted that the air flow rate simply indicates the above-described flow rates.

Figure 42:
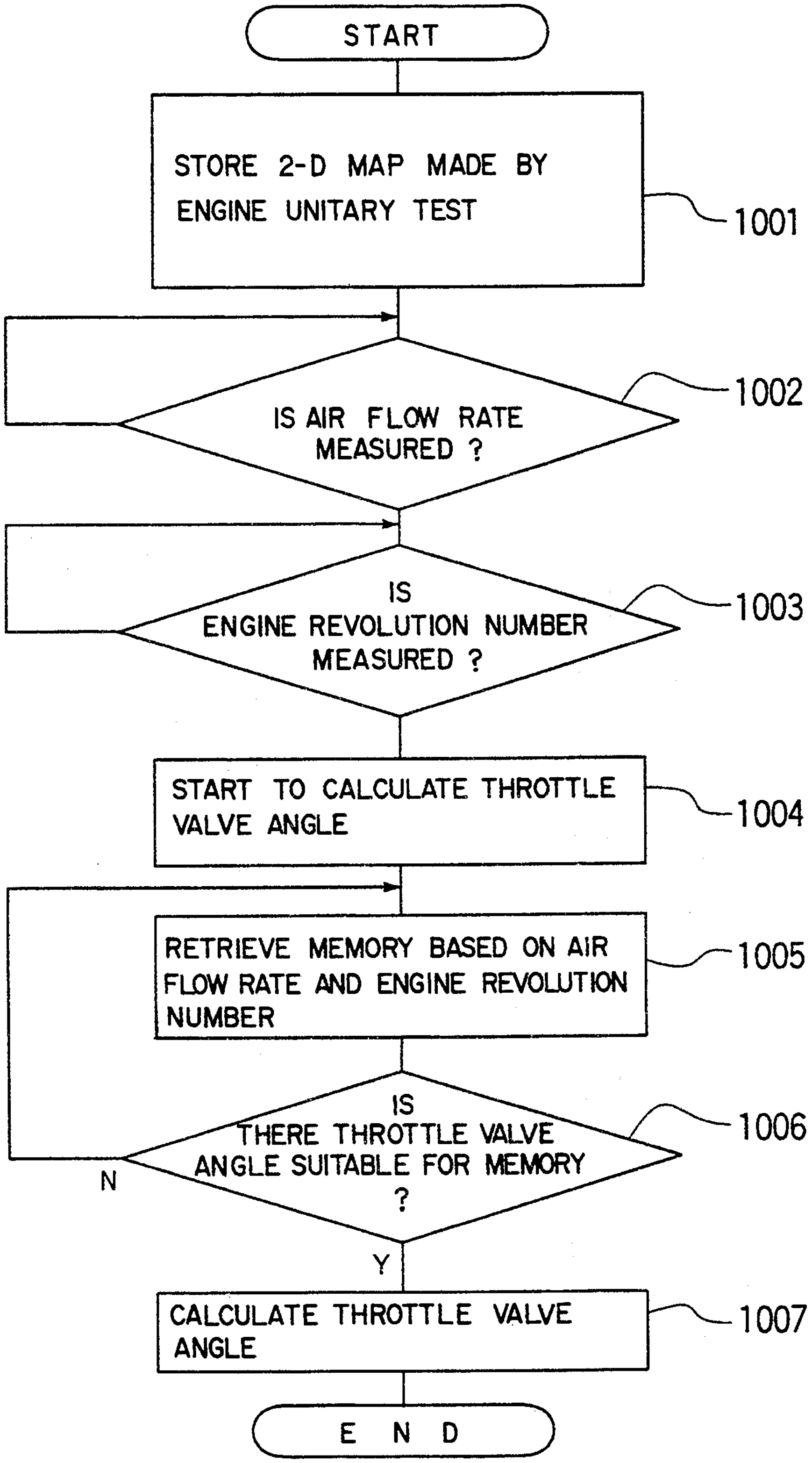
FIG. 42 is a flowchart for explaining an operation sequence of an apparatus for calculating a throttle valve angle in the sixth preferred embodiment shown in FIG. 23.

FIG. 42 is a flow chart for showing an operation of the throttle-valve-angle calculating apparatus shown in FIG. 23.

The calculating unit 231 for the throttle valve angle shown in FIG. 23 correctly obtains the throttle valve angle based on the data of the throttle valve angle when both the air flow rate and engine revolution number which have been previously obtained by the engine unitary test are under the stationary condition. In other words the throttle valve angles are obtained by statically changing the dynamic range of the engine revolution number, or statically varying the dynamic range of the air flow rate with maintaining the air flow rate at a constant. Furthermore, thus the data on the acquired throttle valve angle are stored within the control unit for performing the calculation on the engine control as the two-dimensional memory map where the air flow rate and engine revolution number are used as the axis (a step 1001).

The air flow rate is measured (a step 1002) and the engine revolution number is measured (a step 1003). Based upon these measured values, the calculation on the throttle valve angle is command (a step 1004).

During the actual driving operation, the throttle valve angle data corresponding to the air flow rates and engine revolution numbers which are measured from time to time, depending upon the driving condition, are retrieved from the two-dimensional map at steps 1005 and 1006, and the proper throttle valve angle is obtained at a step 1007 under the control of the throttle valve angle calculating unit. It should be noted that the retrieval operation is effected by the interpolation calculation and the throttle valve angle data may be calculated.

Figure 24:
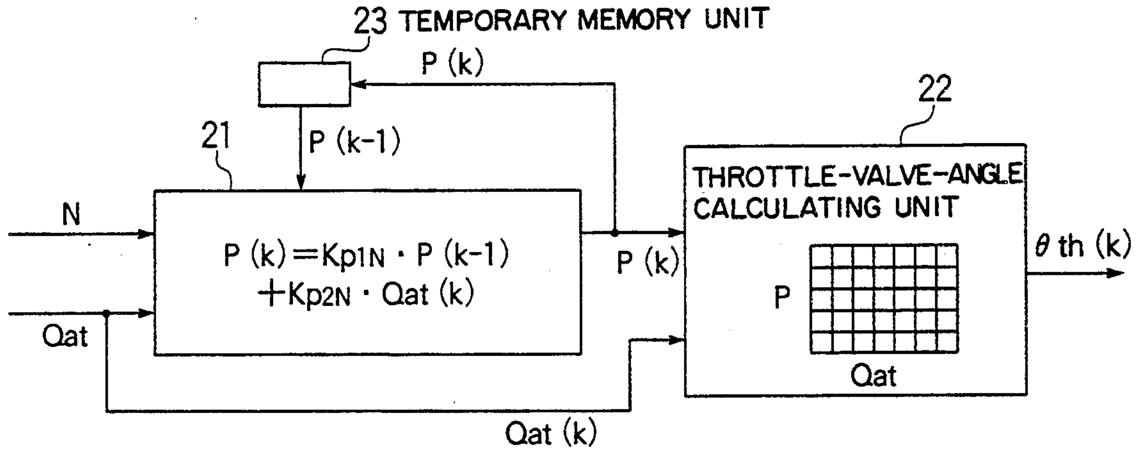
FIG. 24 is a schematic block diagram for showing an arrangement according to a seventh preferred embodiment of the present invention.

FIG. 24 is a schematic block diagram for representing a construction of a control unit according to a seventh preferred embodiment of the present invention.

The overall construction is the same as that of FIG. 23, in which the throttle valve angle is obtained from the air flow rate and engine revolution number. However, the internal arrangement thereof is different from that shown in FIG. 23.

That is, this internal arrangement is comprised of a calculating unit 21 for calculating pressure in an air intake manifold, a calculation unit 22 for calculating a throttle valve opening angle from the pressure in the air intake manifold calculated by this pressure calculating unit 21 and the air flow rate, and a temporary memory unit 23 for temporarily storing the calculation results.

Since both the air flow rate and engine revolution number are measured from time to time during the driving operation, the internal pressure "P(k)" at the air intake manifold will be obtained based upon these measured values in the pressure calculating unit 21.

The pressure P(k) at the air intake manifold will be obtained by solving the following differential equation:

$$dp/dt = Af(N) \times P + b \times Q_{at} \quad (37)$$

where:

P: pressure at air intake manifold, $Q_{at}$: air flow rate,

Af(N): coefficient determined by engine revolution number, b: constant.

To solve this differential equation (37), for instance, it may be followed:

$$P(k) = P(k-1) + [1 - \Delta t \times Af(N(k))] - + Q_{at}(k) \times b \times \Delta t + [1 - \Delta t \times Af(N(k))] \quad (38)$$

where:

Δt: calculation period (sampling period)

k: time instant

As shown in the above equation (38), to obtain the pressure at the air intake manifold at a time instant "k", the pressure P(k−1) calculated at the preceding time instant, the engine revolution number N(k), and the air flow rate $Q_{at}(k)$ are required.

Furthermore, the above equation(38) is modified to obtain the following equation (39):

$$P(k) = K_{P1}n \times P(k-1) + K_{P2}n \times Q_{at}(k) \quad (39)$$

where:

$$K_{P1}n = 1 \div [1 - \Delta t \times Af(N(k))],$$

$$K_{P2}n = \Delta t \times b \div [1 - \Delta t \cdot Af(N(k))] \quad (40)$$

Also, in this seventh preferred embodiment, it is given:

$$Af(N(k)) = (-1 \div 200) \times N(k) rpm \quad (41)$$

where Δt=10 msec and b=123.

That is to say, the parameters $k_{P1}n$ and $k_{P2}n$ indicated in the above equation (39) are equal to a function of an engine revolution number. For instance, the higher the engine is revolted, the faster the pressure at the air intake manifold converges to the normal value. In other words, the converging velocity of the pressure at the air intake manifold may be adjusted by the engine revolution number.

The pressure at the air intake manifold is obtained by the calculating unit 21 for the pressure in the air intake manifold based upon the air-flow rate and engine revolution number. In the throttle valve opening angle calculating unit 22, based upon the air flow rates and the pressure values at the air intake manifold obtained from time to time in accordance with the driving conditions, the throttle valve angle data is retrieved by employ the below-mentioned two-dimensional memory map. It should be understood that during this retrieval operation, the interpolation calculation may be carried out. At the throttle-valve-angle calculating unit 22, based on the throttle valve angle obtained when the internal pressure at the air intake manifold and the air flow rate obtained by the engine unitary test are under the normal state, the throttle valve angles in accordance with the actual driving condition are obtained. That is to say, both the pressure at the air intake manifold and the air flow rate are statically changed within the dynamic range and the throttle valve angles at the respective stationary points are obtained. Then, the obtained data on the throttle valve opening angle are stored within the control unit as the two-dimensional memory map where both the pressure at the air intake manifold and the air flow rate are employed as an axis.

As previously explained, the pressure P(k) at the air intake manifold is sequentially calculated with employment of both the air flow rate "$Q_{at}$" and the pressure P(k−1) at the air intake manifold calculated before 10 msec.

Next, the throttle-valve-angle calculating unit 22 arranges values of the throttle valve angles ($\theta_{th}$) in a grid form in case that both the internal pressure P(k) at the air intake manifold and the air-flow rate $Q_{at}(k)$ are statically varied, and the throttle valve angles are calculated from the air-flow rate $Q_{at}(k)$ and the pressure P(k) at the air intake manifold with employment of the two-dimensional memory map stored into ROM of the control unit.

The calculations by the calculating unit 21 for the pressure at the air intake manifold and the calculating unit 22 for the throttle valve angle according to the seventh preferred embodiment, are carried out in a unit time interval of, for instance, 10 msec. The temporary memory unit 23 holds the calculation result made by the calculating unit 21 for the pressure at the air intake manifold only for one time period, and transmits this calculation result to the calculating unit 21 for the pressure at the air intake manifold in order that this result is used for a subsequent calculation at a next time instant.

Figure 43:
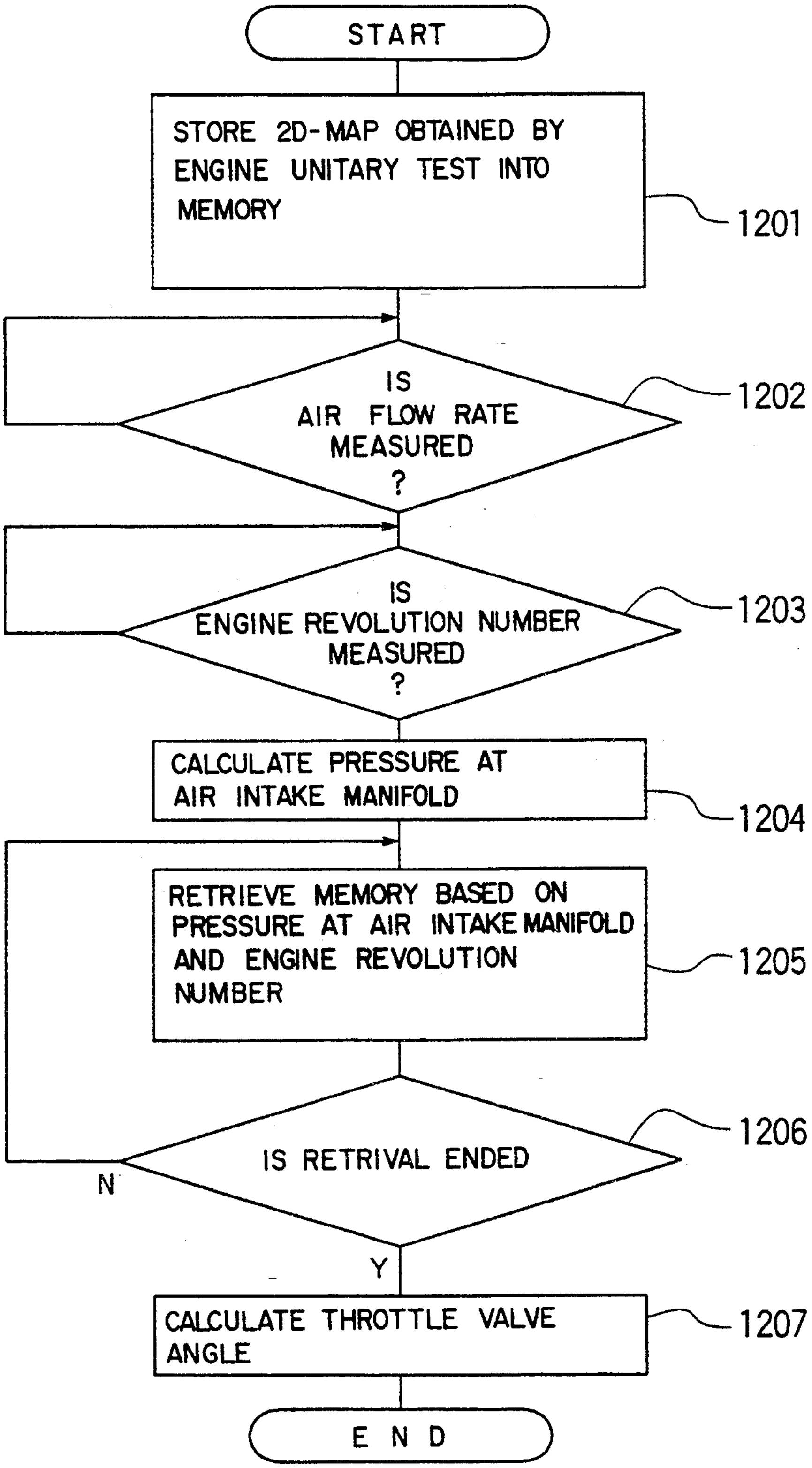
FIG. 43 is a flowchart for explaining an operation sequence of an apparatus for calculating a throttle valve angle in the seventh preferred embodiment shown in FIG. 24.

FIG. 43 is a flowchart for representing an operation by the calculating apparatus for the throttle valve opening angle shown in FIG. 24.

Based upon the pressure at the air intake manifold and the engine revolution number previously obtained by the engine unitary test, the proper throttle valve angles have been stored into the two-dimensional memory map (a step 1201).

Both the air flow rate is measured at a step 1202, and the engine revolution number is measured at a step 1203.

The pressure at the air intake manifold is calculated by the pressure calculating unit 21 for the air intake manifold shown in FIG. 24 at a step 1204. In the throttle valve angle calculating unit, based on the air flow rates and the pressure values at the air intake manifold which are obtained from time to time, depending upon the driving condition, the data on the throttle valve angle are retrieved at steps 1205 and 1206 with employment of the two-dimensional memory map, and the proper throttle valve angle is obtained at a step 1207. It is to be noted that this retrieval may be effected by the interpolation calculation.

Figure 25:
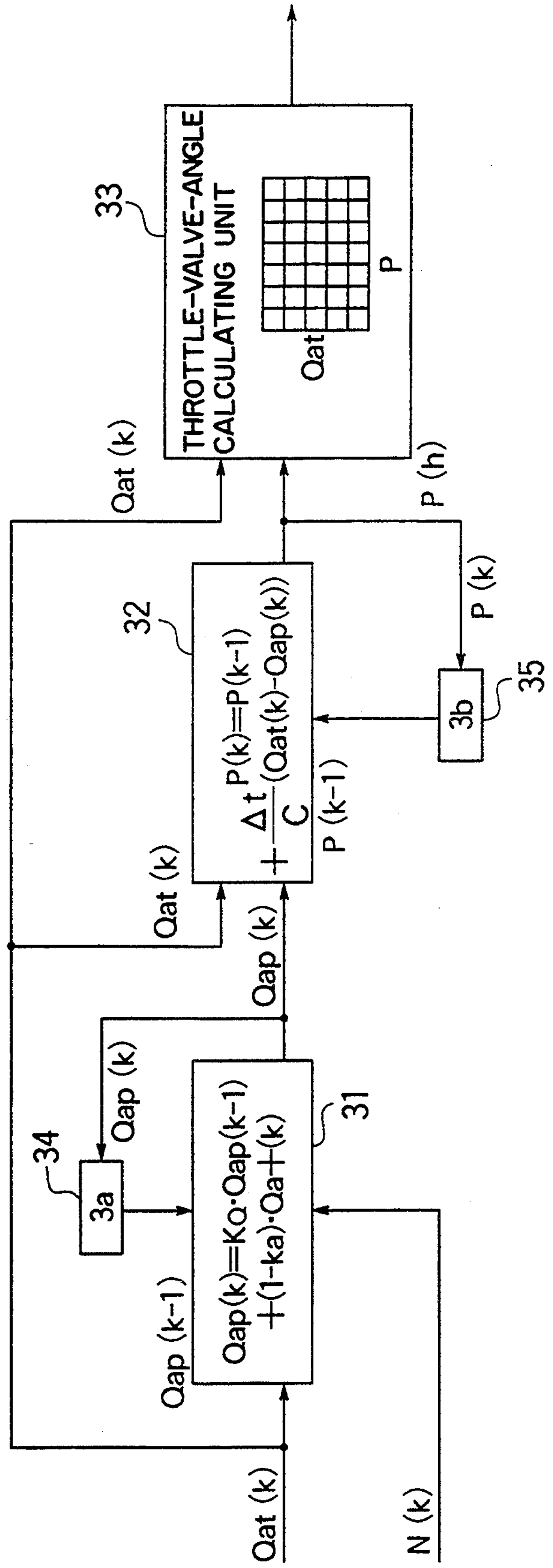
FIG. 25 is a schematic block diagram for showing an arrangement according to a eighth preferred embodiment of the present invention.

FIG. 25 is a schematic block diagram for showing an arrangement of an eight preferred embodiment.

Although the entire part of this embodiment is the same as the entire parts shown in FIGS. 23 and 24 so as to obtain the throttle valve opening angle based upon the air flow rate and engine revolution number, an internal arrangement thereof is different from the shown in FIGS. 23 and 24.

The internal arrangement is arranged by: a calculating unit 31 for calculating an air flow rate at a cylinder port from the engine revolution number and the air flow rate; a calculating unit 32 for calculating pressure at an air intake manifold from the air flow rate calculated by the flow rate calculating unit 31 and the air flow rate; a calculating unit 33 for calculating a throttle valve opening angle from the pressure at the air intake manifold obtained by the pressure calculating unit 32 and the air flow rate; and, temporary storage units (3*a*) 34, and (3*b*) 35.

Based upon the air flow rate $Q_{at}$(k) and the engine revolution number N(k), an air flow rate ($Q_{ap}$(k)) at a cylinder port is calculated by the air flow calculating unit 31. More specifically, for example, the air flow rate at the cylinder port may be obtained by the following lag system:

$$Q_{ap}=Q_{at}\times 1\div[1+T(N)\times S] \quad (42)$$

where:

S: Laplace operator,

T(N): coefficient determined as a function of an engine revolution number.

The instance, if this coefficient is expressed by Af(N) of the above-described equation (37), it may be given:

$$T(N)=1\div Af(N) \quad (43)$$

Although to above-described equation is expressed by a transfer function in a continuous time system, this equation may be obtained by a digital computer.

Next, in the pressure calculating unit 32, the pressure "P" at the air intake manifold is obtained based upon the above-described air flow rate $Q_{at}$ and the air flow rate $Q_{ap}$ at the cylinder port calculated by the air flow rate calculating unit 31.

The pressure "P" may be obtained by solving the following differential equation:

$$C\times d_p\div d_t=Q_{at}-Q_{ap} \quad (44)$$

where symbol "C" denotes a constant.

If the above differential equation (44) is concretely solved, then it may be obtained as follows:

$$P(k)=P(k-I)+[Q_{at}(k)-Q_{at}(k)]\times\Delta t-C \quad (45)$$

To obtain the pressure at the air intake manifold at a time instant "k", as shown in the equation (45), it may be obtained from the calculated pressure values P(k−1) and $Q_{at}$(k) at the preceding time instant, and also the calculated air flow rate $Q_{ap}$(k) at the cylinder port at the present time instant.

At this time, according to the air flow calculating unit 31, the air flow rate ($Q_{ap}$(k)) at the cylinder port is sequentially calculated based upon the below-mentioned equation obtained by discreting the above equation (42):

$$Q_{ap}(k)=K_q\times Q_{ap}(k-1)+(1-k_q)\times Q_{at}(k) \quad (46)$$

where, $$K_q=1\div[\Delta T\times Af(N)+1] \quad (47)$$

$$Af(N)=(-1\div 200)\times N(k)rpm \quad (48)$$

Further, the temporary storage unit (3*a*) 34 temporarily stores the calculated air flow rate at the cylinder port (to store it at a specific place within RAM), and at the subsequent time instant "k", this stored air flow rate is employed as the air flow rate at the cylinder port at a time instant (k−1) for the above equation (36). In other words, this air flow rate is used as a time delay element. As represented by the above equations (47) and (48), the parameter "kg" of the equation (46) is a function of an engine revolution number. If the engine revolution number becomes high, for instance, it is so adjusted that the variations in the air flow rate at the cylinder port become quickly with respect to the variations in the air flow rate.

Next, based upon the calculated air flow rate ($Q_{ap}$(k)), the above-described air flow rate ($Q_{at}$(k)) and the pressure (P(k−1)) at the air intake manifold calculation by the pressure calculating unit 32 at one preceding time instant, the pressure (P(k)) at the air intake manifold may be calculated by the pressure calculating unit 32, as represented in the above equation (45).

Moreover, the throttle valve opening angle may be obtained from the two-dimensional memory may be the throttle-valve-angle calculating unit 33.

This throttle-valve-angle calculating unit 33 is operated similar to that of the throttle valve-angle calculating unit 22 as described in the second preferred embodiment, whereby the throttle valve opening angle ($Q_{th}$(k)) may be obtained every a unit time from both the pressure P(k) at the air intake manifold and the air flow rate ($Q_{at}$(k)) .

Figure 38:
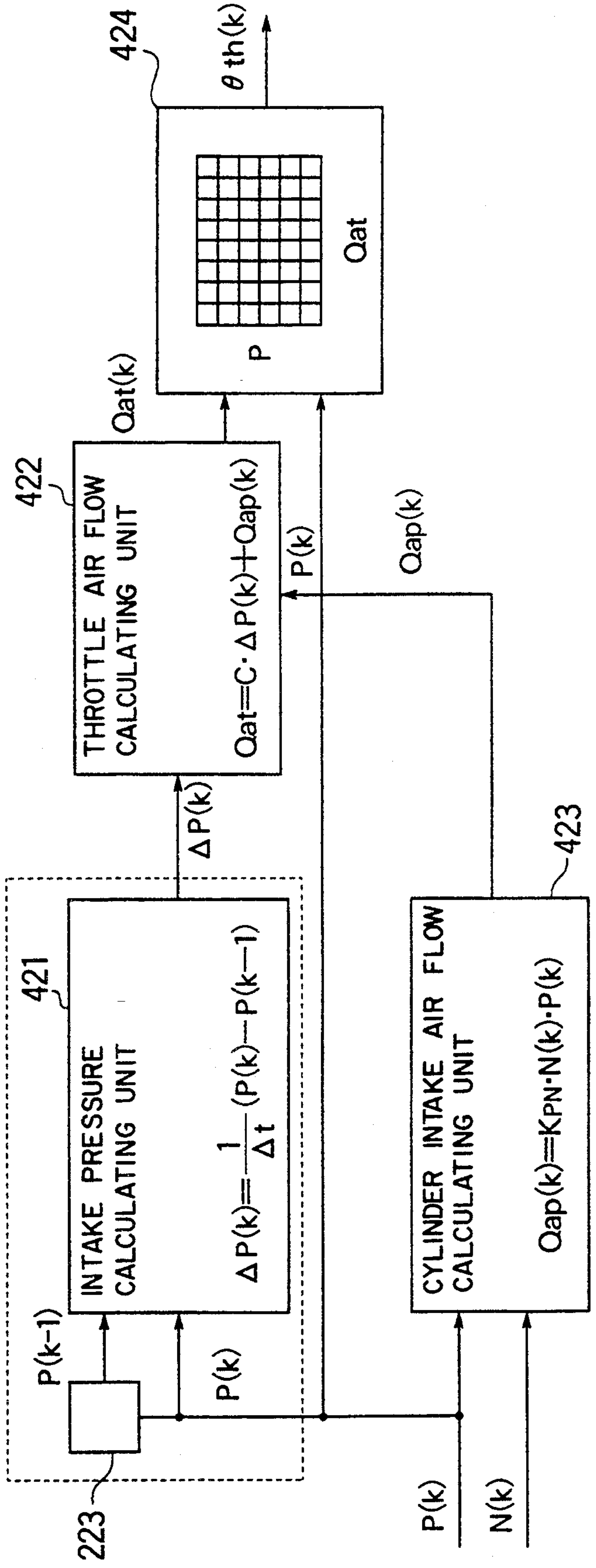
FIG. 38 is a schematic block diagram for showing an arrangement according to a twenty-first preferred embodiment of the present invention.

It should be noted that in this eight preferred embodiment, the data on the throttle valve angle which has been previously obtained by the throttle valve angle calculating unit 33 are the same as the data of the throttle-valve angle calculating unit 22 shown in FIG. 38.

Figure 44:
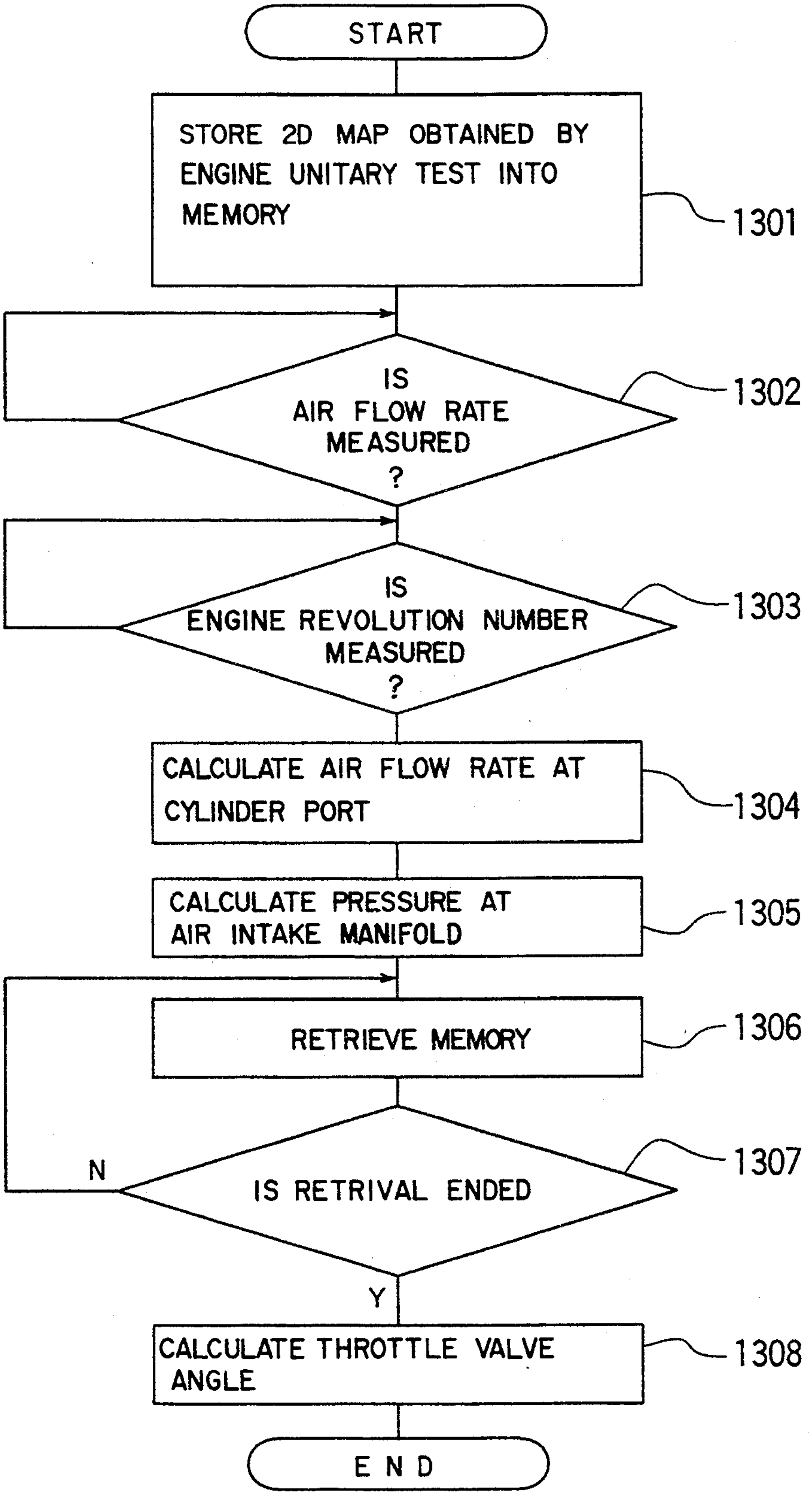
FIG. 44 is a flowchart for explaining an operation sequence of an apparatus for calculating a throttle valve angle in the eighth preferred embodiment shown in FIG. 25.

FIG. 44 is a flowchart for representing an operation of the throttle-valve-angle calculating apparatus shown in FIG. 25.

The proper throttle-valve angle data which have been obtained by the engine unitary test from the air flow rate and the pressure at the air intake manifold, are previously stored in the two dimensional memory map (a step 1301).

First of all, the air flow rate is measured at a step 1302 and also the engine revolution number is measured at a step 1303.

In the calculating unit 31 for calculating the air flow rate at the cylinder port shown in FIG. 25, the air flow rate at the cylinder port is obtained from the air flow rate and engine revolution number at a step 1304. In the calculating unit for calculating the pressure at the air intake manifold, the pressure at the air intake manifold is obtained from the above-described air flow rate at the cylinder port and the air flow rate at a step 1305. In the throttle-valve-angle calculating unit, based upon the two dimensional memory map which has been formed by utilizing the pressure at the air intake manifold obtained by the engine unitary test and also the throttle valve angle when the air flow rate is under the normal condition, the throttle-valve-angle data are retrieved from time to time with employment of this calculated pressure at the air intake manifold at steps 1306 and 1307, whereby the proper throttle valve angle is obtained at a step 1308.

Figure 26:
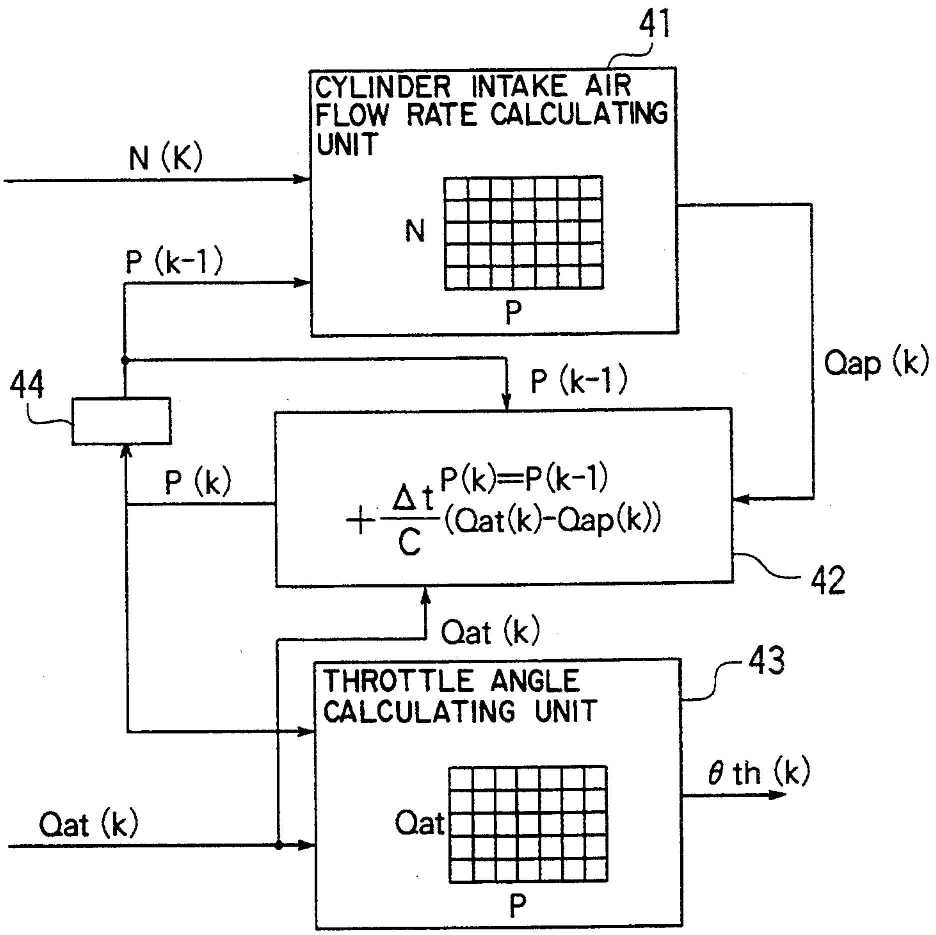
FIG. 26 is a schematic block diagram for showing an arrangement according to a ninth preferred embodiment of the present invention.

FIG. 26 is a schematic block diagram for representing an arrangement of a ninth preferred embodiment.

The entire part thereof is the same as those of the sixth to eighth preferred embodiments, but the internal arrangement thereof is different from those.

The eighth preferred embodiment is so constructed of: a calculating unit 41 for calculating as air flow rate ($Q_{ap}(k)$) at a cylinder port from an engine revolution number ($N(k)$) and pressure ($P(k-1)$) at an air intake manifold at one preceding time instant; a calculating unit 42 for calculating pressure ($P(k)$) at the air intake manifold at a pressure time instant from the air flow rate ($Q_{ap}(k)$) at the cylinder port and the air flow rate ($Q_{at}(k)$) obtained by this air flow rate calculating unit 41; a calculating unit 43 for calculating a throttle valve opening angle ($\theta_{th}(k)$) from the pressure ($P(k)$) at the air intake manifold and the air flow rate ($Q_{at}(k)$) at the present time instant; and also a temporary storage unit 4.

In the air flow rate calculating unit 41, the air flow rates under the normal condition are obtained by way of the engine unitary test by statically changing the engine revolution number and the pressure at the air intake manifold within the dynamic range, and also the obtained air flow rates are previously stored within ROM of the control unit as two-dimensional map data where the engine revolution number and the pressure at the air intake manifold are employed as an axis.

It should be noted that to acquire the above-described map data, it is necessary to measure the air flow rate at the cylinder port. However, to actually measure the air flow rate at the cylinder port, there is a difficulty in a measuring technique. Therefore, the ninth preferred embodiment employs such a measure technique for the sake of simplicity.

That is to say, assuming now that the air flow rate at the cylinder port is identical to the air flow rate passing through the throttle valve under the normal condition, the air flow rate passing through the throttle valve is actually measured, which is used as the above-described map data. Since the above-described map data may be obtained under the normal driving condition, there is no problem in precision of data acquisition, whereby the simple measuring method may be realized. Now, this simple measuring method will be explained.

Based upon the pressure ($P(k-1)$) at the air intake manifold calculated at the preceding time instant ($k-1$), and the engine revolution number ($N(k)$) at the present time instant, the cylinder port air flow rate ($Q_{ap}(k)$) at the present time instant (k) is obtained by the calculating unit 41 for the air flow rate at the cylinder port.

Based upon the obtained air flow rate ($Q_{ap}(k)$) at the cylinder port and the air flow rate ($Q_{at}(k)$), the pressure ($P(k)$) at the air intake manifold may be obtained in accordance with the equation (45) by the pressure calculating unit 42.

Then, the obtained pressure at the air intake manifold is held in the temporary storage unit 44, which is used for the calculations performed in both the air flow rate calculating unit 41 at the succeeding time instant and the pressure calculating unit 42 at the air intake manifold. That is to say, the temporary storage unit 44 corresponds to a time lag element at one time instant.

Subsequently, based upon the pressure ($P(k)$) at the air intake manifold and the air flow rate ($Q_{at}(k)$) obtained by the calculating unit 42 for calculating the pressure at the air intake manifold at the present time instant (k), the throttle valve opening angle ($\theta_{th}(k)$) is obtained by the throttle valve angle calculating unit 43.

The operations of the throttle-valve-angle calculating unit 43 are the same as those of the throttle valve-angle calculating unit 22 and 23 represented in the seventh and eighth preferred embodiments, and the two-dimensional map data thereof are identical to those of these preferred embodiments.

Figure 45:
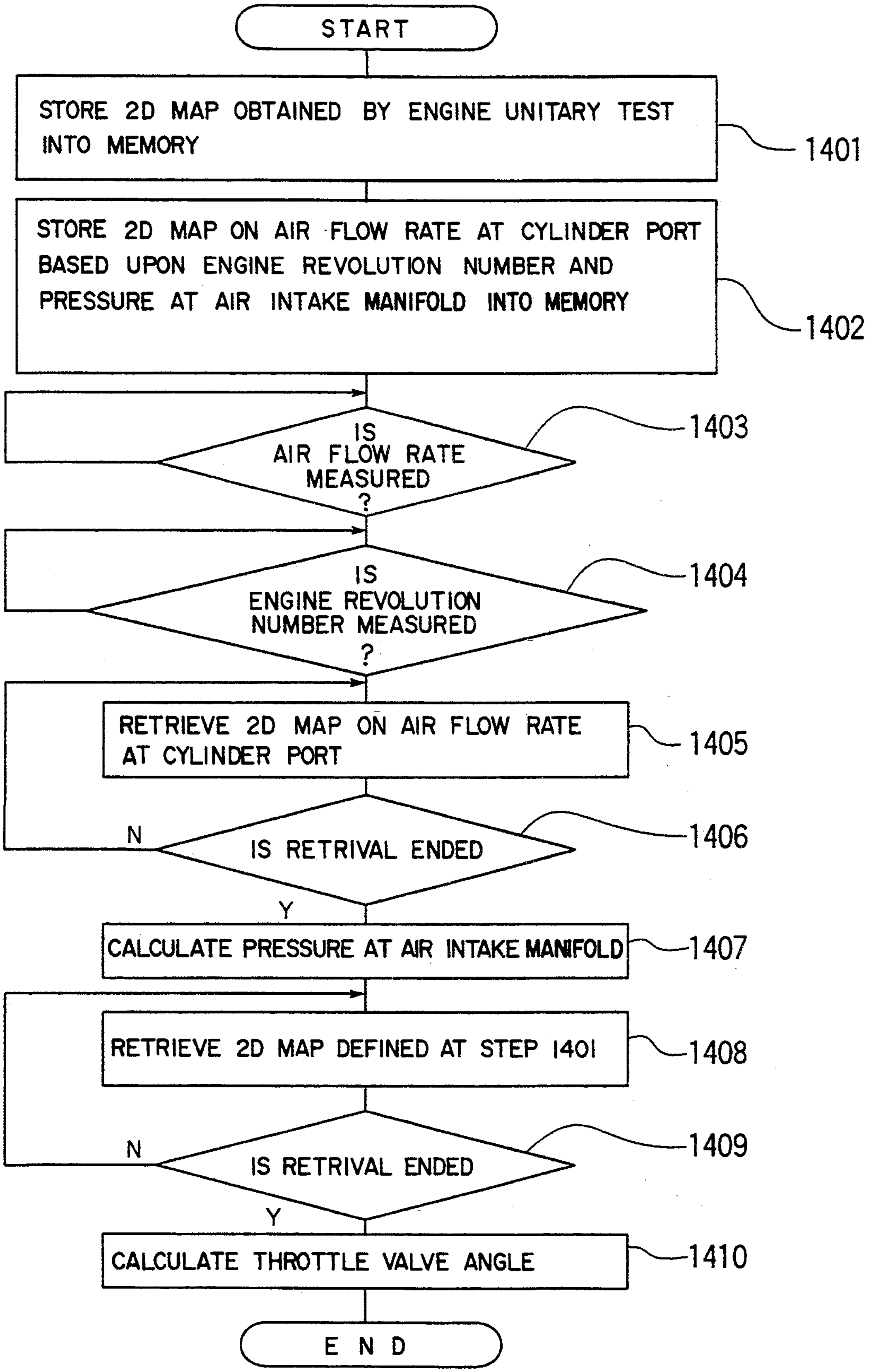
FIG. 45 is a flowchart for explaining an operation sequence of an apparatus for calculating a throttle valve angle in the ninth preferred embodiment shown in FIG. 26.

FIG. 45 is a flowchart for explaining an operation of the throttle-valve-angle calculating apparatus shown in FIG. 26.

Based upon the air flow rate and pressure at the air intake manifold, the proper throttle-valve-angle data obtained by the engine unitary test are previously stored into the tow-dimensional memory map at a step 1401.

Similarly, in the calculating unit 41 for calculating the air flow rate at the cylinder port shown in FIG. 26, both the engine revolution number and pressure at the air intake manifold are statically varied within the dynamic ranges thereof by the engine unitary test, whereby the air flow rates at the normal conditions are obtained, and the obtained data on the air flow rated the cylinder port as stored in the control unit as the two-dimensional memory map where both the engine revolution number and the pressure at the air intake manifold are used as the axis (at a step 1402).

The air flow rate is measured at a step 1403 and the engine revolution number is measured at a step 1404.

With employment of the above-described two-dimensional memory map, the calculating unit 41 for calculating the air flow rate at the cylinder port shown in FIG. 26 retrieves the air flow rates at the cylinder port from time to time in response to the values of the pressure at the air intake manifold acquired at the preceding time instant, and also the engine revolution number at the present time instant (at steps 1405 and 1406), and also obtains the proper air flow rate at the cylinder port at a step 1407.

The operations of the calculating unit for calculating the pressure at the air intake manifold and of the calculating unit for calculating the throttle valve angle, are substantially the same as those with reference. That is to say, since the air flow rate at the cylinder port at the present time instant obtained in the pressure calculating unit for the air intake manifold is utilized for the calculation effected at the preceding succeeding time instant, this value is held until the subsequent time instant.

That is to say, based upon the air flow rate and the pressure at the air intake manifold, the two-dimensional memory map for previously storing therein the proper throttle valve angle data is retrieved at steps 1408 and 1409, and the proper throttle valve angle is calculated at a step 1410.

According to the ninth preferred embodiment, in the calculating unit for calculating the air flow rate at the cylinder port and the throttle-valve-angle calculating unit, since the previously set data corresponds to the data under the normal condition, and may be ready measured by the engine unitary test, the data precisely reflecting the engine characteristics may be preproduced.

On the other hand, to express the dynamic characteristic within the air intake manifold in the calculating unit for calculating the pressure at the air intake manifold, since the parameter "C" (i.e., constant expressed in the equations (44) and (45)) for managing the dynamic characteristic may be substantially intentionally determined as a mere first order delay system, the inferred values ($Q_{ap}$(k), P(k), $\theta_{th}$(k)) during the transition time may be calculated at higher precision, according to the ninth preferred embodiment.

In this preferred embodiment, the parameter "C" is obtained as follows:

$$C=R\times Tm\div V \quad (49)$$

where:

R: gas constant,

V: volume of air intake manifold,

Tm: gas temperature.

Since the gas temperature was not measured in the ninth preferred embodiment, the value Tm−3° K. Δt the ordinary temperature was employed. If however the gas temperature was measured, the temperature Tm may be substituted by this gas temperature. Alternatively, the gas temperature is inferred by way of other different methods and the temperature Tm may be substituted by this inferred gas temperature.

Figure 27:
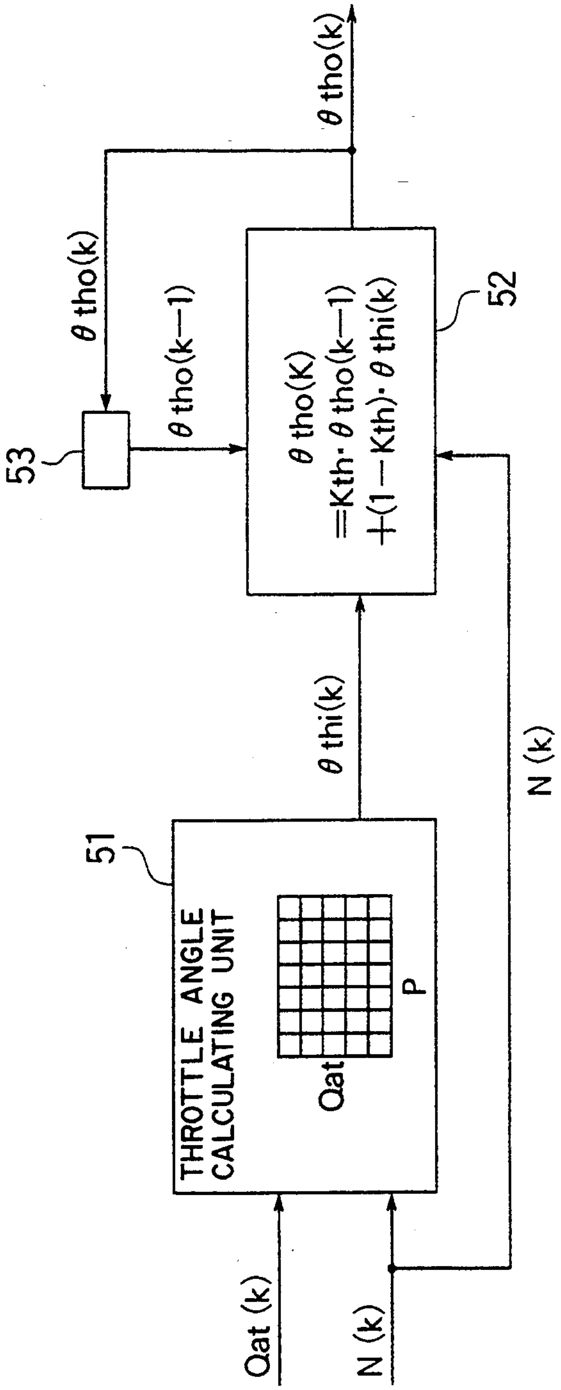
FIGS. 27(*a*) and 27(*b*) are schematic block diagrams for showing an arrangement according to a tenth preferred embodiment of the present invention.
Figure 27:
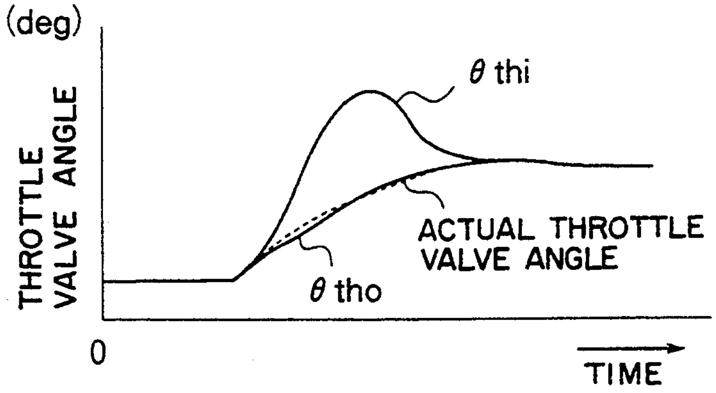

FIG. 27 is a schematic block diagram for representing an arrangement according to a tenth preferred embodiment.

This embodiment is constructed of a calculating unit 51 for calculating a throttle valve angle a smoothing unit 52, and a temporary storage unit 53.

In accordance with the operation according to the tenth preferred embodiment, the throttle valve opening angle which has been obtained from any one of the previous methods in which the throttle valve angle is obtained from the air flow rate and engine revolution number with employment of the arrangements according to the sixth to ninth preferred embodiments, is subjected to the smoothing process by the smoothing process unit (lag filter) which has been explained in the sixth preferred embodiment.

More specifically, among the methods for obtaining the throttle valve angle based upon the air flow rate and engine revolution number according to the sixth to ninth preferred embodiments, the overshoot in the obtained throttle valve opening angle may be suppressed by the arrangement of the sixth preferred embodiment, namely the throttle valve angle obtained by the throttle-valve-angle calculating unit is smoothed.

As previously explained, this preferred embodiment is achieved by improving the sixth preferred embodiment shown in FIG. 23, but may be established by employing the constructions represented in FIGS. 24 to 26.

As shown in FIG. 27A, the throttle valve opening angle ($\theta_{th}$i(k)) is obtained by the throttle-valve-angle calculating unit 51. This throttle-valve-angle calculating unit 51 is identical to the throttle-valve-angle calculating unit 11 according to the sixth preferred embodiment, shown in FIG. 23.

Thus, the obtained throttle valve angle ($\theta_{th}$(k)) is smoothed by this throttle-valve-angle calculating unit 51.

More specifically, when the construction for obtaining the throttle valve angle is used for the construction according to the sixth preferred embodiment, it is useful to employ, for instance, a transfer function of a lag filter. Thus may be expressed as follows:

$$\theta_{tho}=\theta_{thi}\times 1\div[1+T(N)\times S] \quad (50)$$

where:

$\theta_{thi}$: throttle valve angle obtained by throttle-valve-angle calculating unit, $\theta_{tho}$: throttle valve angle smoothed by transfer function of equation (50).

Although the equation (50) is the same as the transfer function of the equation (42), the coefficient T(N) may not be the function of the engine revolution number.

With respect to the smoothing sample represented in the above-described equation (50), there is another smoothing process capable of discreting and sequentially calculating the data:

$$\theta_{tho}(k)=K_{th}\times\theta_{tho}(k-1)+(1-K_{th})\times\theta_{thi}(k)$$

where:

$$K_{th}=1\div[\Delta t\times Af(N)\div 1] \quad (52)$$

$$Af(N)=-1\times N(k)\div 200 \quad (53)$$

The above-described equations (52) and (53) employ the coefficients identical to those employed in the smoothing process of the air flow rate effected in the calculating unit 31 for calculating the air flow rate at the cylinder port according to the eighth preferred embodiment. As a consequence, as represented in FIG. 27A, the parameters for managing the dynamic characteristic of the smoothing process are mainly used as a function of the engine revolution number.

As previously described, the lag filter employed in the smoothing process unit 52 smooth the throttle valve angle obtained from the air flow rate and engine revolution number. It should be noted that since this lag filter used in the smoothing process may employ a first-order lag filter, because the first-order lag filter better represents the characteristics of the variations in the pressure values at the air intake manifold. However not only the first-order filter, but also the second order lag filter and third order lag filter may be employed if these filters substantially represent the actual movements of the throttle valve opening angles and have higher precision.

Figure 46:
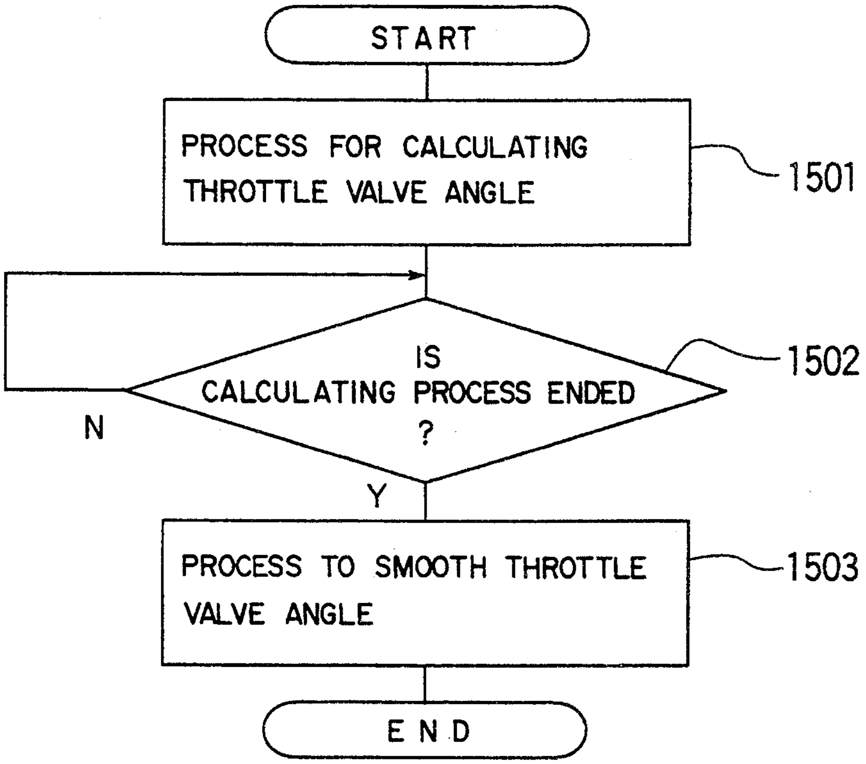
FIG. 46 is a flowchart for explaining an operation sequence of an apparatus for calculating throttle valve angle in the tenth preferred embodiment shown in FIG. 27.

FIG. 46 is a flowchart for representing an operation of the throttle-valve-angle calculating apparatus shown in FIG. 27.

The throttle valve opening angle is calculated in any one of the sixth to ninth preferred embodiments (steps 1501 to 1502), and then is smoothed (a step 1503).

FIG. 27B is a graphic representation for showing effects of the tenth preferred embodiment.

When, for instance, the throttle valve is actually opened rapidly, there are some possibilities that the throttle valve angle obtained by the throttle-valve-angle calculating unit represents an overshoot as shown by $\theta_{thi}$ of FIG. 10B. That is to say under the normal i driving state, even when the throttle valve angle may be calculated similar to the actual throttle valve angle, there are large differences between the calculated throttle valve angle and the actual throttle valve angle during the rapid acceleration. Therefore, by performing the smoothing process at the smoothing process unit 52 based upon the above equation (51), the output valve $\theta_{tho}$ of the smoothing process may be analogous to the actual throttle valve angle even during the transition. Also, since the smoothing process according to the tenth preferred embodiment considers the dynamic characteristics within the air intake characteristics within the air intake manifold, namely the formats and parameters of the equations (46) and (51) are the same, this smoothing process is not different from a mere smoothing process, but the higher precision in inferring the throttle valve opening angle may be maintained. Further, the equation (51), may be easily calculated.

Figure 28:
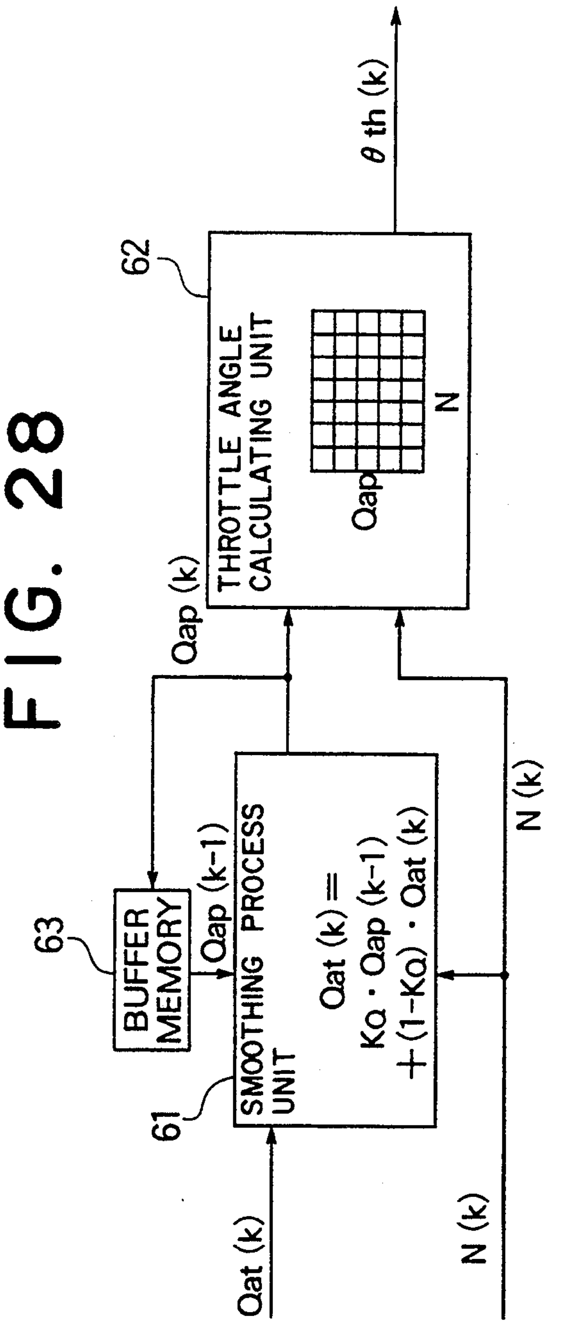
FIG. 28 is a schematic block diagram for showing an arrangement according to a element preferred embodiment of the present invention.

FIG. 28 is a schematic block diagram for representing an arrangement of a eleventh preferred embodiment.

The eleventh preferred embodiment corresponds to the tenth preferred embodiment except that the sequence thereof is universed. That is to say, with employment of the result ($Q_{ap}$(k)) obtained by smoothing the air flow rate ($Q_{at}$(k)) in the smoothing process unit 61, the throttle valve angle ($\theta_{th}$(k)) is obtained by the throttle-valve-angle calculating unit 62 identical to the throttle-valve-angle calculating unit 11 according to the sixth preferred embodiment. In particular, it is useful to employ the throttle-valve-angle calculating unit 231 of the sixth preferred embodiment, as same as in the fifth preferred embodiment.

Also, the smoothing process performed in the smoothing process unit 61 is the same as the process executed in the calculating unit 31 for calculating the air flow rate at the cylinder port according to the third preferred embodiment, and this smoothing process is carried out by employing the above-described equations (46), (47) and (48).

Then, based upon the air flow rate ($Q_{ap}$(k)) obtained in the smoothing process unit 61 and the engine revolution number (N(k)), the throttle valve opening angle may be calculated by the throttle-valve-angle calculating unit 62 with employment of the two-dimensional memory map identical to that of the sixth preferred embodiment.

As apparent from the foregoing description, the smoothing filter executes the smoothing process shown in FIG. 27 with respect to the air flow rate measured in front of the throttle-valve-opening-angle calculating unit. In particular, when the throttle-valve-angle calculating unit 231 is utilized, there is a merit that the air flow rate is processed in the first order lag filter.

Figure 47:
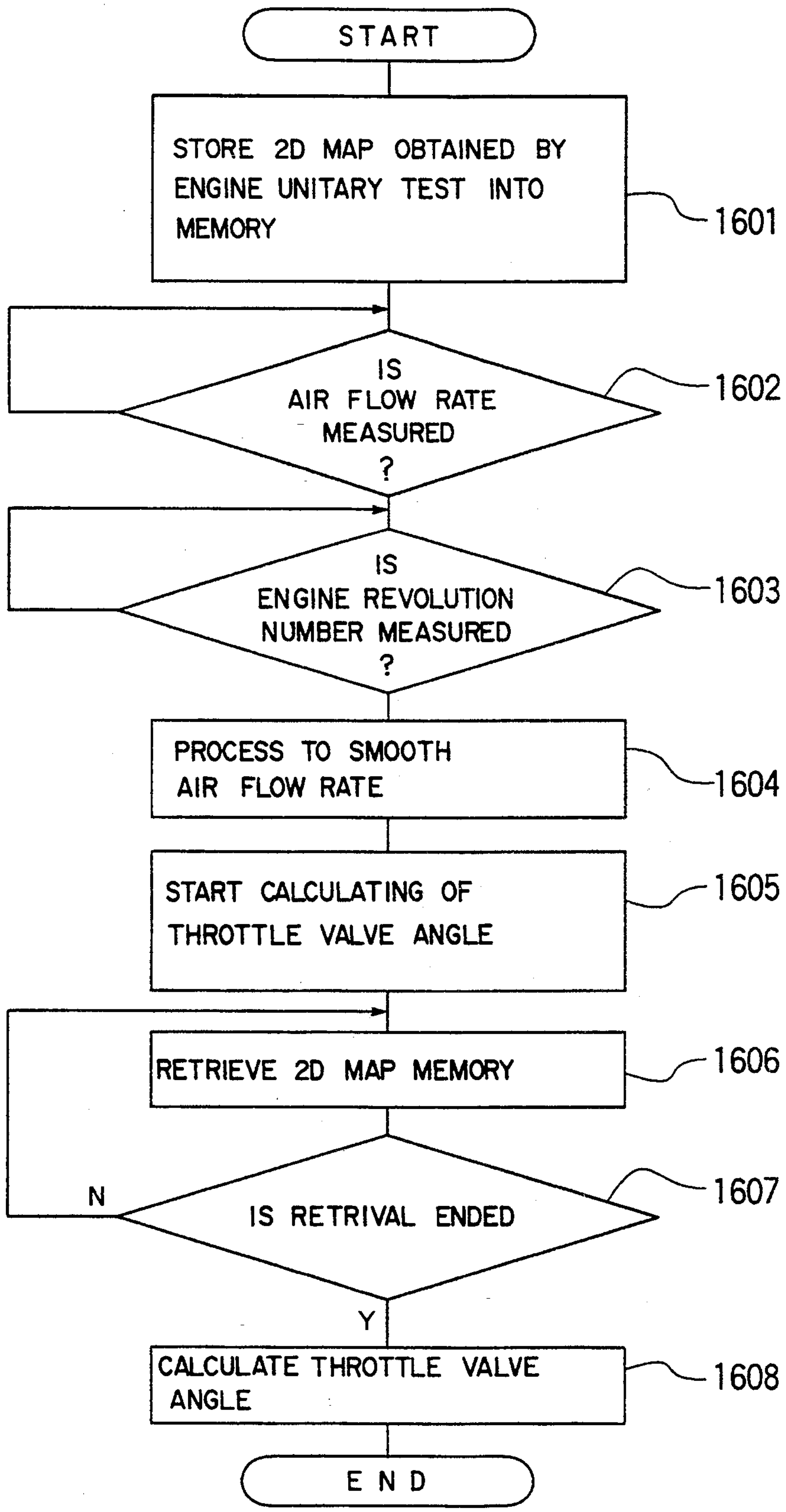
FIG. 47 is a flowchart for explaining an operation sequence of an apparatus for calculating a throttle valve angle in the eleventh preferred embodiment shown in FIG. 28.

FIG. 47 is a flowchart for showing an operation of the throttle-valve-angle calculating apparatus shown in FIG. 28.

Based upon the air flow rate and engine revolution number, the throttle-valve-angle data are previously stored into the two-dimensional memory map by way of the engine unitary test (a step 1601). The air flow rate is measured at a step 1602 and the engine revolution number is measured at a step 1603.

The air flow rate measured by the smoothing unit 61 shown in FIG. 28 is smoothed at a step 1604, and the calculation on the throttle valve angle is commenced based upon the smoothed air flow rate at a step 1605. Based on both the engine revolution number acquired at the step 1603 and the air flow rate smoothed at the step 1604, the two-dimensional memory map is retrieved (steps 1606 and 1607), thereby calculating the proper throttle valve angle (step 1608).

It should be noted that the effects according to the eleventh preferred embodiment is similar to those of the tenth preferred embodiment. That is to say, since the smoothing process is carried out, taking account of the dynamic characteristic in the air intake manifold, no overshoot is present at the obtained throttle valve angle, and this throttle valve angle may be analogous to the practical throttle valve angle even during the transition.

Figure 29:
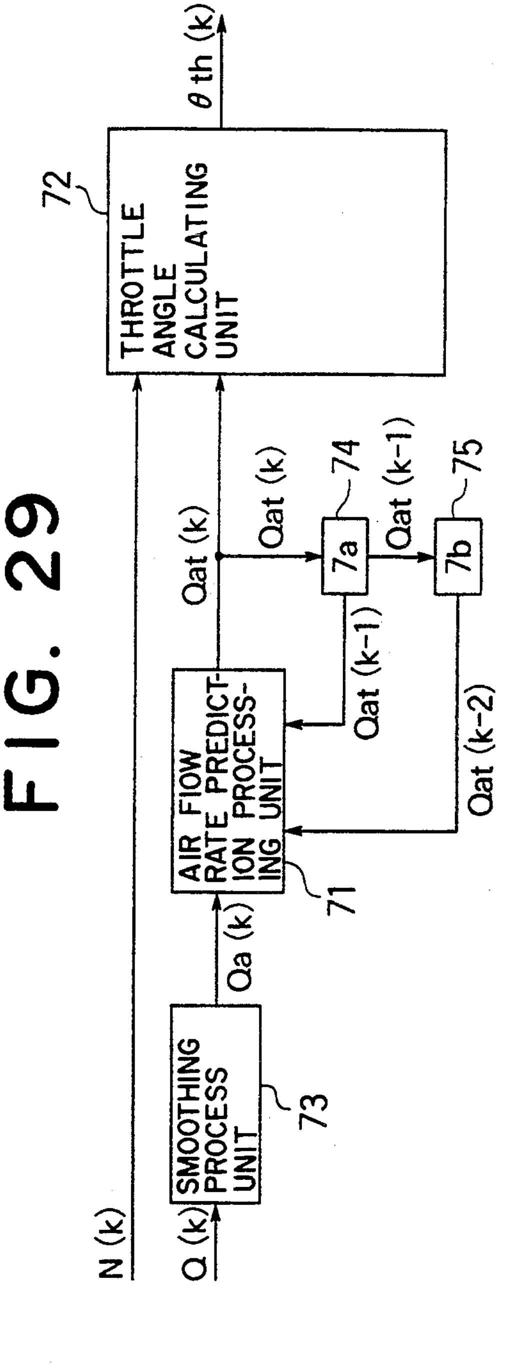
FIG. 29 is a schematic block diagram for showing an arrangement according to a twelfth preferred embodiment of the present invention.

FIG. 29 is a schematic block diagram for showing an arrangement according to a twelfth preferred embodiment.

Basically, this preferred embodiment is constructed by adding a prediction processing unit 71 for predicting an air flow rate to a calculating unit 72 for calculating a throttle valve opening angle which performs the operations according to the sixth to eleventh preferred embodiments. Furthermore, this preferred embodiment is arranged by a smoothing process unit 73, a temporary storage unit (*7a*) 74 and a temporary storage unit (*7b*) 75.

The function of the prediction processing unit 71 for predicting the air flow rate is to predict an air flow rate which is used as an input for the sixth to eleventh preferred embodiments. In other words, at the prestige of the air flow rate functioning as the input, the smoothing process is carried out because both noise and pulsatory components contained in the air flow meter (H/W sensor) should be smoothed. Based upon this result, the prediction process is performed in order to correct the delay or lag occurring during the smoothing process.

In FIG. 29, the air flow rate ($Q_a$(k)) to be inputted to the air flow rate prediction processing unit 71 corresponds to such a flow rate obtained by smoothing the noise and pulsatory component contained in the air flow rate (Q(k)) by the smoothing process unit 73. That is to say, after the output voltage from the H/W sensor is filtered by an RC circuit or A/D converted so as to convert the voltage into the industrial value, the resultant value is processed by the lag filter.

In the air flow rate prediction processing unit 71, the air flow rate ($Q_{at}$(k)) to be inputted to the throttle-valve-angle calculating unit 27 is obtained by a lead filter based upon the following equation.

According to this preferred embodiment, the following lead filter was constructed in the air flow rate prediction processing unit 71 in combination with the lead filter.

$$Q_{at}(k) = [1 + (T_1 + T_2) \div \Delta t + T_1 \times T_2 \div (\Delta t)^2] \times Q_a(k) - [(T_1 + T_2) \div \Delta t + 2 \times T_1 \times T_2 \div (\Delta t)^2] \times Q_a(k-1) + T_1 \times T_2 \div (\Delta t)^2 \times Q_a(k-2) \quad (54)$$

where symbols $T_1$ and $T_2$ are set to the following conditions.

$T_1$: Equal to a time constant of the above-described RC circuit filter.

$T_2$: Equal to a time constant of the above-described lag filter.

The predicted air flow rate ($Q_{at}$(k)) obtained at the air flow rate prediction processing unit 71 is employed as an input to the throttle-valve-angle calculating unit 72 together with the engine revolution number (N(k)). In the throttle-valve-angle calculating unit 72, the throttle valve angle is calculated.

As previously described, the lead filter performs the air-flow rate prediction process for the air flow rate whose noise and pulsatory component have been smoothed, namely smoothing-processed, whereby the predicted air flow rate is calculated. The predicted air flow rate is combined with any of the arrangements shown in FIGS. 23 to 28, and is utilized therein so as to calculate the throttle valve opening angle. That is to say, at the front stage of the air flow rate to be inputted into the air flow rate prediction process unit, the smoothing process is carried out in order to smooth the noise and pulsatory components contained in the air flow rate (H/W sensor), and the air flow rate prediction processing unit performs the prediction process based upon the smoothed result.

Figure 48:
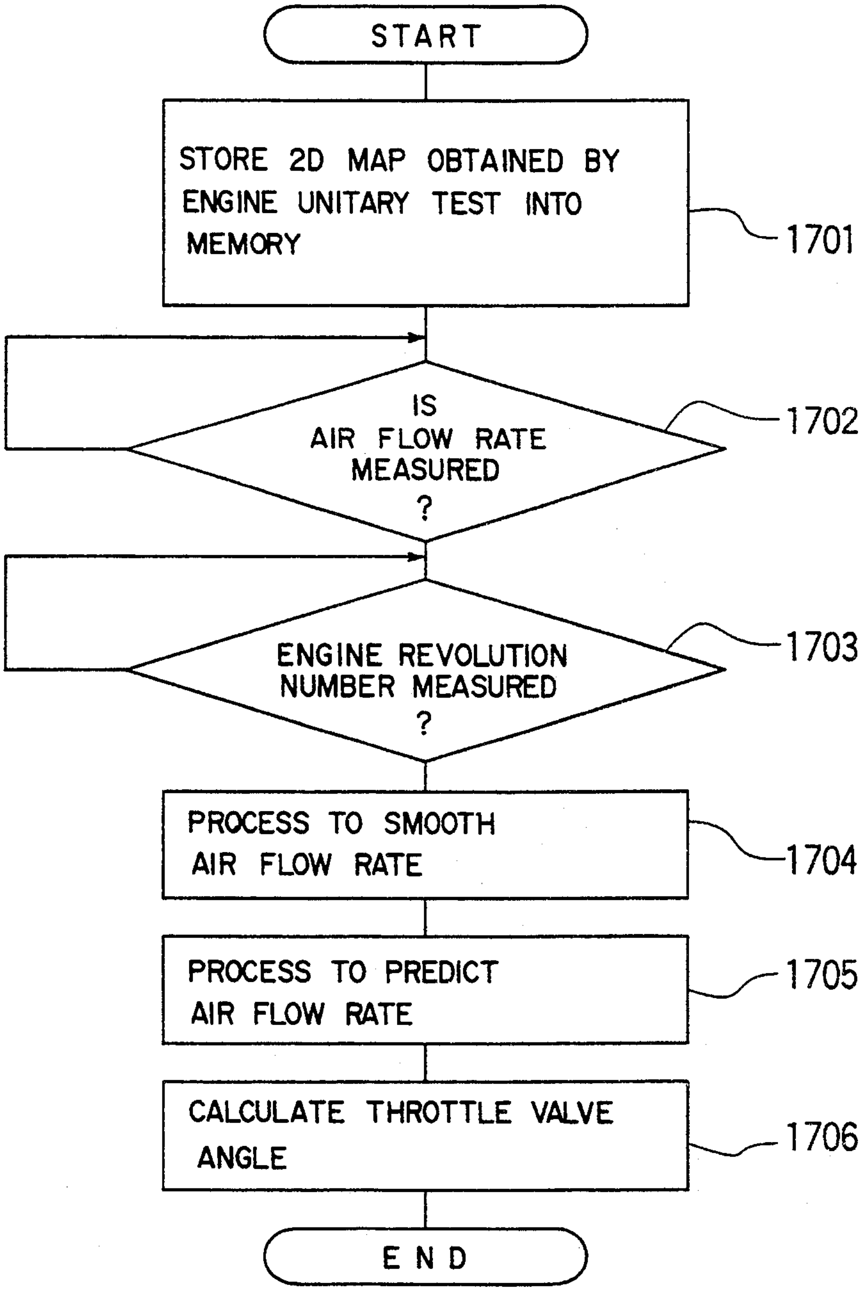
FIG. 48 is a flowchart for explaining an operation sequence of an apparatus for calculating a throttle valve angle in the twelfth preferred embodiment shown in FIG. 29.

FIG. 48 is a flowchart for representing an operation of the throttle-valve-angle calculating apparatus shown in FIG. 29.

The throttle-valve-angle data obtained based upon the air flow rate and engine revolution number are previously stored into the two-dimensional memory map by the engine unitary test at a step 1701. The air flow rate is measured at a step 1702 and the engine revolution number is measured at a step 1703.

In the smoothing process 73 shown in FIG. 29, the air flow rate measured at the step 1702 is smoothing-processed (a step 1704) and furthermore, the prediction process for the air flow rate is performed at the air flow rate prediction processing unit 71 shown in FIG. 29 (at a step 1705).

Based on the air flow rate predict-processed and the engine revolution number measured at the step 1703, the proper throttle valve angle is calculated (a step 1406).

In accordance with this preferred embodiment, two-staged lag filter performs the smoothing process by employing the RC circuit and lag filter. With respect to the resultant data, the delays may be compensated by way of the lead filters having the corresponding time constants.

Figure 30:
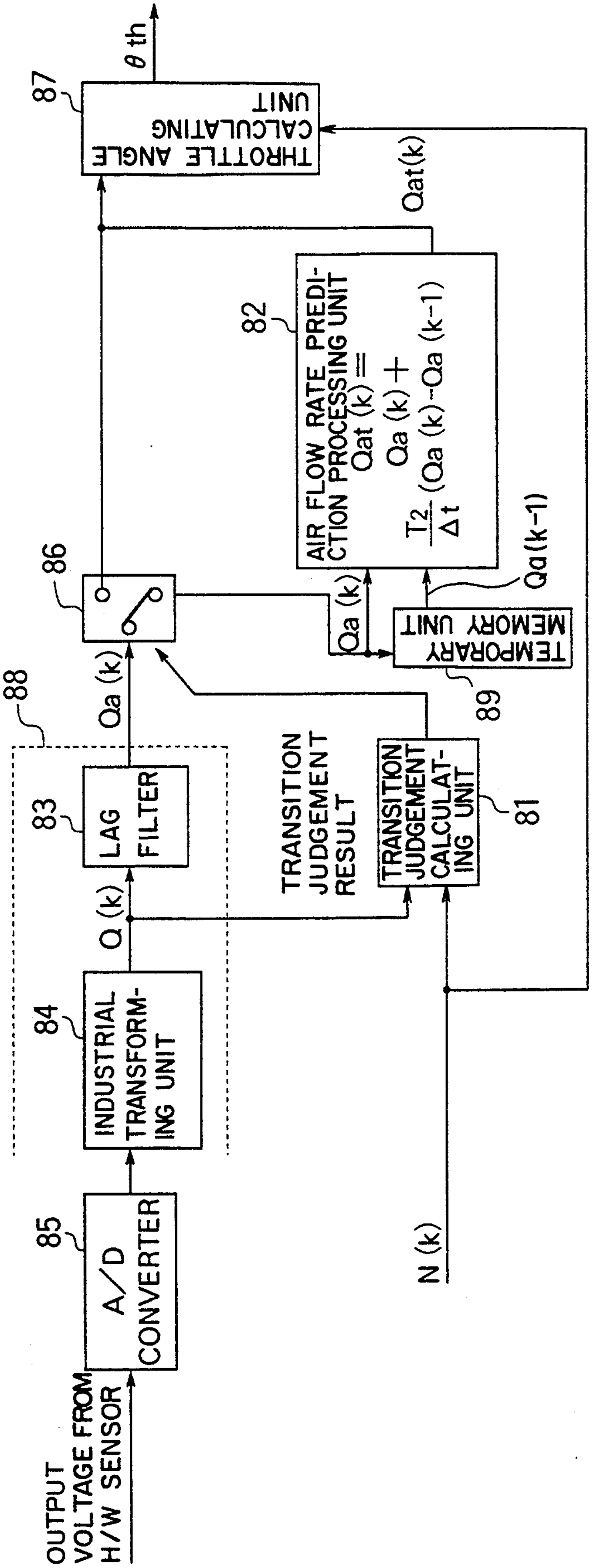
FIG. 30 is a schematic block diagram for showing an arrangement according to a thirteenth preferred embodiment of the present invention.

FIG. 30 is a schematic block diagram for representing a construction according to 13th preferred embodiment.

It is conceived that the best way to directly detect a throttle valve opening angle in order that a quick detection is made whether a normal driving operation or a transition driving operation is effected. However, according to the present invention, since the control method for requiring no throttle-valve-angle sensor has been proposed, it is very important to judge whether or not the transition condition is effected by detecting the air flow rate as quickly as possible. As a consequence, considering the physical characteristics of the air flow rate passing through the throttle valve, the transition judging method based upon this characteristic is provided.

Characteristic 1

Where the throttle valve opening angle is small, the pulsatory component hardly occurs. Conversely, where the throttle valve opening angle is large, the pulsatory component reading occurs.

Characteristic 2

After the pressure at the air intake manifold becomes large to some extent, the pulsatory component may occur. No pulsatory component happens to occur until the pressure at the air intake manifold is low.

Characteristic 3

Since there are the pulsatory components where the throttle valve angle is large, and it is difficult to judge whether the acceleration or deceleration is performed, the variations in the air flow rate per a unit crank interval should be taken into account.

Under such characteristics, there is shown a method for judging whether or not an acceleration, or a deceleration is executed at a high speed.

(a). In case that the air flow rate is increased from such a region where no pulsatory component is present, it is judged that no pulsatory component occurs and an acceleration is executive.

(b). The pulsatory component occurs at a unit crank period. When this pulsation collapses every unit crank angle, a judgement is made that the normal condition is shifted to the transition condition. For instance, it is judged as an acceleration when a minimum value occurring at the unit crank angle of the pulsatory air flow rate disappears.

(c). When a summation of the air flow rates, or an averaged value, which have been measured at unit crank interval, e.g., 180° crank angle in case of a 4-cylinder/4-cycle engine, is monotonously increased, an acceleration is performed. Conversely, if these values are monotonously decreased, a deceleration is executed.

(d). In case that the air flow rate is monotonously increased at such a region of the crank angle that the air flow rate is decreased if the pulsation happens to occur, it is judged that an acceleration is performed.

Now, a 13th preferred embodiment will be explained.

An output voltage from an H/W sensor is A/D-converted by an A/D converter 85 into a corresponding digital value, and thereafter the voltage is converted in an industrial value converting unit 84 into a physical unit (min/g). Thereafter, a smoothing process is carried out by a lag filter corresponds to a first order filter, a time constant of which is "$T_2$". These arrangement may be realized by the conventional technique.

In accordance with this preferred embodiment, based upon the air flow rate converted into the industrial value, a judgement whether an acceleration/deceleration is performed is realized in a transition judging unit 81. Based upon this judgement, it is determined whether or not the air flow prediction process is carried out.

In the air flow rate prediction processing unit 82, a delay in a lag filter is corrected by employing the above-described time constant $T_2$ as follows:

$$Q_{at}(k)=[Q_a(k)+[Q_a(k)-Q_a(k-1)]\times T_2\div\Delta t \qquad (19)$$

where:

$Q_a$: air flow rate smoothed by lag filter 83.

As previously described, according to the 13th preferred embodiment, there is provided the transition judgement calculating unit 81 for judging whether it is under the transition driving state (acceleration/deceleration operations), or under the normal driving state. If it is under the transition driving state, the above-described air flow prediction process is performed. To the contrary, if it is under the normal driving state, only the smoothing process is carried out and no air flow rate prediction process is executed.

Figure 34:
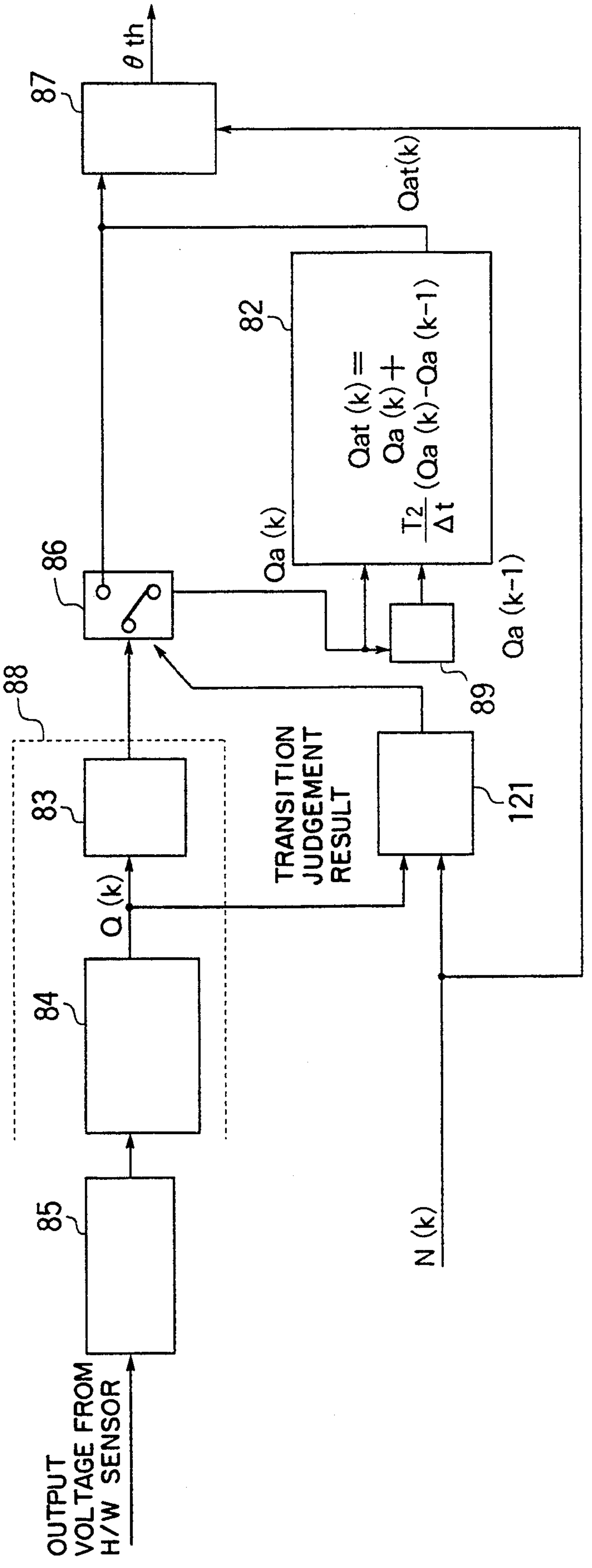
FIG. 34(*a*) and 34(*b*) are schematic block diagrams for showing an arrangement according to a seventeenth preferred embodiment of the present invention.
Figure 34:
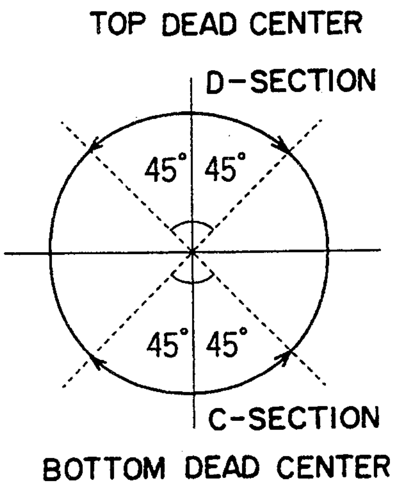
Figure 49:
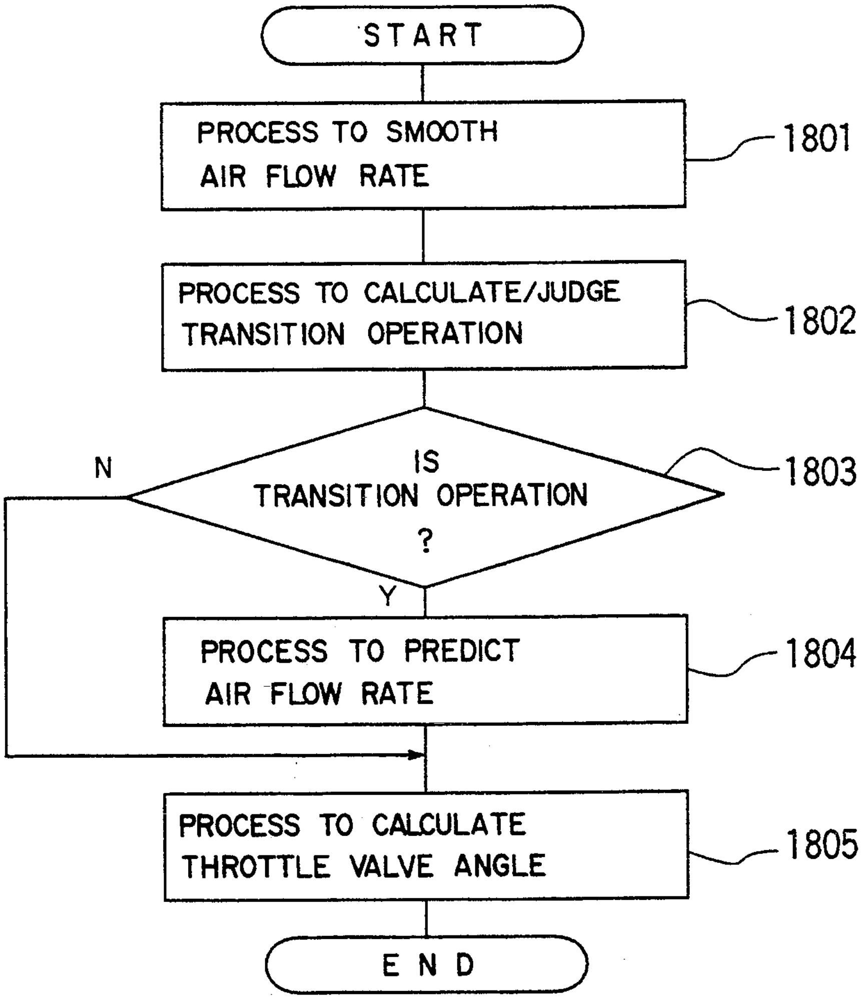
FIG. 49 is a flowchart for explaining an operation sequence of an apparatus for calculating a throttle valve angle in the thirteenth preferred embodiment shown in FIG. 30.

FIG. 49 is a flowchart for representing an operation of the throttle-valve-angle calculating apparatus shown in FIG. 34.

First, the measured air flow rate is smoothed at a step 1801.

The transition judgement calculating unit 81 judges whether the transition driving operation (acceleration/deceleration), or the normal driving operation is carried out (steps 1801 and 1802). If the transition driving operation is effected (step 1803), the air flow rate prediction process as described in FIG. 7 is performed at a step 1804, whereas if the transition driving operation is carried out, only the smoothing process is carried out and no air flow prediction process is executed so as to calculate the throttle valve opening degree (a step 1805).

It should be noted that the major reason why no air flow rate prediction process is carried out during the normal driving operation, is to avoid such a noise amplification caused by the air flow rate prediction processing unit 82 shown in FIG. 29 and the noises which are not sufficiently smoothed by the smoothing process during the normal operation.

Referring now to FIGS. 31 to 34, the above-described 13th preferred embodiment will be described more in detail.

Figure 31:
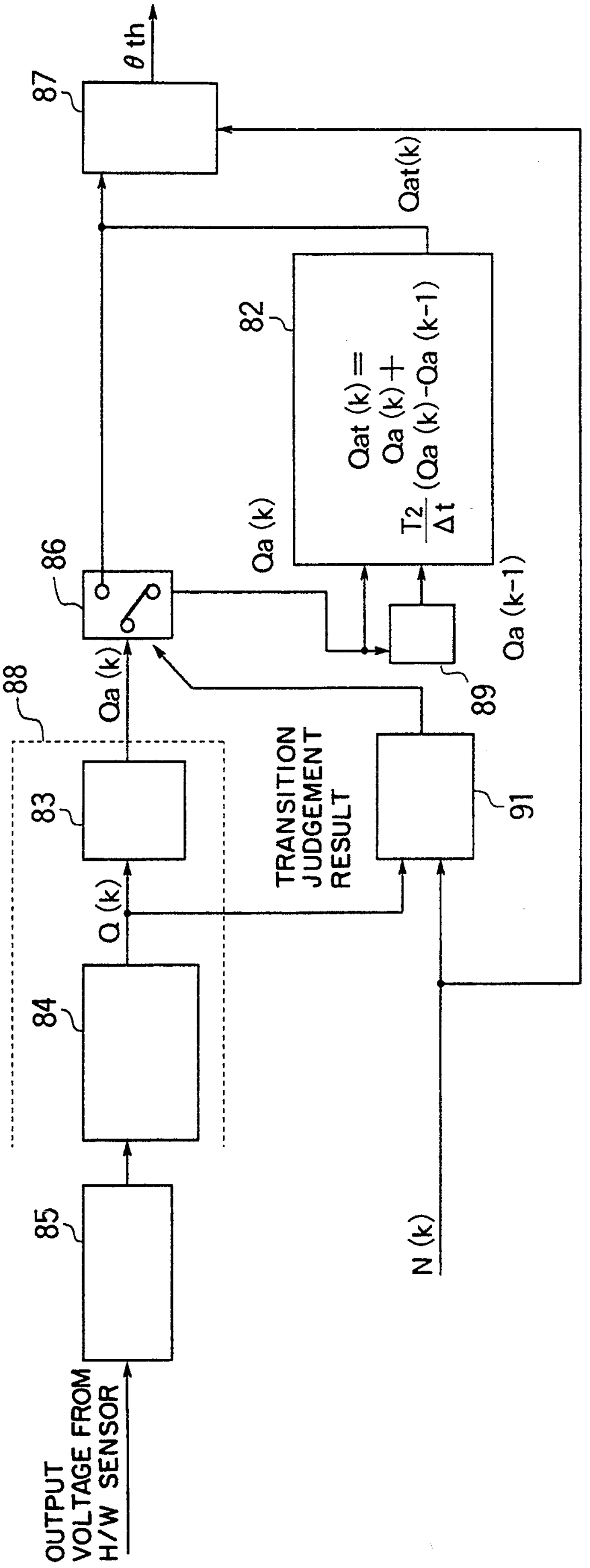
FIG. 31(*a*) and 31(*b*) are schematic block diagrams for showing an arrangement according to a fourteenth preferred embodiment of the present invention.
Figure 31:
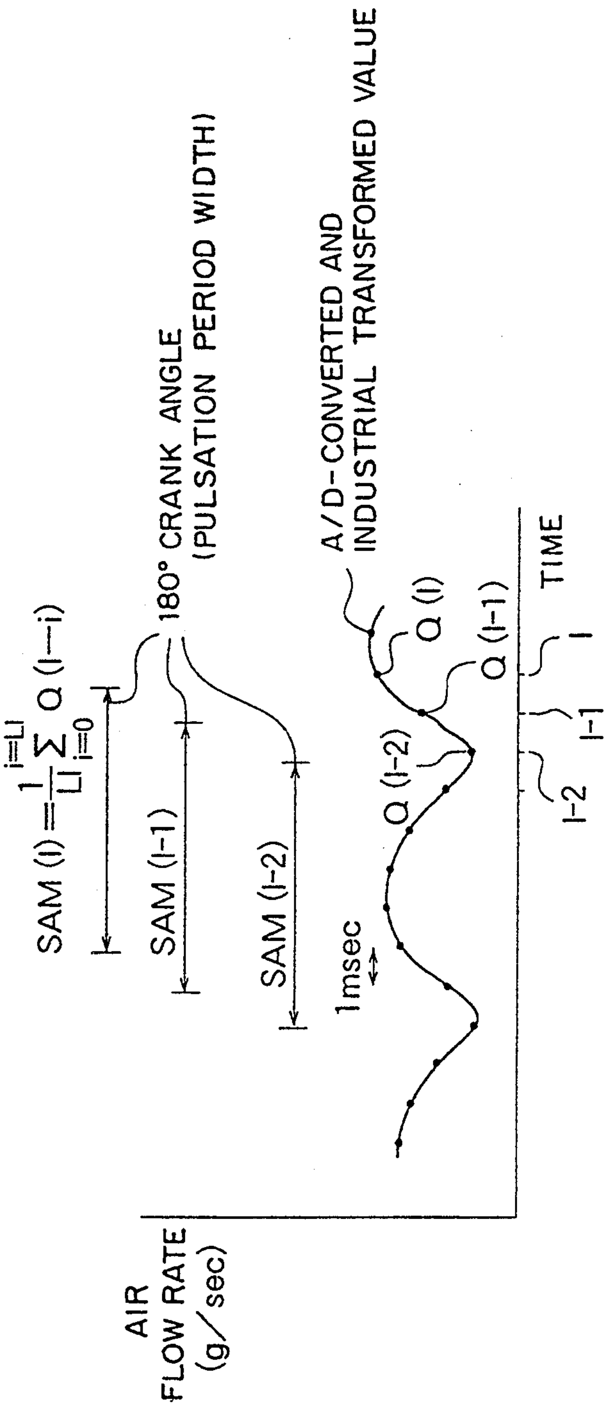

FIG. 31 indicates a 14th preferred embodiment, and also a concrete example corresponding to "C" as described in the 13th preferred embodiment.

Although the arrangement of the 14th preferred embodiment is the completely same as that of the 13th preferred embodiment, the transition judgement unit 81 should be understood as a transition judgement calculating unit 91 for the sake of convenience.

As shown in FIG. 31B, the transition judgement calculating unit 91 makes a summation as to the air flow rates sampled within a period during which the pulsation occurs, and averages the summation. If the averaged values are monotonously increased every measuring points, it is judged that the acceleration is performed.

Although the calculation period for the fuel injection amount in this preferred embodiment is selected to be 10 msec, the sampling and calculation operations at the A/D converter 85, industrial value transforming unit 84, and transition judgement calculating unit 91, are selected to be 1 msec due to a high speed acceleration judgement.

In accordance with this preferred embodiment, since the 4-cycle/4-cylinder engine is utilized, the pulsation period "Tmc" will be given by the engine revolution number as follows:

$$Tmc = 30 \div N(l)\ (\text{sec}) \qquad (56)$$

where

N: engine revolution number (rpm)

l: indicates a certain sampling time instant, and "l" is countered every 1 msec.

Here, there is the following equation:

$$Ll \equiv [Tmc(l)] = [30 \div N(l)] \qquad (57)$$

Symbol [] implies an integer symbol. As a result, symbol "Ll" indicates a sampling number corresponding to 180° crank angle.

With employment of the above-described "Ll", an averaged sampling value within the pulsation period (180° crank angle) is calculated:

$$\text{Sam}(l) = (1 \div Ll) \times \sum_{i=0}^{Ll} Q(l-i) \qquad (58)$$

where,

Q: air flow rate after being processed by industrial value transforming unit 84.

l: present time instant

Sam(l): averaged air flow rates from l time instant to crank angel.

Since the equation (58) is calculated every time, averaged values Sam(l), Sam(l−1), Sam(l−2) . . . are obtained.

Based upon these averaged values, if the following condition is satisfied, a judgement is made of the acceleration.

$$Sam(l) > Sam(l-1) > Sam(l-2) \qquad (59)$$

Conversely, if the following formula is satisfied, a judgement is made of the deceleration.

$$Sam(l) < Sam(l-1) < Sam(l-2) \qquad (60)$$

Also, considering measurement errors in the above-described acceleration judgement formula (57), it may be judged that the acceleration operation is carried out under the following case:

$$\text{Sam}(l) - \text{Sam}(l-1) > Sk \;\&\; \text{Sam}(l-1) - \text{Sam}(l-2) > Sk \qquad (61)$$

where symbol "Sk" indicates a constant.

As previously described, the judgement is made whether the acceleration or deceleration operation is executed, the judgement result is transferred to a changing unit 86, and the air flow rate prediction processing unit 82 is executed from subsequent initiating time instant (in the air flow rate prediction processing unit 82, the calculation is effected every 10 msec). The judgement from the acceleration operation into the normal operation is made as follows. When the formula (59) is no longer satisfied, the changing unit 86 is actuated and the air flow rate is not predicted.

Figure 50:
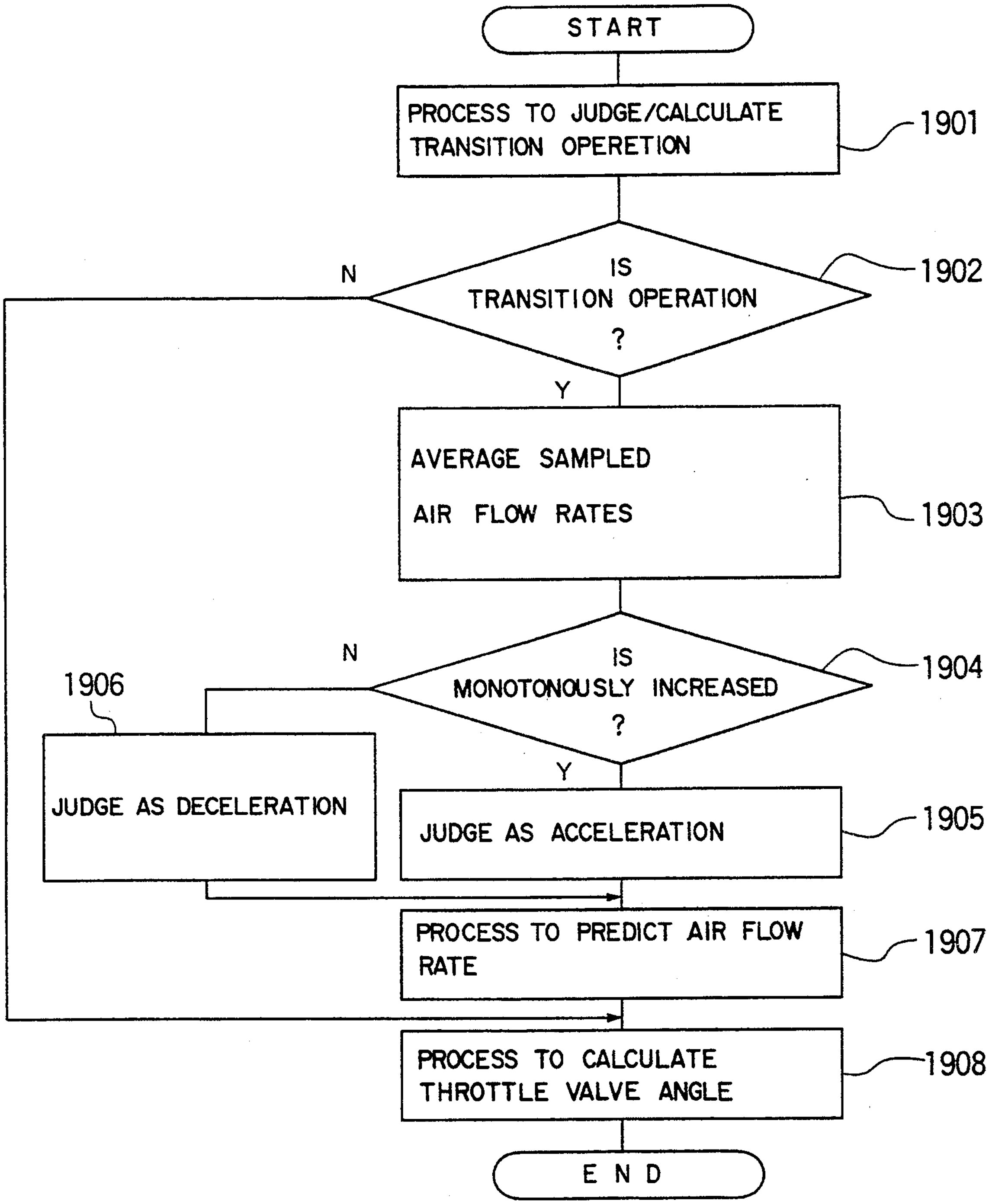
FIG. 50 is a flowchart for explaining an operation sequence of an apparatus for calculating a throttle valve angle in the fourteenth preferred embodiment shown in FIG. 31.

FIG. 50 is a flowchart for representing an operation of the throttle-valve-angle calculating unit shown in FIG. 31.

The transition judgement calculating unit 91 shown in FIG. 31 performs the transition judgement calculation at a step 1901, and does not predict the air flow rate if it is not the transition operation (a step 1902), so that the throttle valve opening angle is calculated (a step 1908). When a judgement is made of the transition operation, a summation of the air flow rates or an averaged value thereof is confirmed (a step 1903). If these value is monotonously increased every sampling points (at a step 1904), it is judged that the acceleration operation is carried out (at a step 1905). Conversely, when these values are monotonously decreased, it is judged that the deceleration operation is performed at a step 1906. Anyway since it is under the transition condition, the air flow rate prediction process is executed (step 1907), whereby the proper throttle valve opening angle is calculated at a step 1908.

Figure 32:
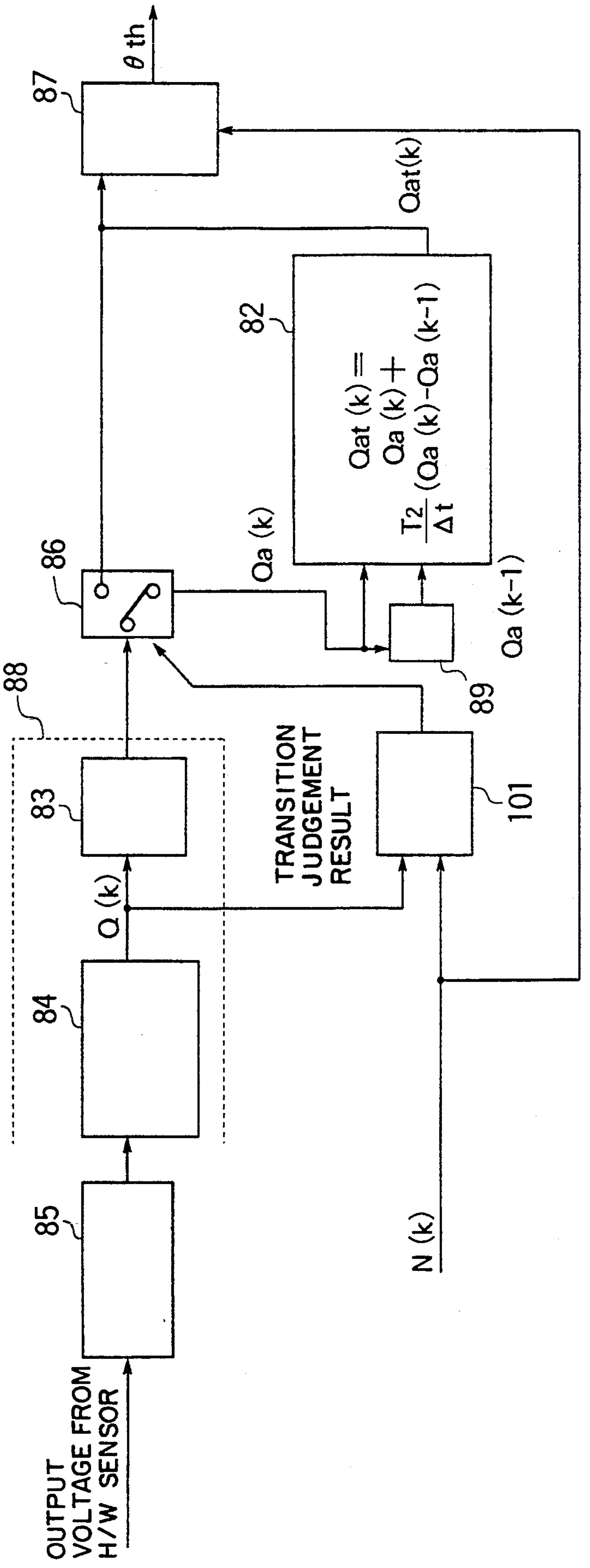
FIG. 32 is a schematic block diagram for showing an arrangement according to a fifteenth preferred embodiment of the present invention.

FIG. 32 represents a 15th preferred embodiment. Although the construction of the 15th preferred embodiment is the completely same as that of the embodiment shown in FIG. 30, the transition judgement calculating unit 81 of FIG. 30 should be understood as a transition judgement calculating unit 101 for the sake of convenience.

The operation of this transition judgement calculating unit 101 corresponds to another method (a) for judging the acceleration/deceleration operations effected in the 13th preferred embodiment. Then, since the overall operation of this 15th preferred embodiment except for the judging operation in the transition judgement calculating unit 101 is the same as that of the previous embodiment, no further explanation is made. Therefore, the judging operation by this transition judgement calculating unit 101 corresponding to the method (a) for judging the acceleration/deceleration operations in the eighth preferred embodiment will be described.

It is assumed that the transition judgement calculating unit 101 according to this preferred embodiment performs the sampling operation every 1 msec as same as in the 14th preferred embodiment. It should be noted that the averaging operation is not executed at the pulsation period, but the air flow rates acquired every 1 msec may be employed for the judgement.

First, it is assumed that there is no pulsation when a difference between a maximum value and a minimum value during the pulsation period does not exceed a predetermined value as defined in the following formula;

$$Ql_{max}-Ql_{min}<Q_m \quad (62)$$

where:

$Ql_{max}$: maximum value of air flow rate within pulsation period (180° crank angle), $Ql_{min}$: minimum value of air flow rate within pulsation period (180° crank angle), $Q_m$: predetermined value.

When the industrial-transformed value is increased in the following way after the judgement by the formula (62) is continued, it is judged that the acceleration operation is performed.

$$Q_a(l)>Q_a(l-1)>Q_a(l-2) \quad (63)$$

In accordance with this preferred embodiment, the acceleration operation from the low-velocity and light load conditions of the engine may be quickly judged.

Figure 51:
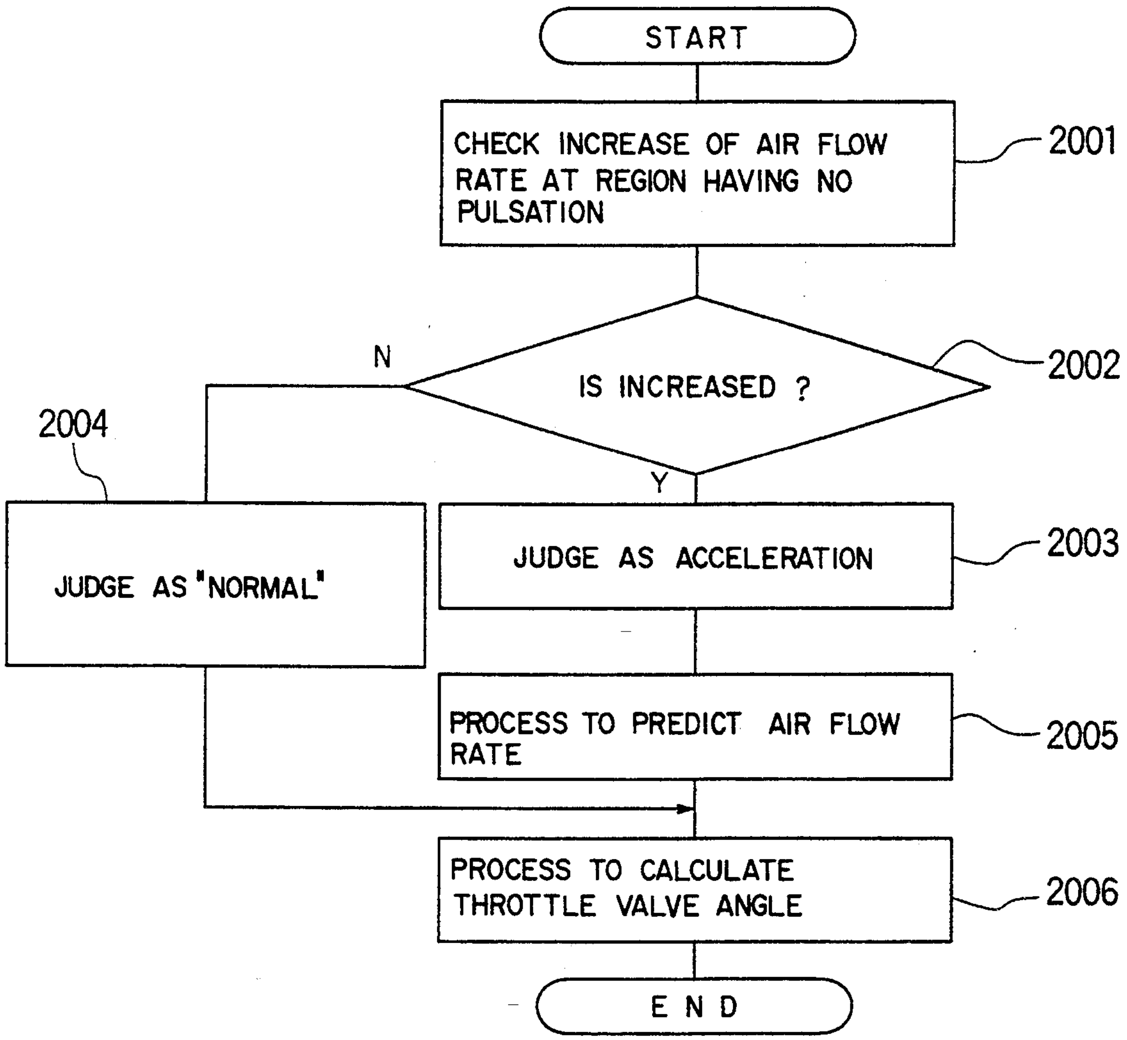
FIG. 51 is a flowchart for explaining an operation sequence of an apparatus for calculating a throttle valve angle in the fifteenth preferred embodiment shown in FIG. 32.

FIG. 51 is a flowchart for representing an operation of the throttle-valve-angle calculating apparatus shown in FIG. 32.

The transition judgement calculating unit confirms an increase in an air flow rate within a no-pulsation region, e.g., small throttle valve angle, and a low pressure at an air intake manifold (a step 2001); judges at a step 2003 that the acceleration operation is performed when the air flow rate is increased at a step 2002; predicts the air flow rate at a step 2005; and, calculates a throttle valve opening angle at a step 2006. At the step 2002, when there is no increase in the air flow rate, a judgement is established that the normal operation is effected at a step 2004, no prediction on the air flow rate is performed, but the throttle valve angle is calculated at a step 2008.

Figure 33:
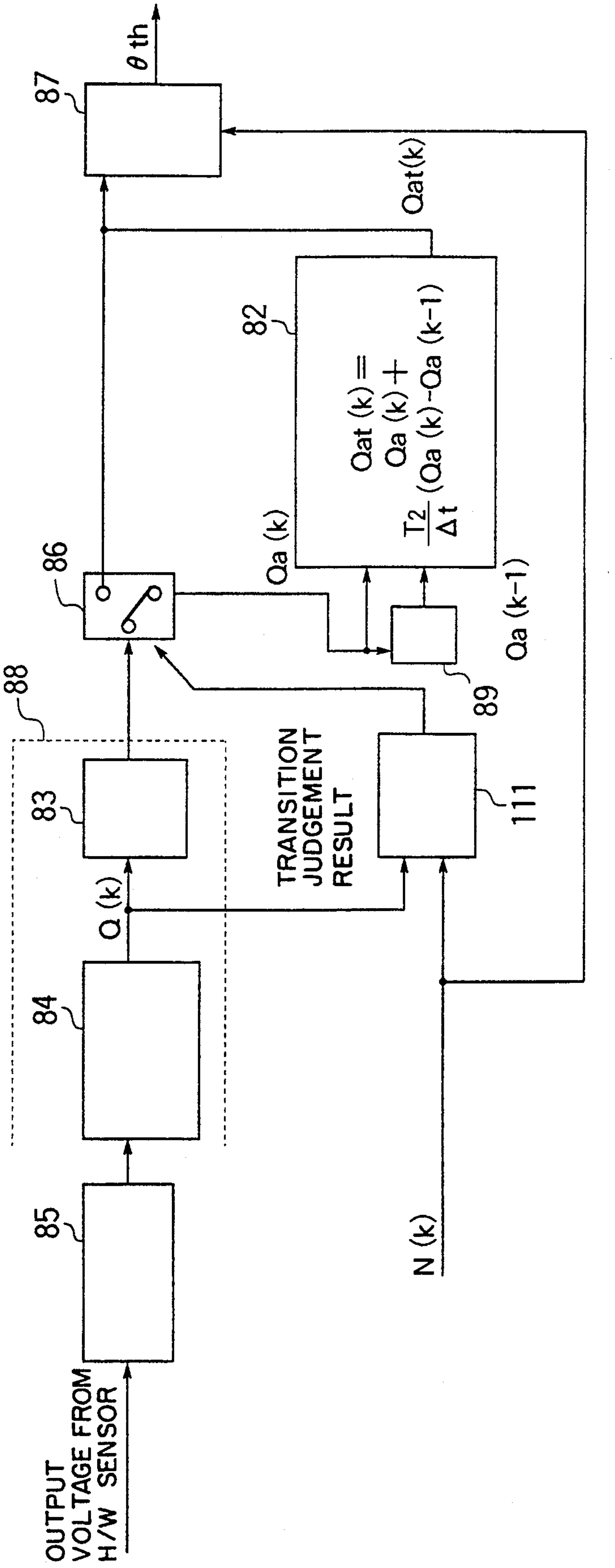
FIG. 33(*a*) and 33(*b*) are schematic block diagrams for showing an arrangement according to a sixteenth preferred embodiment of the present invention.
Figure 33:
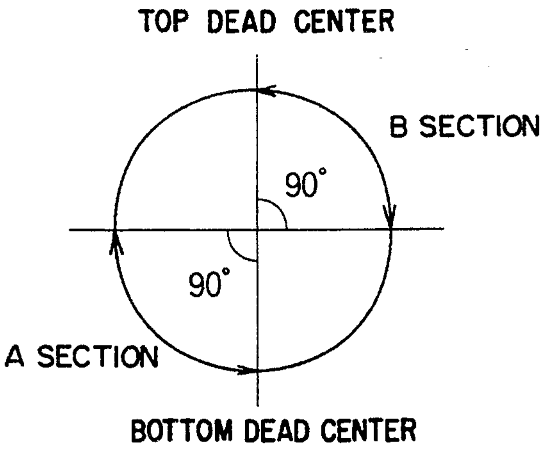

FIG. 33 is a schematic block diagram for representing a 16th preferred embodiment.

An acceleration/deceleration judging method according to the 16th preferred embodiment is similar to that of the 15th preferred embodiment, and corresponds to the acceleration/deceleration judging method (b) in the 13th preferred embodiment shown in FIG. 30. The acceleration/deceleration judging method effected by a transition judgement calculating unit 111, which corresponds to such a judgement method (b) effected in the 13th preferred embodiment, will now be described.

The pulsation may be judged based upon such a fact that there is a minimal value periodically in the air flow rate at a crank angle where an air intake valve is closed.

The engine employed in this preferred embodiment corresponds to a 4-cycle/4-cylinder engine, in which when the air intake valve is fully closed, there are a time period from a lower dead point of a piston up to 90°, and another period from an upper dead point thereof up to 90°. Accordingly, assuming now that a section from a lower dead point of a specific cylinder up to 90° is set to an A section and also a section from an upper dead point thereof up to 90° is set to a B section, these sections are set as shown in FIG. 33A.

In case that no minimal value is present in the air flow rate in the respective section, it is judged that the transition operation is performed. Furthermore, if the air flow rate is monotonously increased during this section, a judgement is made that the acceleration operation is carried out, whereas if this air flow rate is monotonously decreased during this section, a judgement is established that the deceleration operation is done.

Figure 52:
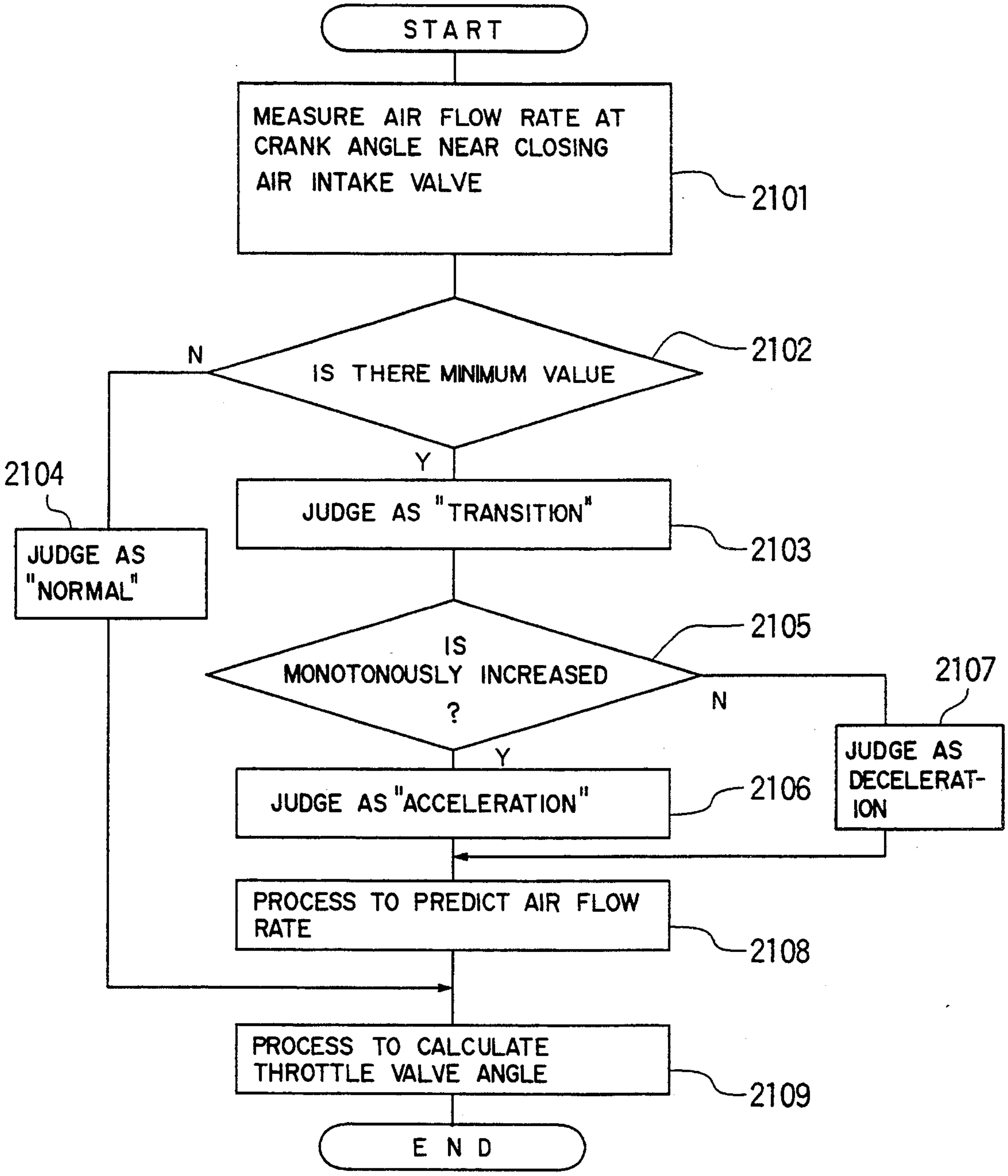
FIG. 52 is a flowchart for explaining an operation sequence of an apparatus for calculating a throttle valve angle in the sixteenth preferred embodiment shown in FIG. 33.

FIG. 52 is a flow chart for representing an operation of the throttle-valve-angle calculating apparatus shown in FIG. 33.

The transition judgement calculating unit 111 of FIG. 33 judges that the operating condition is changed from the normal driving operation into the transition driving operation when the period of the normally occurring pulsation collapses. That is to say, the pulsation is produced at a unit crank angle period. When this pulsation collapses every unit crank angle, a judgement is made that the driving condition becomes flow the normal driving state to the transition driving state. In other words, the section when the minimum value of the pulsation occurs is obtained by statically changing the various parameters of the engine such as the air flow rate, revolution number and load by way of the engine unitary test so as to measure the air flow rate (a step 2101); if the minimum value of the pulsatory air flow rate occurring every unit crank angle is present within this obtained section (at a step 2102), a judgement is made that the normal driving operation is performed at a step 2104, so that the throttle valve angle is calculated at a step 2109. Conversely, if there is no minimum value of the pulsatory air flow rate occurring every unit crank angle, it is judged that the transition driving operation is performed at a step 2103. Furthermore, if the air flow rate is monotonously increased within this section at a step 2105, a judgement is made that the acceleration operation is executed at a step 2106. If the air flow rate is monotonously decreased, a judgement is established that the deceleration operation is performed at a step 2107. In any cases, the air flow rate is predicted at a step 2108 in order to calculate a proper throttle valve angle at a step 2109.

FIG. 34 represents an operation of 17th preferred embodiment.

This operation corresponds to the method (d) for judging the acceleration/deceleration operations performed in the 13th preferred embodiment shown in FIG. 30, similar to the 15th preferred embodiment. The judging method by the transition judgement calculating unit 121 corresponding to the judging method (d) will now be described.

Figure 53:
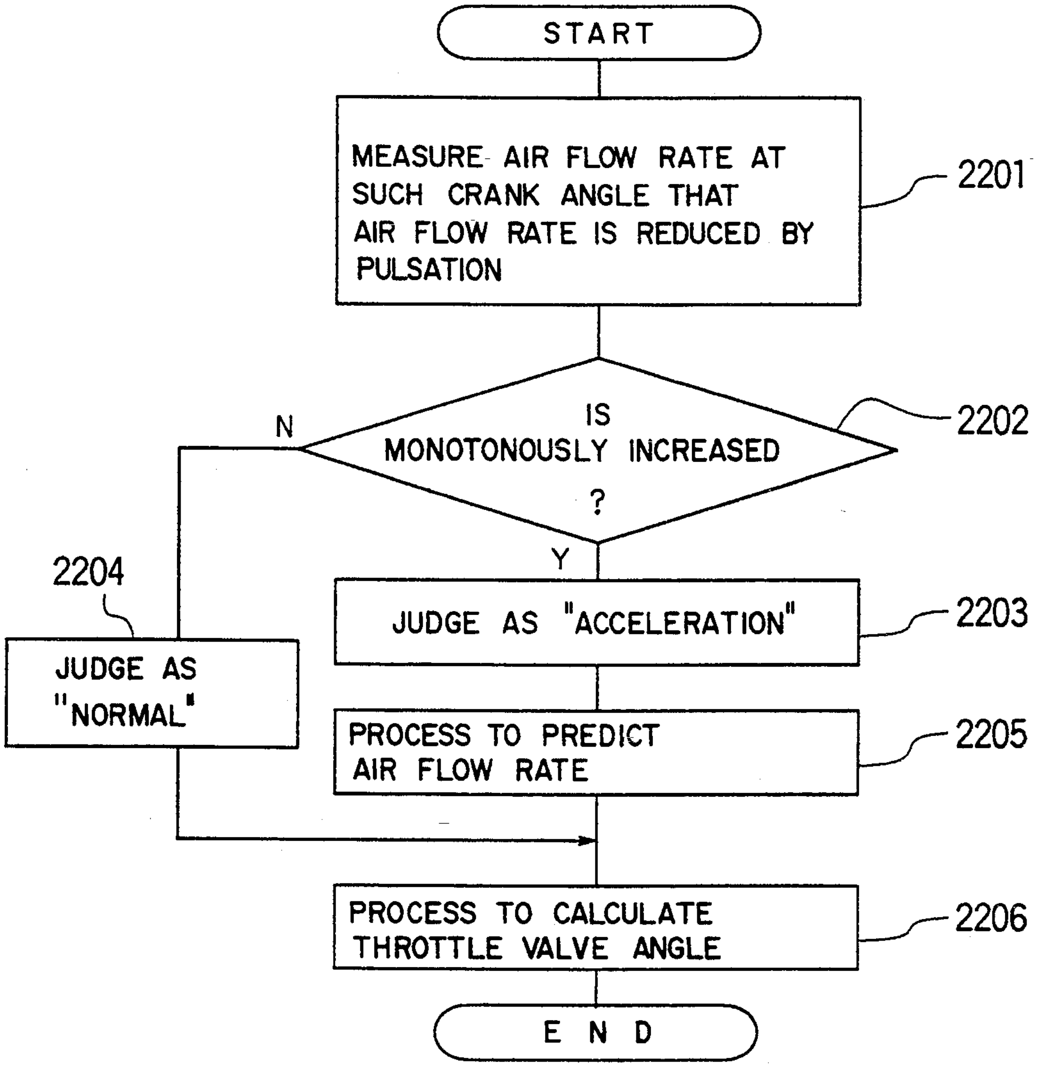
FIG. 53 is a flowchart for explaining an operation sequence of an apparatus for calculating a throttle valve angle in the seventeenth preferred embodiment shown in FIG. 34.

FIG. 53 is a flow chart for representing an operation of the throttle-valve-angle calculating apparatus shown in FIG. 34.

A region section of a crank angle where a measured air flow rate in a pulsation is decreased is obtained by statically varying the respective engine parameters with the engine unitary test. It should be understood that the crank angle region where the air flow rate is decreased by the pulsation corresponds to a region before and after a lower dead point of a certain cylinder.

In accordance with this preferred embodiment, a 4-cycle/4-cylinder engine is employed, so that with respect to one revolution as shown in FIG. 34B, a region with 45 crank angle before/after a lower dead point is set to a C-section, whereas another region with 45° crank angles before/after an upper dead point is set to a D-section.

A measurement is made of an air flow rate at a section where the measured air flow rate in this pulsation is decreased at a step 2201.

The transition judgement calculating unit 121 shown in FIG. 34 makes the following judgements. That is to say, if the pulsation is present, within the respective crank angle region sections where the measured air flow rate in the pulsation is decreased, and either the measured air flow rate is substantially constant, or is monotonously decreased (a step 2202), it is judged that the normal condition is established (a step 2204). Accordingly, no air flow rate prediction is carried out, but the throttle valve angle is calculated at a step 2206. Also, if the measured air flow rate is monotonously increased, a judgement is made that the acceleration operation is effected at a step 2203, so that the air flow rate is predicted at a step 2205 and also the throttle valve angle is calculated at a step 2206.

In accordance with this preferred embodiment, since the judgement may be made whether or not the pulsation occurs and also another judgement may be established that the acceleration operation is effected, there is a merit that the air flow rate prediction may be performed when no pulsation occurs. As a consequence, a delay in the measurement during the acceleration operation may be easily corrected, as previously described in detail, according to the 13th to 17th preferred embodiments, there is employed the transition judgement calculating unit 81 to 121 capable of judging whether the normal driving operation or the transition driving operation is performed. If the transition driving operation is effected, the above-described air flow rate prediction process is carried out. If the normal driving operation is performed, only the smoothing process is carried out and no air flow rate prediction process is carried out.

A major reason why no air-flow rate prediction process is carried out during the normal driving operation, is to prevent the noise amplification by the air-flow rate prediction processing unit 82 during the normal driving operation, which is caused by the noises that have not sufficiently smoothed by the smoothing process.

In particular, in accordance with the present invention, since the high speed judging method for the acceleration/deceleration operations is provided, only the judging method of the 14th preferred embodiment is employed with respect to the judgement on the acceleration/deceleration operations in the 13th to 17th preferred embodiments. There are represented the high speed judging method for the acceleration/deceleration operations in the 15th to 17th preferred embodiments. Then, the acceleration/deceleration judging methods shown in these 14th to 17th preferred embodiments are solely effective, and thus there are various applications. These acceleration/deceleration methods may be utilized in the following 18th and 19th preferred embodiments.

Figure 35:
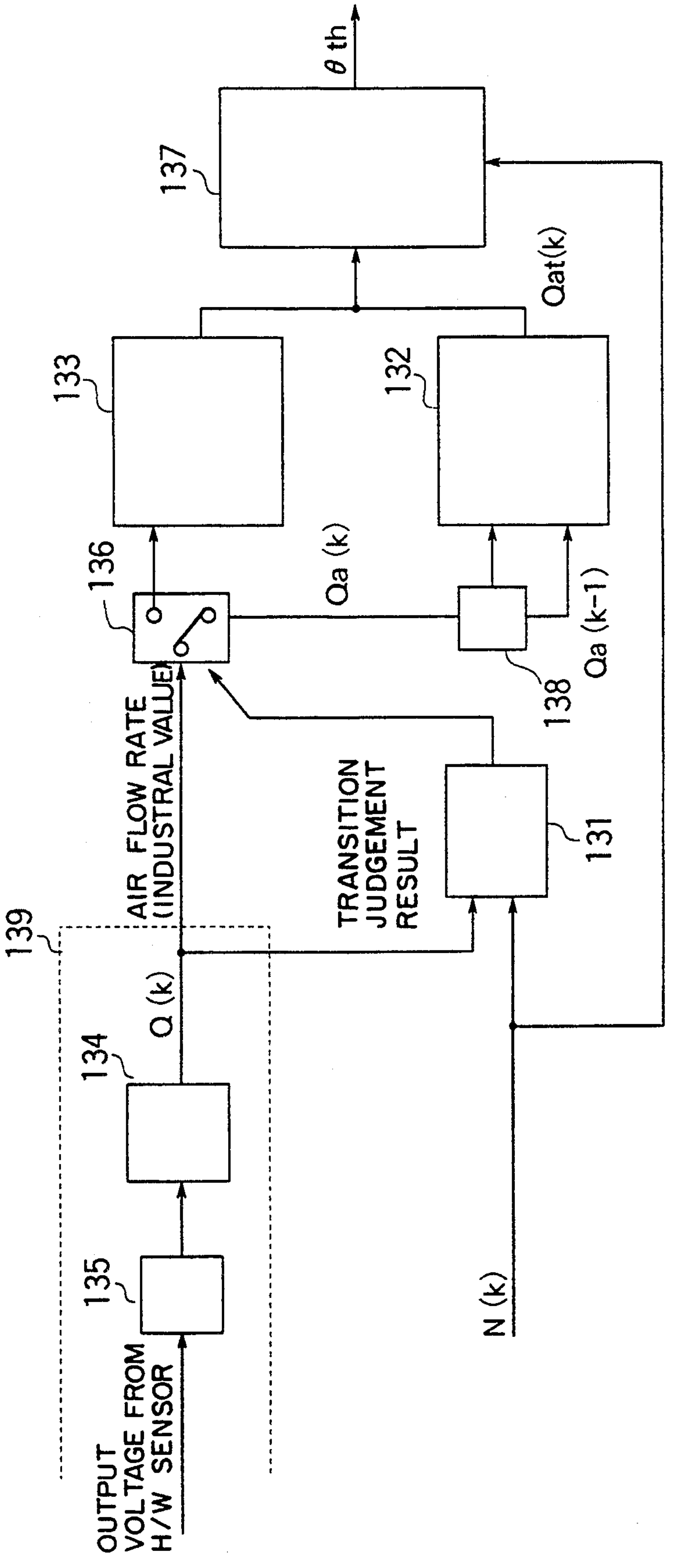
FIG. 35 is a schematic block diagram for showing an arrangement according to a eighteenth preferred embodiment of the present invention.

FIG. 35 is a schematic block diagram for representing a construction of the 18th preferred embodiments.

The constructive elements of the 18th preferred embodiments are identical to those of the 13th preferred embodiment. Operations of both a transition judgement calculating unit 131 and an air flow rate prediction processing unit 132 are the same as those of the 13th preferred embodiment.

However, there is only a difference in the operation of the transition judgement calculating unit 131, as compared with the 13th preferred embodiment. That is to say, when the transition judgement calculating unit 131 judges the transition driving operation, no smoothing process by the lag filter 133 is carried out, but the prediction process by the air flow rate prediction processing unit 132 is effected. This is because the variations caused by the pulsation in the measured air flow rate are not so large during the acceleration/deceleration operations and therefore there is no need to smooth the pulsation. Accordingly, no smoothing process is carried out during the transition operation and the air flow rate is predicted.

The smoothing process effected by the lag filter 133 is executed when the transition judgement calculating unit 131 judges that it is under the normal driving condition, and the changing unit 136 is changed.

Figure 54:
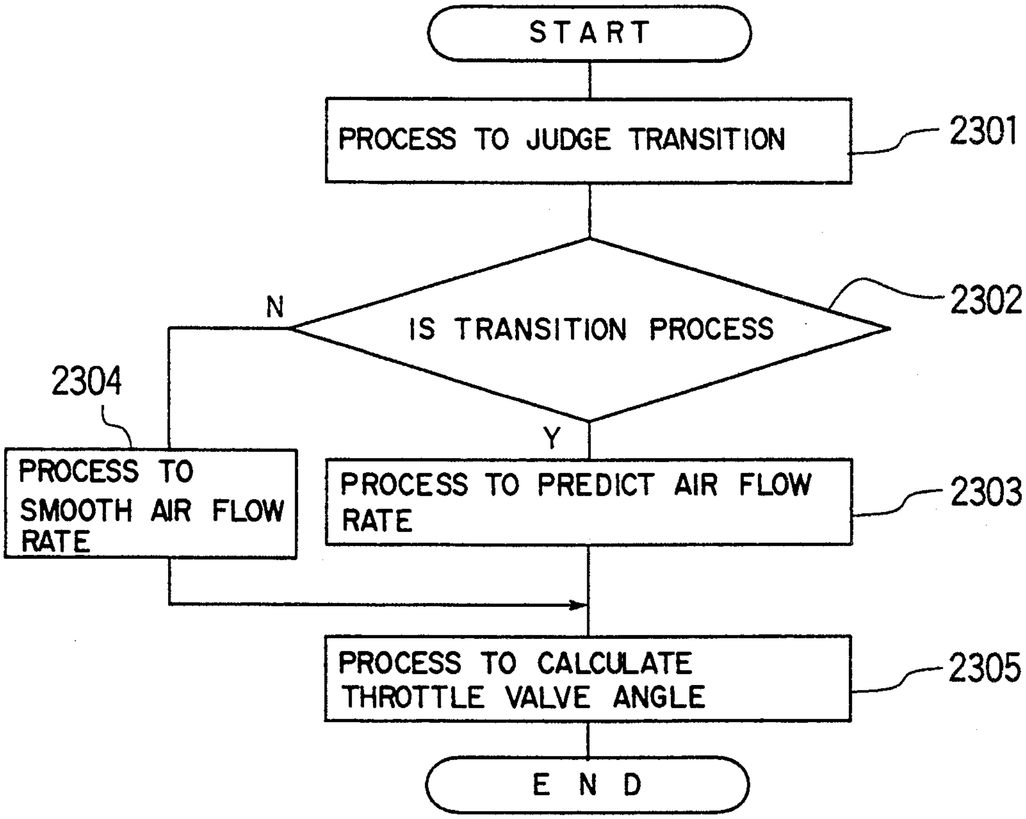
FIG. 54 is a flowchart for explaining an operation sequence of an apparatus for calculating a throttle valve angle in the eighteenth preferred embodiment shown in FIG. 35.

FIG. 54 is a flowchart for representing an operation of the throttle-valve-angle calculating unit shown in FIG. 35.

At a step 2301, the transition judgement calculating unit 131 judges whether the normal driving operation, or the transition driving operation is effected. When this unit judges that the normal driving operation is carried out at a step 2302, the smoothing process unit 139 shown in FIG. 35 does not execute the prediction process but performs only the smoothing process at a step 2304, whereby the throttle valve angle is calculated at a step 2305. To the contrary, when this unit judges that the transition driving operation is done, no smoothing process for the air flow rate is performed but only the prediction process is executed at a step 2303, and the throttle-valve-angle calculation is carried out at a step 2305.

According to this 18th preferred embodiment, the delay in the measurement caused by the smoothing process during the transition process may be prevented.

Figure 36:
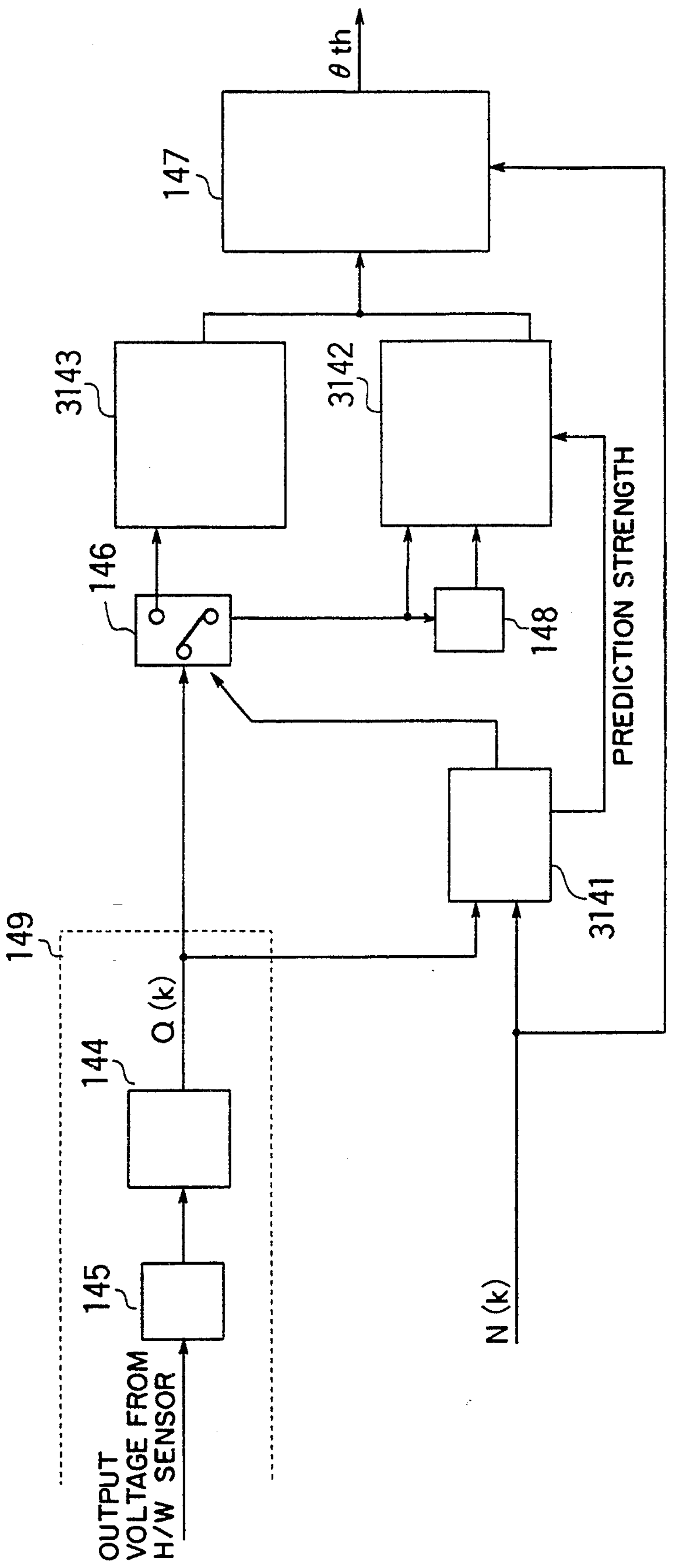
FIG. 36 is a schematic block diagram for showing an arrangement according to a nineteenth preferred embodiment of the present invention.

FIG. 36 is a schematic block diagram for representing a construction of a 19th preferred embodiment.

The construction of the 19th preferred embodiment is the substantially same as that of the 18th preferred embodiment, and has such a function to change strength or intensity of prediction.

That is to say, the intensity or strength of the prediction established in an air flow rate prediction processing unit 3142 similar to the air flow rate prediction processing unit also shown in the 12th to 18th preferred embodiments, is varied based upon the result obtained from the transition judgement calculating unit 3141.

This prediction strength indicates "$T_2$" of the above-described equation (55) and a coefficient "$T_t$" in the following prediction formula:

$$Q_y(k)=Q_a(k)+T_t\times[Q_a(k)-Q_a(k-1)] \quad (64)$$

where:

k: time instant, $Q_a$: measured value, $Q_y$: predicted value.

It should be noted that if the coefficient "$T_t$" is selected to be large, the strength becomes high.

When, for instance, an acceleration operation is first detected from the normal driving operation, and the strength is set to high, the transition judgement calculating unit 3141 judges the normal driving operation. Accordingly, when an acceleration operation is subsequently detected, the intensities $T_2$ and $T_1$ represented by the formulae (55) and (64) are selected not to such a fixed values $T_2$ and $T_1$, but are twice varied.

That is to say, in the transition judgement calculating unit 141, the normal condition is continued, for instance, during 180° crank angles, and thereafter only when a first acceleration is detected, the predicted strength ($T_2$, $T_t$) are made two times higher than the normal strength. If the acceleration operation is subsequently continued, the predicted strength is immediately returned to the normal predicted strength and the normal prediction is executed.

Figure 55:
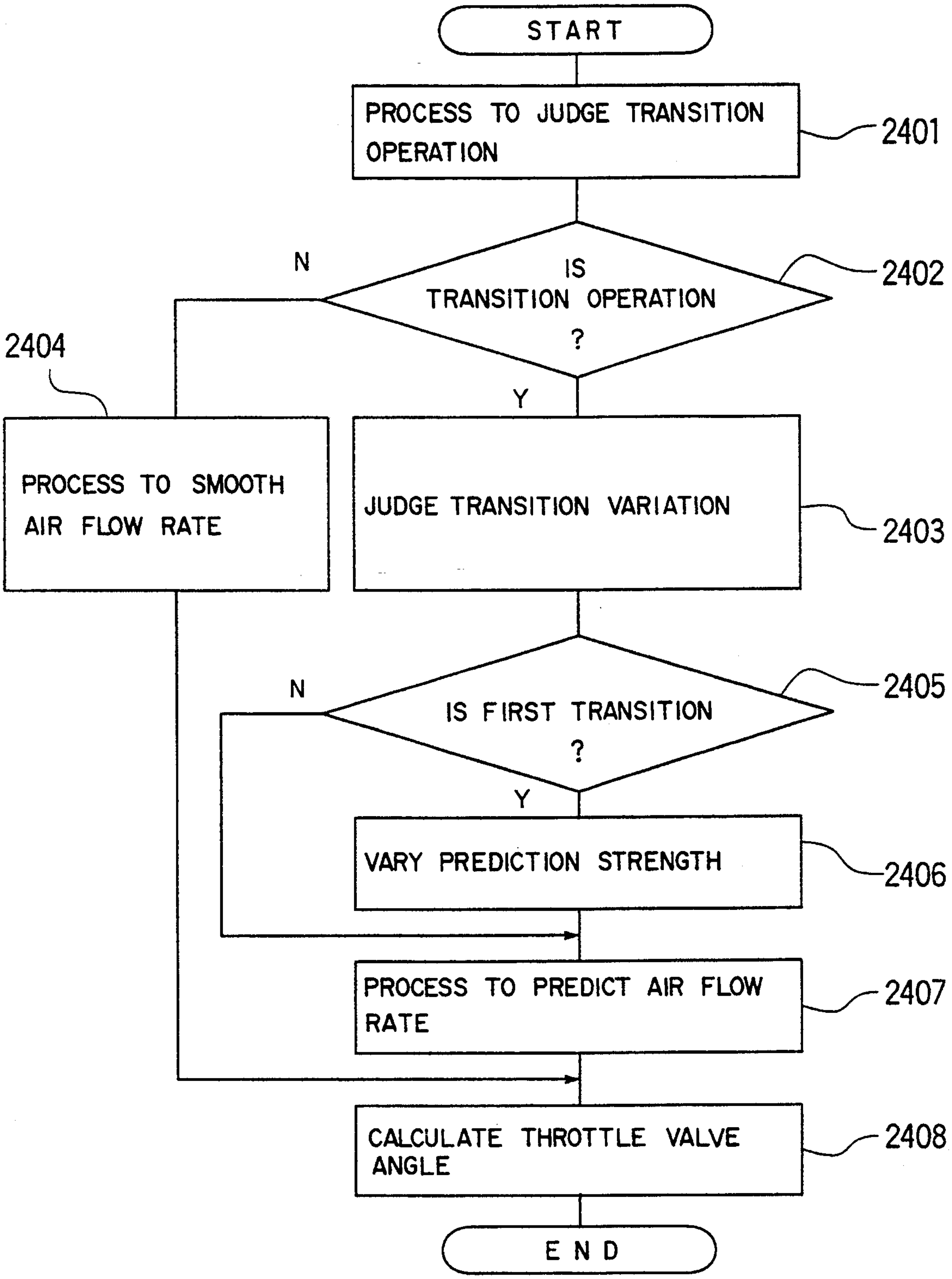
FIG. 55 is a flowchart for explaining an operation sequence of an apparatus for calculating a throttle valve angle in the nineteenth preferred embodiment shown in FIG. 36.

FIG. 55 is a flowchart for representing an operation of the throttle-valve-opening-angle calculating apparatus shown in FIG. 36.

The transition judgement calculating unit 3141 shown in FIG. 36 judges whether the transition driving operation or the normal driving operation is performed at a step 2401. When a judgement is made that the transition driving operation is carried out at a step 2402, it is judged that transition in a change into the transition driving operation is detected at a step 2403. If it is first change from the normal driving operation to the transition driving operation at a step 2406, a prediction process of an air flow rate is performed (a step 2407). Conversely, if it is not such a first change, the prediction strength is not varied and the air flow rate prediction process is performed at a step 2407, whereby the throttle valve angle is calculated at a step 2408. At a step 2401, when a judgement is made that the normal driving operation is performed, the air flow rate is smoothed at a step 2404 and thus the throttle valve opening angle is calculated at a step 2408.

As previously described, the prediction process of the air flow rate is carried out by changing the prediction strength of the air flow rate. Moreover, when the first change from the normal driving operation into the transition driving operation is detected, the prediction strength is varied high than that of the normal case. The basic idea of the throttle-valve-angle calculating apparatus shown in FIG. 36 is to prevent a lag occurring in the acceleration detection since there is a trend that the acceleration operation detection is delayed only when the air flow rate is normally predicted at the initial stage of the acceleration operation. That is to say, to correct such a lag, the correction operation is rather difficult at an initial stage of the change. A prediction error may be produced even when linear prediction is merely utilized. As a consequence, the coefficient defined as the prediction strength of the linear prediction formula is varied so as to reduce the initial error in the changes.

As previously stated in detail since the throttle valve opening angle with higher precision may be predicted at the initial stage of the variations in the throttle valve opening angle, the correction at the initial stage of the variations as the throttle valve opening angle may be suitably performed.

In general, only when the normal prediction is merely carried out for the air flow rate, detection On the acceleration operation effected by the measurement based upon the air flow rate may cause a delay during the initial acceleration state rather than the acceleration detection on the variations in the throttle valve opening angle. However, as described above, in accordance with the present invention, it is possible to prevent a lag occurring in the acceleration detection at the initial acceleration.

It should be noted that the first through nineteenth preferred embodiments have been accomplished by way of the control arrangements so-called as an "L-jetronics system" for measuring the air flow rate.

Furthermore, there have been described the conventional problems, solving means and effects according to the present invention. This is recognized based upon the L-jetronics system for measuring the air flow rate.

On the other hand, there is another system, i.e., the D-jetronics system for measuring pressure at an air intake manifold and without measuring the air flow rate in order to control a fuel injection control.

There are technical problems in this D-jetronics system, which is similar to the previously-explained L-jetronics system.

A basic method for calculating a throttle valve opening angle based upon the D-jetronics system will now be described, which is similar to the L-jetronics system.

That is to say, the throttle valve opening angle is obtained from pressure in an air intake manifold and the engine revolution number.

Figure 37:
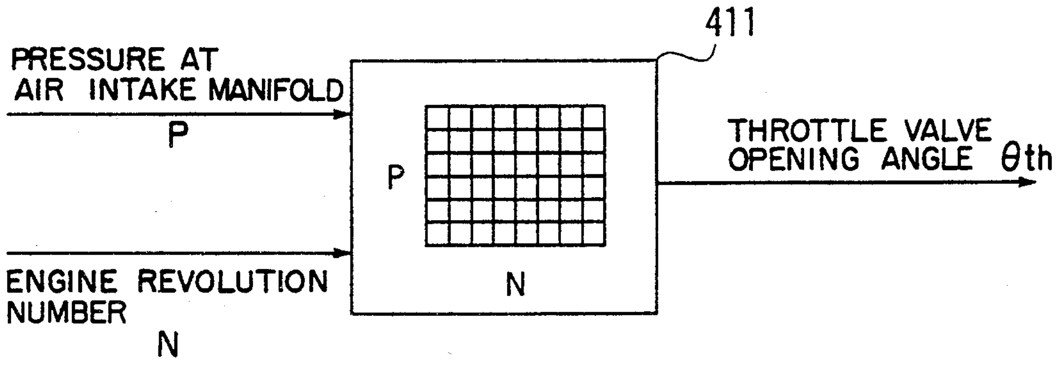
FIG. 37 is a schematic block diagram for showing an arrangement according to a twentieth preferred embodiment of the present invention.
Figure 39:
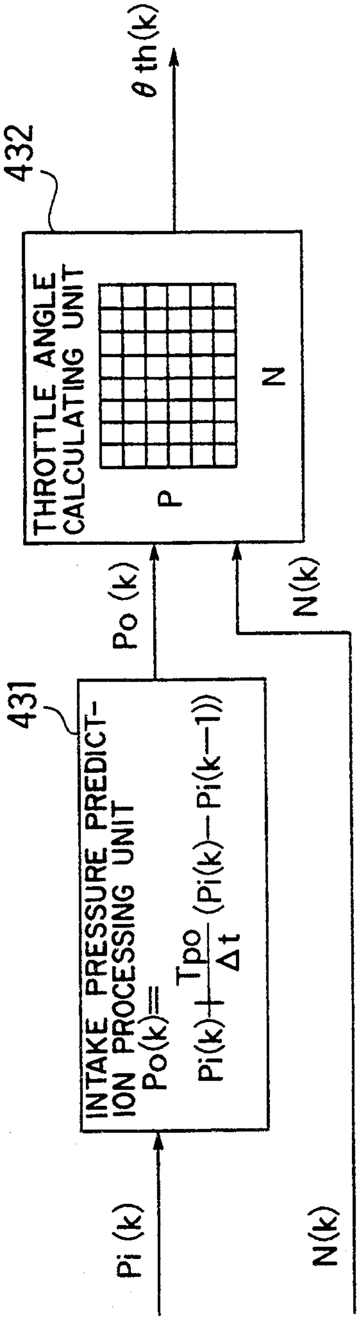
FIG. 39 is a schematic block diagram for showing an arrangement according to a twenty-second preferred embodiment of the present invention.

With respect to this method, several preferred embodiments will now be represented in FIGS. 37 to 39. Both the basic arrangements and operations for measuring the air flow rates as represented in the above-explained 12th to 19th preferred embodiments may be readily combined with the preferred embodiments shown in FIGS. 37 to 39.

FIG. 37 is a schematic block diagram for representing an arrangement according to 20th preferred embodiment.

This preferred embodiment is constructed of a throttle-valve-angle calculating unit 411 which has previously held as map data, both pressure (P) at an air intake manifold and a throttle valve angle ($\theta_{th}$) corresponding to an engine revolution number (N).

In accordance with the D-jetronics system, a calculating unit for calculating pressure at an air intake manifold, whereas a detecting unit for detecting an engine revolution number.

Then, the throttle-valve-angle calculating unit 411 calculates a throttle valve opening angle with employment with the engine revolution number and the pressure at the air intake manifold measured by this calculating unit for calculating the pressure at the air intake manifold, instead of the air flow rates as described in FIGS. 23 to 36.

Figure 56:
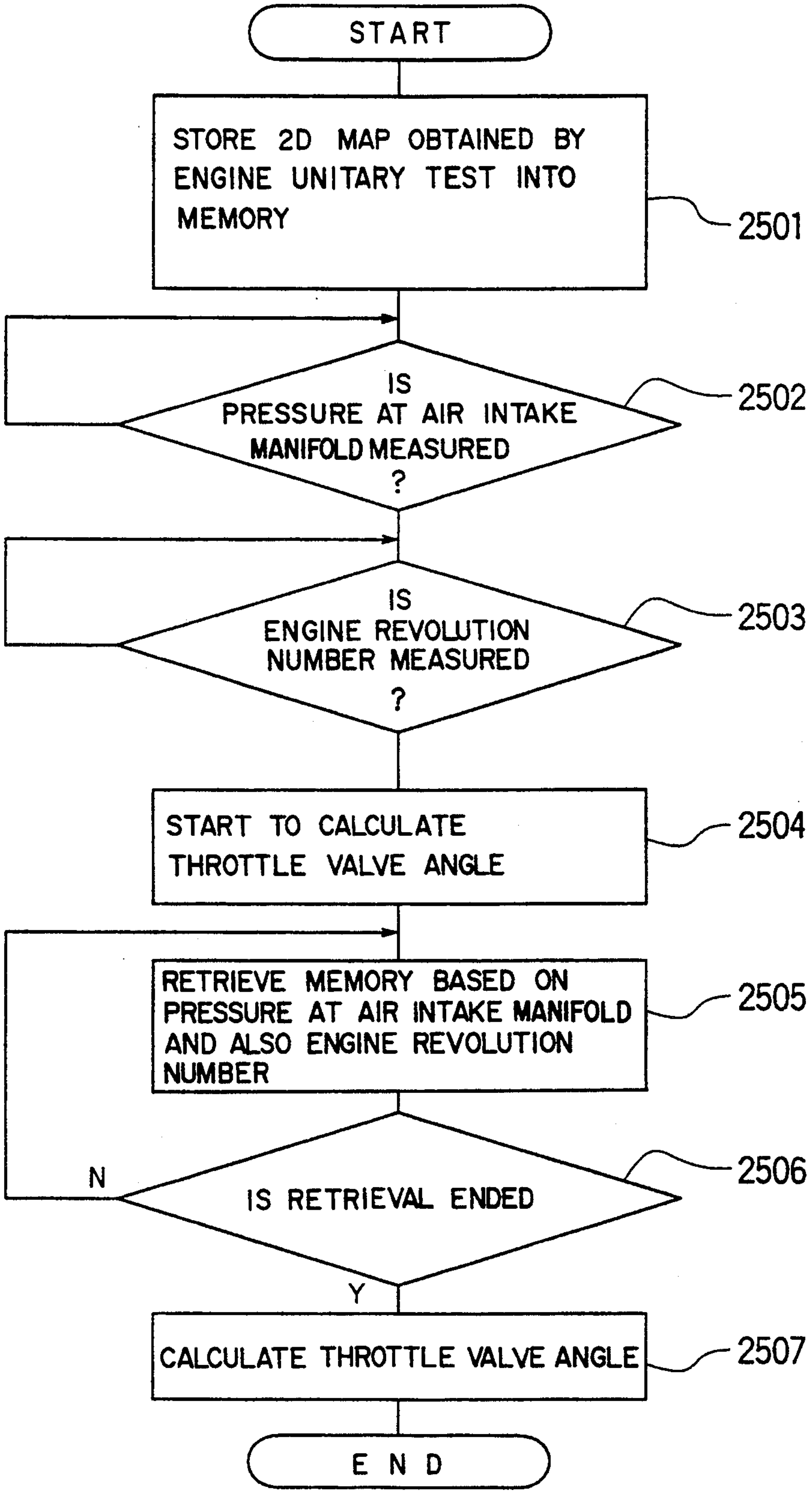
FIG. 56 is a flowchart for explaining an operation sequence of an apparatus for calculating a throttle valve angle in the twentieth preferred embodiment shown in FIG. 37.
Figure 57:
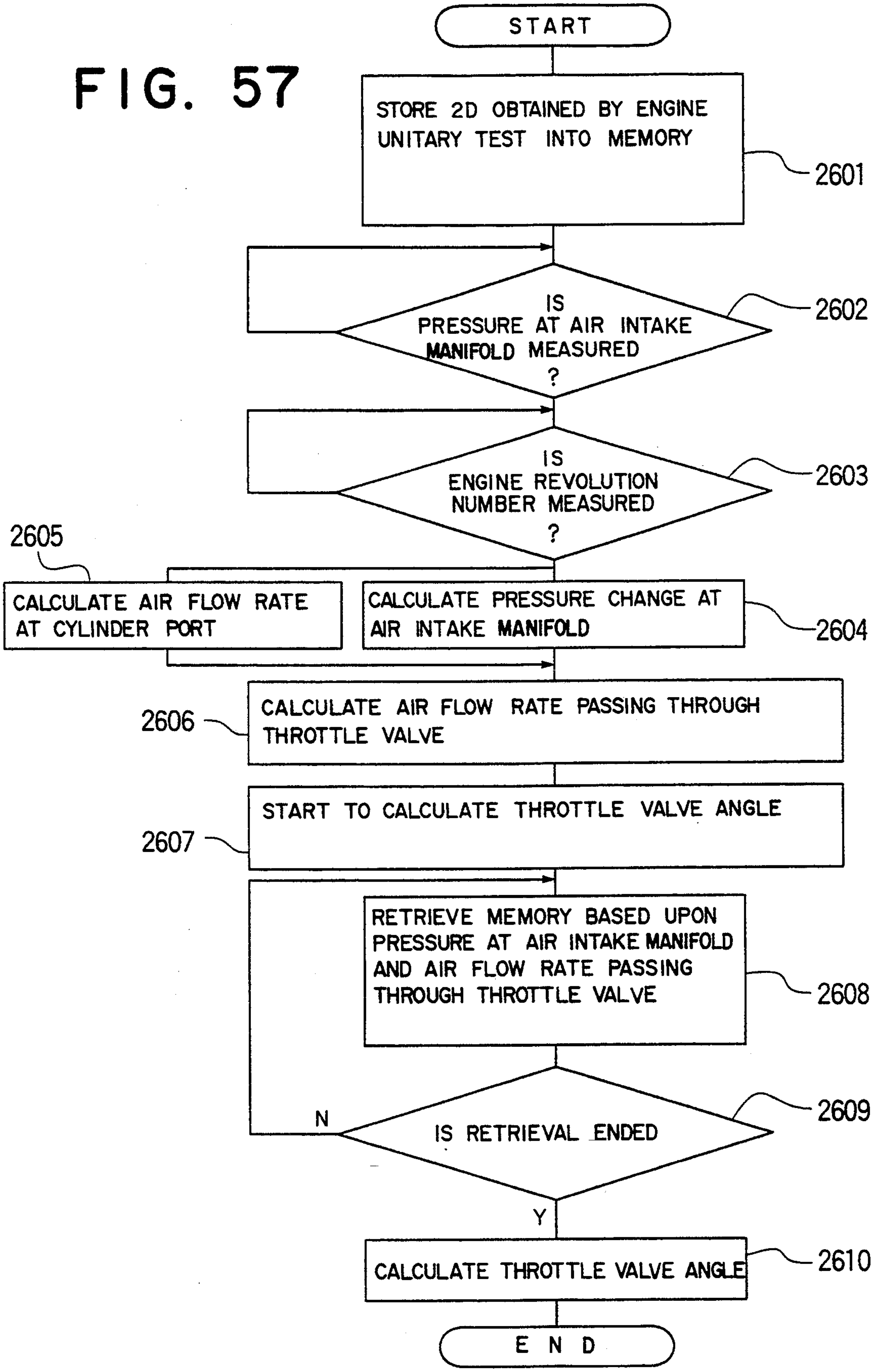
FIG. 57 is a flowchart for explaining an operation sequence of an apparatus for calculating a throttle valve angle in the twenty-first preferred embodiment shown in FIG. 38.

FIG. 56 is a flowchart for representing an operation of the throttle-valve-angle calculating apparatus shown in FIG. 37.

First, the throttle valve angles under the normal conditions of the pressure at the air intake manifold and the engine revolution number, are acquired by statically changing the pressure at the air intake manifold and the engine revolution number by way of the engine unitary test. Thus, the obtained throttle valve angles are stored into a ROM of the throttle-valve-angle calculating unit 411 employed in the engine control unit (not shown) as two-dimensional map data where the pressure at the air intake manifold and the engine revolution number are used as an axis (a step 2501).

When an engine is started and being revolted, the pressure (P) at the air intake manifold is measured at a step 2502 and the engine revolution number (N) is measured at a step 2503 from time to time. The values on the axis of the two-dimensional map employed in the throttle-valve-angle calculating unit 411, which correspond to the respective measured values, are retrieved at steps 2504 and 2505. The throttle valve angles ($\theta_{th}$) which have been stored in accordance with these values on the map axis are read out and calculated at steps 2506 and 2507.

FIG. 38 is a schematic block diagram for representing an arrangement of a 21st preferred embodiment of the present invention.

In accordance with the overall construction of this preferred embodiments, the throttle valve openings angle is obtained based upon the pressure at the air intake manifold and engine revolution number. An internal arrangement of this preferred embodiment is different from that of the 20th preferred embodiment.

That is to say, this internal arrangement is made of a calculating unit 421 for calculating variations in pressure at an air intake manifold; a calculating unit 422 for calculating an air flow rate passing through a throttle valve; a calculating unit 423 for calculating an air flow rate at a cylinder port; and a calculating unit 424 for calculating a throttle valve angle.

In the pressure-variation calculating unit 421 at the air intake manifold, the pressure variations at the air intake manifold will be calculated as follows:

$$\Delta P(k)=[P(k)-P(k-1)]\div\Delta t \quad (65)$$

In the calculating unit 423 for calculating the air flow rate at the cylinder port, the air flow rate $Q_{ap}(k)$ at the cylinder port will be calculated from the pressure P(k) at the air intake manifold and the engine revolution number N(k):

$$Q_{ap}(k)=K_{pn}\times N(k)\times P(k) \quad (66)$$

where symbol "$K_{pn}$" indicates a constant determined by a volume efficiency (filling efficiency).

Similarly, in the calculating unit 422 for calculating the air flow rate passing through the throttle valve, the air flow rate passing through the throttle valve will be calculated based on the previously obtained pressure variation ΔP(k) at the air intake manifold and the air flow rate $Q_{ap}(k)$ at the cylinder port:

$$Q_{at}(k)=C\times\Delta P(k)+Q_{ap}(k) \quad (67)$$

In the throttle valve angle calculating unit 424, a calculation is made of the throttle valve angle based upon the above-obtained air flow rate $Q_{at}(k)$ passing through the throttle valve and the pressure P(k) at the air intake manifold with employment of the two-dimensional map, which is similar to the 15th preferred embodiment.

Figure 59:
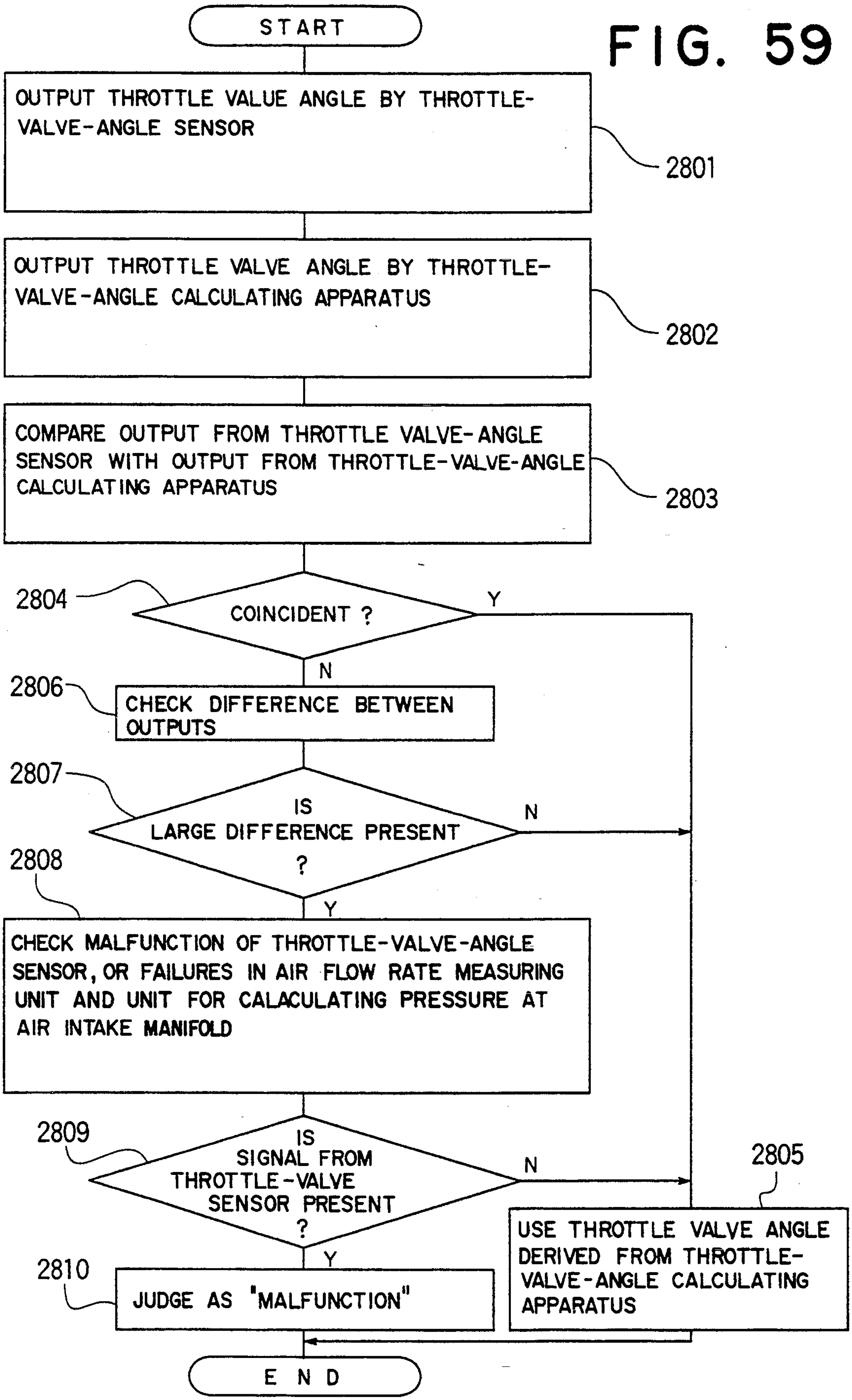
FIG. 59 is a flowchart for explaining an operation sequence of an apparatus for calculating a throttle valve angle in the twenty-third preferred embodiment shown in FIG. 40.
Figure 60:
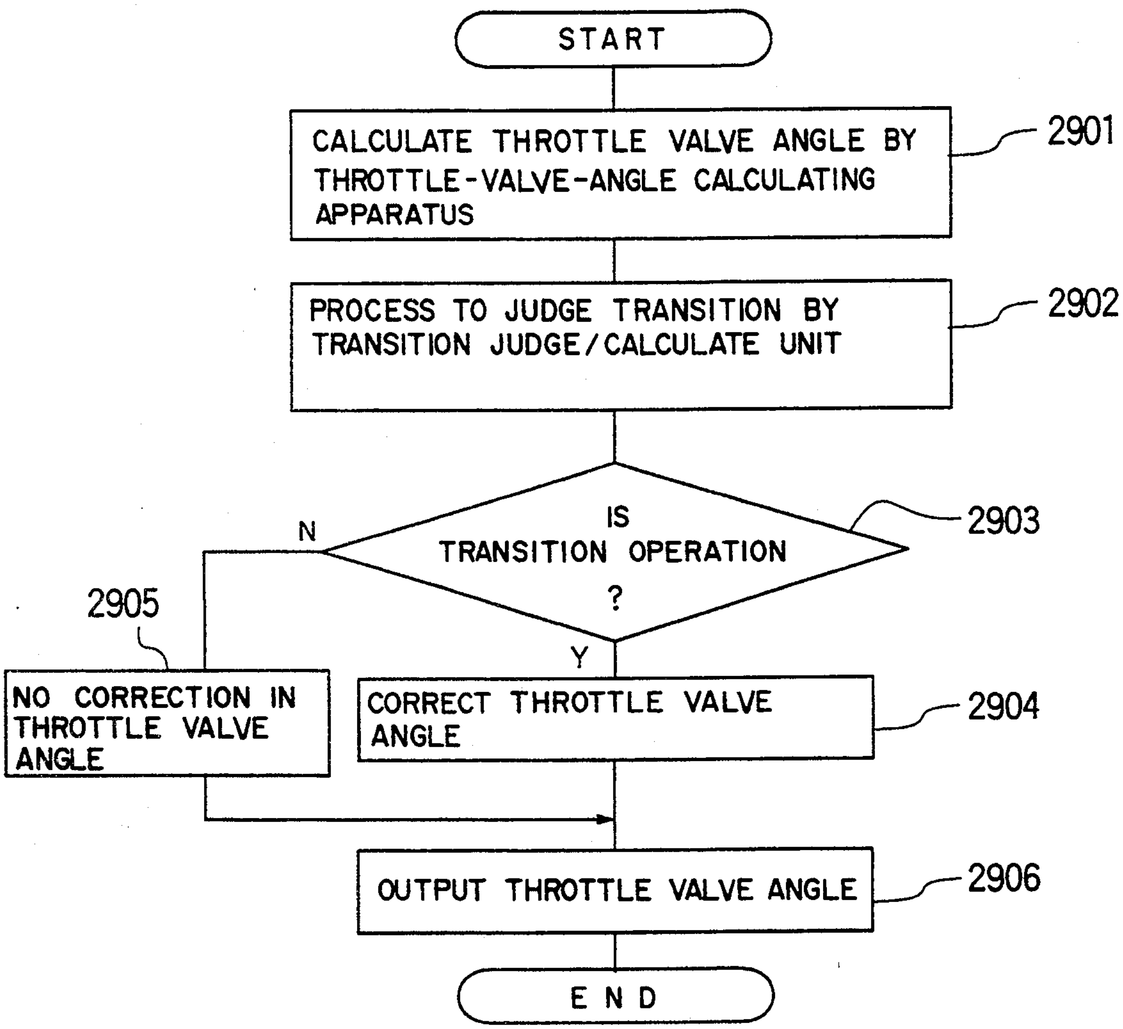
FIG. 60 is a flowchart for explaining an operation sequence of an apparatus for calculating a throttle valve angle in the twenty-fourth preferred embodiment shown in FIG. 41.

FIG. 59 is a flowchart for representing an operation of the throttle-valve-angle calculating apparatus shown in FIG. 38.

Based upon the pressure at the air intake manifold and the air flow rate passing through the throttle valve, the proper throttle valve angles have been stored into the two-dimensional map by way of the engine unitary test (a step 2601). A measurement is carried out for the pressure at the air intake manifold at a step 2602, and also another measurement is done for the engine revolution number at a step 2603.

The calculating unit 421 for calculating pressure variations at the air intake manifold shown in FIG. 38 is to obtain a differential value of either the variations in the pressure at the air intake manifold, or the pressure thereof measured by the calculating unit for calculating the pressure at the air intake manifold (at a step 2604). The calculating unit 423 for calculating the air flow rate at the cylinder port shown in FIG. 38 calculates the air flow rate at the cylinder port based upon the pressure at the air intake manifold and the revolution number (a step 2605). Also, the calculating unit 422 for calculating the air flow rate passing through the throttle valve shown in FIG. 38 calculates the air flow rate passing through the throttle valve based upon either the variation amount or the differential value in the pressure at the air intake manifold and the air flow rate at the cylinder port (a step 2606). Then, the throttle-valve-angle calculating unit 424 of FIG. 38 retrieves the two-dimension map based upon the air flow rate passing through the throttle valve and the pressure at the air intake manifold which have been acquired from the calculating unit 422 for calculating the air flow rate passing through the throttle valve at steps 2607 and 2608, whereby the throttle valve angle is calculated at steps 2609 and 2610.

FIG. 29 is a schematic block diagram for showing a 22nd preferred embodiment according to the present invention.

This preferred embodiment is constructed of a prediction processing unit 431 for predicting pressure at an air intake manifold, and a throttle-valve-angle calculating unit 432.

In the prediction processing unit 431 for predicting the pressure at the air intake manifold, the pressure is predicted by employing a first order lead filter as follows.

$$P_o(k)=P_i(k)+[P_i(k)-P_i(k-1)]\times T_{po}\div\Delta t \quad (68)$$

where symbol "$T_{po}$" indicates a degree of leading and may be equal to a function of an engine revolution number.

The throttle-valve-angle calculating unit 432 calculates the throttle valve angle with employment of the two-dimensional map based upon the obtained predicted pressure and the engine revolution number.

Figure 58:
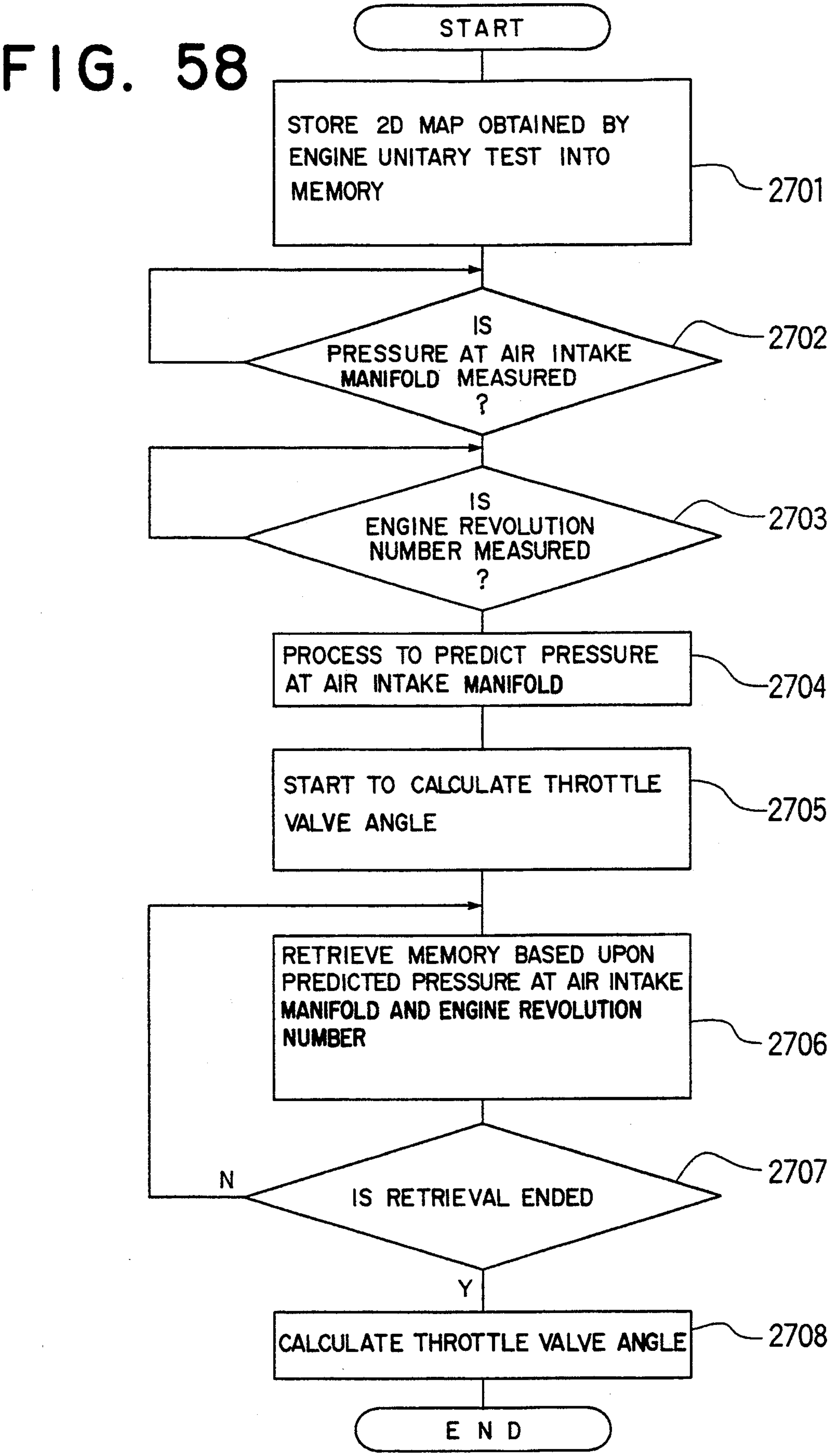
FIG. 58 is a flowchart for explaining an operation sequence of an apparatus for calculating a throttle valve angle in the twenty-second preferred embodiment shown in FIG. 39.

FIG. 58 is a flowchart for representing an operation of the throttle-valve-angle calculating apparatus shown in FIG. 39.

Based upon the pressure at the air intake manifold and the engine revolution number, the proper throttle valve angles are previously obtained by way of the engine unitary test and then stored in the two-dimensional map at a step 2701. A measurement for the pressure at the air intake manifold is carried out at a step 2702, and also a measurement for the engine revolution number is performed at a step 2703. Subsequently, the pressure at the air intake manifold is predicted at a step 2704 and then, the calculation of the throttle valve opening angle is commenced at a step 2705. Based upon both the predicted pressure at the air intake manifold and also the measured engine revolution number, the two-dimensional map is retrieved at steps 2706 and 2707, whereby the throttle valve angle is calculated at a step 2708.

With the above-described combined arrangements, in the D-jetronics system and L-jetronics system, the throttle valve opening angle may be calculated based upon either the air-flow rate and the engine revolution number, or the pressure at the air intake manifold and the engine revolution number.

Also, the calculated throttle valve angle may be coincident with the value actually detected by the throttle valve angle sensor even under the transition condition where the throttle valve angle is changed. As a result, the sensor for detecting the throttle is no longer required. Accordingly, cost reduction may be realized.

With respect to utilization for the throttle-valve-angle information in any apparatuses other than the engine control, this throttle-valve-angle signal is directly transmitted, so that even if no throttle sensor is employed, the desirable effect may be sufficiently achieved.

In addition, as will be described later, since the signal obtained from the conventional throttle-valve-angle sensor is combined with this throttle valve angle signal, matching with various corrections in the engine controls such as the fuel injection control may be considerably improved.

If only the reliability on the throttle-valve-angle sensor signal is mainly improved with neglecting cost reduction, there are provided the below-mentioned application examples.

Figure 40:
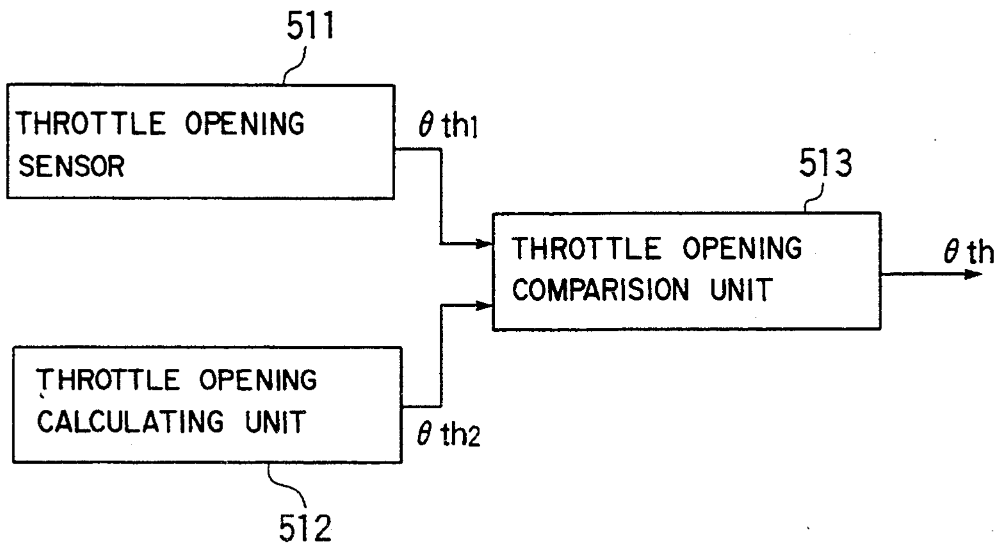
FIG. 40 is a schematic block diagram for showing an arrangement according to a twenty-third preferred embodiment of the present invention.

FIG. 40 is a schematic block diagram for representing an arrangement of a 23rd preferred embodiment.

This preferred embodiment represents one of the application examples according to the present invention, and is arranged by the conventional throttle-valve-angle sensor 511; the throttle-valve-angle calculating apparatus 512 according to any one of the preceding sixth to 22nd preferred embodiments; and a comparing unit 513 for comparing throttle-valve-angle signals.

In an electronic control apparatus employing any one of the throttle-valve-angle calculating apparatuses as described in the 6th to 22nd preferred embodiments, the conventional throttle-valve-angle sensor 511 is also employed. When there is a great difference between the signal value from this throttle-valve-angle sensor 511 and the throttle-valve-angle signal value calculated by the throttle-valve-angle calculating apparatus 512, a judgement is made that either the throttle-valve-angle sensor, or the throttle-valve-angle calculating apparatus 512 is brought into malfunction. Basically, it is considered that the throttle-valve-angle sensor 511 has a defect. More specifically, when no sensor signal derived from the throttle-valve-angle sensor 511 is inputted, the throttle-valve-angle signal calculated by the throttle-valve-angle calculating apparatus 512 may be utilized.

FIG. 59 is a flowchart for explaining an operation of the throttle-valve-angle-signal comparing unit shown in FIG. 40.

In this throttle-valve-angle-signal comparing unit, a comparison is made between a signal value obtained from the conventional throttle-valve-angle sensor 511 (a step 2801) shown in FIG. 40, and a value of a throttle-valve-angle-signal (a step 2802) calculated by the throttle-valve-angle-signal calculating apparatus 512 according to the present invention at a step 2003. If these values are identical to each other (a step 2804), the value obtained from the throttle-valve-angle calculating apparatus 512 is implied (a step 2805). If there is a difference between them, this difference is checked at a step 2806. If there is no large difference between them, though these values are different from each other at a step 2807, the throttle-valve-angle signal calculated by the method for calculating the throttle-valve-angle signal according to the present invention is utilized at a step 2805. If there is a great difference between these values, a judgement is made that either the throttle-valve angle sensor, or the air flow rate measuring unit and the calculating unit for calculating the pressure at the air intake manifold are brought into malfunction. Accordingly, it may be considered that the throttle-valve angle sensor has a defect basically, and a check is made at a step 2808. In particular, when no signal derived from the throttle-valve-angle sensor is completely inputted at a step 2809, the throttle-valve-angle signal calculated by the method for calculating the throttle valve angle according to the present invention is used at a step 2805. At a step 2809, if the signal derived from the throttle-valve-angle sensor is inputted, a judgement is established that either the throttle-valve-angle sensor, or the air-flow rate measuring unit and the calculating unit for calculating the pressure at the air intake manifold are brought into a malfunction at a step 2810. It should be noted that even in such a case, it is basically regarded that the throttle-valve-angle sensor is brought into a malfunction, and the value calculated by the method for calculating the throttle valve angle, according to the present invention, may be used.

In accordance to this preferred embodiment, a quick operation may be realized when a malfunction happens to occur. Also, the throttle-valve-angle signal with higher precision may be produced so that the various control apparatuses such as the engine and transmission may be properly controlled.

Figure 41:
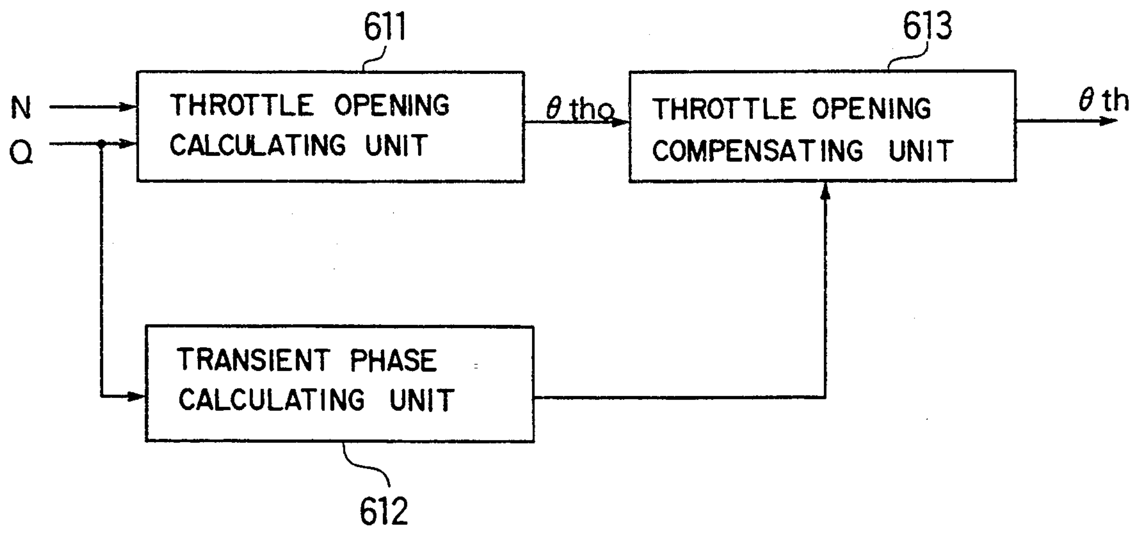
FIG. 41 is a schematic block diagram for showing an arrangement according to a twenty-fourth preferred embodiment of the present invention.

FIG. 41 is a schematic block diagram for showing a construction of the throttle-valve-angle correcting apparatus according to 24th preferred embodiment.

This correcting apparatus is constructed by a throttle-valve-angle calculating unit 611; a transition judgement calculating unit 612; and a throttle-valve-angle correcting unit 613.

The throttle-valve-angle calculating apparatus 611 corresponds to any one of the throttle-valve-angle calculating apparatus according to the first to seventh preferred embodiments. The transition judgement calculating unit 612 corresponds to any one of the transition judgement calculating units according to the 8th to 12th preferred embodiments.

Into the throttle-valve-angle correcting unit 613, the correction values corresponding to the variation strengths derived from the transition judgement calculating unit 612 have previously been stored by way of the engine unitary test. During the actual driving operation, the throttle valve angles calculated by the throttle-valve-angle calculating apparatus 611 are corrected, if required. For instance, when the transition judgement calculating unit 612 judges that it is under the normal driving operation, but not under the transition driving operation, no correction is performed. When it is judged that the transition driving operation is performed, the necessary correction is carried out. At this time, in the initial stage of the transition driving operation, the variation strength is furthermore emphasized.

For instance, a two-dimensional map used for a normal driving operation, a map for a transition driving operation, and also a map for an initial transition driving operation are directly prepared for the throttle-valve angle calculating apparatus 611, and these maps are suitably changed based upon the judgement result made by the transition judgement calculating unit 612, whereby the throttle-valve-angle result may be obtained.

FIG. 68 is a flowchart for representing an operation of the throttle-valve-angle correcting apparatus shown in FIG. 41.

First, the throttle valve angle is calculated by the throttle-valve-angle calculating apparatus as described in the 6th to 12th preferred embodiment and the 20th to 22nd preferred embodiments at a step 2901. The transition judgement calculating unit 612 shown in FIG. 41 judges whether or not it is under the transition driving operation at a step 2902. If this unit 612 judges that it is under the transition driving operation at a step 2903, the throttle-valve-angle correcting unit 61 shown in FIG. 41 corrects the outputted throttle valve angle at a step 2904, and calculates the proper throttle valve angle at a step 2906. Conversely, when this unit 612 judges that it is not under the transition driving operation, the outputted throttle valve angle is not corrected at a step 2905 and this value is used as the proper throttle valve angle.

As previously described, with respect to the method for obtaining the throttle valve angle under the normal driving state and also the throttle valve angle prediction under the transition driving state, several methods for calculating the throttle valve opening angles may be realized in accordance with the required precision.

As described in detail, according to the present invention, there are particular advantages.

(1). Based on the air flow rate measured by the airflow rate measuring means and also the engine revolution number, the pressure value at the air intake manifold is calculated. The accurate air flow rate at the cylinder port may be calculated based on the calculated pressure at the air intake manifold. Furthermore, since the fuel injection amount is determined based upon this air flow rate at the cylinder port, an air/fuel ratio may be properly controlled.

(2). The air flow rate with the measurement lag is obtained which is the air flow rate corresponding to the variation in the throttle valve opening angle. Based upon the calculated air flow rate, the air flow rate measured by the air flow rate measuring means is adjusted. Then, based upon the adjusted air flow rate and the engine revolution number, the pressure value at the air intake manifold is calculated. Finally, there is a similar merit that based on this pressure value at the air intake manifold, the highly precise air flow rate at the cylinder port is calculated.

(3). No throttle-valve-angle sensor is required, and the total cost of the control apparatus may be reduced. Not only under the normal driving condition, but also under the transition driving condition such as the acceleration/deceleration operations, the optimum air/fuel ratio control may be realized. Furthermore, various throttle-valve-angle signals required for the respective control apparatuses may be calculated.

What is claimed is:

1. A method for calculating an air flow rate at a cylinder port of an engine in an electronic engine control apparatus including means for detecting a revolution number of an engine at each of a plurality of measuring periods, air flow sensor means for directly measuring an air flow rate at a throttle valve of the engine and means for calculating air flow rate at the cylinder port at each measuring period, said method comprising the steps of:

measuring the air flow rate at the throttle valve of the engine at each measuring period;

compensating measuring delay of the measured air flow rate;

calculating a pressure in an intake manifold of the engine on the basis of the compensated air flow rate at the throttle valve and the air flow rate at the cylinder port calculated by said calculating means before one of the measuring periods; and calculating an air flow rate at the cylinder port at a present time on the basis of the previously calculated pressure in the intake manifold and the detected engine revolution number.

2. A method for calculating an air flow rate according to claim 1, wherein said air flow rate detecting means comprises a hot wire sensor.

3. A method for calculating an air flow rate at a cylinder port according to claim 1, wherein the pressure at the air intake manifold is calculated by said calculating means for calculating the pressure at the air intake manifold based upon a difference between the air flow rate obtained by said air flow rate detecting means and the air flow rate obtained by said step for calculating the air flow rate at the cylinder port.

4. A method for calculating an air flow rate at a cylinder port according to claim 3, wherein the air flow rate at the cylinder port corresponding to the pressure of the air intake manifold and the engine revolution number are previously held as a memory map in said means for calculating the air flow rate at the cylinder port, and also the air flow rate at the cylinder port is retrieved from said memory map by said calculating means for calculating the air flow rate at the cylinder port based upon the engine revolution number and the pressure at the air intake manifold, whereby a proper air flow rate at the cylinder port is calculated.

5. A method for calculating an air flow rate at a cylinder port according to claim 1, wherein the pressure at the air intake manifold is calculated by said calculating means for calculating the pressure at the intake manifold in accordance with the following equation:

$$P = P_{-1} + \frac{RT_m}{V_m} \Delta t (Q_{at} - Q_{ap})$$

where symbol "R" denotes an ambient constant; symbol "$T_m$" indicates an air temperature; symbol "$V_m$" is a volume within the air intake manifold; symbol "P" represents pressure at the intake manifold at a present time instant; symbol "$P_{-1}$" indicates pressure at the air intake manifold at a preceding time instant; symbol "Δt" is a sampling period; symbol "$Q_{at}$" denotes an air flow rate passing through the throttle valve, or an air flow rate measured by an air-flow rate meter; and symbol "$Q_{ap}$" is an air flow rate at a cylinder port.

* * * * *